(12) United States Patent
Kang et al.

(10) Patent No.: US 10,693,139 B2
(45) Date of Patent: Jun. 23, 2020

(54) CARBONACEOUS STRUCTURE AND METHOD FOR PREPARING THE SAME, ELECTRODE MATERIAL AND CATALYST INCLUDING THE CARBONACEOUS STRUCTURE, AND ENERGY STORAGE DEVICE INCLUDING THE ELECTRODE MATERIAL

(71) Applicant: Korea Advanced Institute of Science and Technology, Yuseong-gu, Daejeon (KR)

(72) Inventors: Jeungku Kang, Daejeon (KR); Jong Ho Won, Daejeon (KR); Hyungmo Jeong, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 85 days.

(21) Appl. No.: 15/720,209

(22) Filed: Sep. 29, 2017

(65) Prior Publication Data
US 2018/0047984 A1  Feb. 15, 2018

Related U.S. Application Data

(63) Continuation of application No. PCT/KR2017/008755, filed on Aug. 11, 2017.

(30) Foreign Application Priority Data

Aug. 12, 2016  (KR) .................. 10-2016-0103295

(51) Int. Cl.
*H01M 4/583* (2010.01)
*C01B 32/205* (2017.01)
(Continued)

(52) U.S. Cl.
CPC .......... *H01M 4/583* (2013.01); *C01B 32/205* (2017.08); *D01D 5/247* (2013.01); *D01F 1/08* (2013.01);
(Continued)

(58) Field of Classification Search
CPC ...... H01M 4/583; H01M 4/587; H01M 4/663; H01M 4/76; H01M 4/38; H01M 10/052;
(Continued)

(56) References Cited

U.S. PATENT DOCUMENTS 10,249,872 B2 *  4/2019  Jang .................. H01M 4/62
2009/0269667 A1 * 10/2009  Antonietti .......... H01G 11/34
429/231.4

(Continued)

FOREIGN PATENT DOCUMENTS

CN  107154485 A  *  9/2017
CN  106006599 B  *  6/2018
(Continued)

OTHER PUBLICATIONS

Machine translation of CN106006599 (no date).*
(Continued)

*Primary Examiner* — Amanda C. Walke
(74) *Attorney, Agent, or Firm* — Panitch Schwarze Belisario & Nadel LLP

(57) ABSTRACT

The present disclosure relates to a carbonaceous structure and a method for preparing the same, an electrode material and a catalyst including the carbonaceous structure, and an energy storage device including the electrode material.

40 Claims, 64 Drawing Sheets

(51) Int. Cl.
  *D01F 11/04*   (2006.01)
  *D01F 1/08*   (2006.01)
  *D01F 9/12*   (2006.01)
  *H01G 11/26*   (2013.01)
  *H01M 4/76*   (2006.01)
  *D01F 11/12*   (2006.01)
  *D01D 5/247*   (2006.01)
  *H01G 11/32*   (2013.01)
  *H01M 4/66*   (2006.01)
  *H01M 4/587*   (2010.01)
  *H01G 11/86*   (2013.01)
  *H01M 10/39*   (2006.01)
  *H01M 10/052*   (2010.01)
  *H01M 8/18*   (2006.01)
  *H01M 4/38*   (2006.01)
  *H01M 10/054*   (2010.01)

(52) U.S. Cl.
  CPC ............... *D01F 9/12* (2013.01); *D01F 11/04* (2013.01); *D01F 11/127* (2013.01); *H01G 11/26* (2013.01); *H01G 11/32* (2013.01); *H01G 11/86* (2013.01); *H01M 4/587* (2013.01); *H01M 4/663* (2013.01); *H01M 4/76* (2013.01); *H01M 4/38* (2013.01); *H01M 8/18* (2013.01); *H01M 10/052* (2013.01); *H01M 10/054* (2013.01); *H01M 10/3909* (2013.01)

(58) Field of Classification Search
  CPC ..... H01M 10/054; H01G 11/26; H01G 11/32; H01G 11/86
  USPC ...................................................... 429/231.8
  See application file for complete search history.

(56) References Cited

U.S. PATENT DOCUMENTS

| | | | | |
|---|---|---|---|---|
| 2012/0234695 | A1* | 9/2012 | Mayes | C01B 32/20 205/758 |
| 2014/0141328 | A1* | 5/2014 | Dai | H01M 4/137 429/217 |
| 2015/0041708 | A1 | 2/2015 | Wiesner et al. | |
| 2017/0133662 | A1* | 5/2017 | Cui | H01M 4/134 |
| 2017/0170478 | A1* | 6/2017 | Mihara | H01G 11/06 |
| 2017/0301917 | A1* | 10/2017 | Yuge | H01M 4/133 |
| 2018/0331352 | A1* | 11/2018 | Morales Palomino | H01M 4/133 |
| 2019/0097222 | A1* | 3/2019 | Feaver | H01M 4/366 |
| 2019/0169033 | A1* | 6/2019 | Alazmi | C01B 32/198 |

FOREIGN PATENT DOCUMENTS

| | | | | |
|---|---|---|---|---|
| EP | 1207572 | A1 * | 5/2002 | ............ B82Y 20/00 |
| JP | 2013021234 | A | 1/2013 | |
| JP | 2014075415 | A | 4/2014 | |
| KR | 20040095804 | A | 11/2004 | |
| KR | 100769567 | B1 | 10/2007 | |
| KR | 10-0866311 | B1 | 11/2008 | |
| KR | 10-1306859 | B1 | 9/2013 | |
| KR | 101310094 | B1 | 9/2013 | |
| KR | 101570738 | B1 | 11/2015 | |
| KR | 101578873 | B1 | 12/2015 | |

OTHER PUBLICATIONS

ISA Written Opinion for PCT KR2017/008755 (Year: 2017).*
Liang et al, Silica nanonetwork confined in nitrogen-doped ordered mesoporous carbon framework for high-performance lithium-ion battery anodes, Nanoscale, 7, 3971-3975. (Year: 2015).*
Park et al, One-pot synthesis of silicon nanoparticles trapped in ordered mesoporous carbon for use as an anode material in lithium-ion batteries, Nanotechnology, 24, 025602 (7pp). (Year: 2013).*
Zhang et al., "A High-Performance Supercapacitor-battery Hybrid Energy Storage Device Based on Graphene-Enhanced Electrode Materials with Ultrahigh Energy Density", Energy Environ Sci., vol. 6, pp. 1623-1632 (2013).
Yang et al., "Fabrication of High-Power Li Ion Hybrid Supercapacitors by Enhancing the Exterior Surface Charge Storage", Advanced Energy Materials, vol. 5, No. 17, 9 pgs. (2015).

* cited by examiner

CARBONACEOUS STRUCTURE AND METHOD FOR PREPARING THE SAME, ELECTRODE MATERIAL AND CATALYST INCLUDING THE CARBONACEOUS STRUCTURE, AND ENERGY STORAGE DEVICE INCLUDING THE ELECTRODE MATERIAL

CROSS-REFERENCE TO RELATED APPLICATION

This application is a Continuation of International Application No. PCT/KR2017/008755, filed Aug. 11, 2017, and the disclosure of which is incorporated herein by reference.

TECHNICAL FIELD

The present disclosure relates to a carbonaceous structure including one or more hollow internal compartments connected to outside through one or more open porous channels and a method for preparing the same, an electrode material including the carbonaceous structure, an energy storage device including the electrode material, and a catalyst including the carbonaceous structure.

BACKGROUND

In response to the recent jump in crude oil prices and green energy policies, energy policies for reducing fossil fuels have been published and enforced. As for Korea with 97% of national total energy coming from imports, an annual average energy consumption increase rate reaches 1.1% and fossil fuels account for 83% of the total energy source, and Korea has generated more carbon dioxide than the advanced countries, and, thus, along with the strengthening of the greenhouse gas emission regulations according to the convention on climate change and international environmental regulations, its industrial competitiveness has been weakened. Under these environmental regulations and energy policies, eco-friendly electric vehicles and smart grids have received a lot of attention, and, thus, energy storage devices need to be developed and are growing rapidly.

A secondary battery is a key component in constituting an energy storage device. The secondary device refers to a battery configured to convert electric energy into chemical energy to be stored and then convert the stored chemical energy into electric energy to be used if necessary, and includes an electrode material, a battery/capacitor, a module/pack/battery management system, and the like. Such secondary devices may include lithium ion batteries, lithium ion polymer batteries, metal air batteries, redox flow batteries, sodium sulfur batteries, magnesium ion batteries, sodium ion batteries, nickel hydrogen batteries, NiCd batteries, and the like, and technologies regarding parts thereof and materials and components of supercapacitors also belong to the secondary battery technologies. The secondary batteries can be classified depending on the purpose of application, into small-scale energy storage systems such as mobile technologies; medium-scale energy storage systems such as electric vehicles and home lithium battery cells/modules; and large-scale energy storage systems such as large-sized batteries.

The capacitor refers to a device, i.e., a storage battery, configured to store electricity. Particularly, a supercapacitor refers to an ultra-high capacitance capacitor with a very high electric capacitance, and is also referred to as an electrochemical capacitor and uses charging caused by simple movements of ions to an interface between an electrode and an electrolyte or a surface chemical reaction unlike a battery using a chemical reaction. Therefore, the supercapacitor can be charged and discharged at a high speed and has a high charge/discharge efficiency and a semipermanent cycle life and thus has been used as an auxiliary battery or battery substitution, and with the recent remarkable increase in new renewable energy, the supercapacitor has received a lot of attention as a principal energy storage device. Particularly, in relation to securing energy, the supercapacitor may be used for power generation using wind power, sunlight, and fuel cells, and, thus, it is possible to stably obtain electric energy and supply high-quality electric power.

An electric double-layer capacitor (EDLC) using activated carbon as an electrode and electric double-layer charge adsorption as a mechanism is configured to store electric energy by physical adsorption, and, thus, the EDLC does not have a life reduction problem caused by charging/discharging unlike secondary batteries and thus has an advantage in terms of maintenance and has received a lot of attention due to its merits such as high-speed charging and high power. However, the EDLC has a disadvantage of being much smaller than a lithium ion battery with an energy storage capacity of 100 Wh/kg or more.

Lithium ion batteries have high energy density and thus have been supplied as power sources for mobile phones, PC, and digital cameras, and their use has been expanded to power sources for hybrid car or electric vehicles, but some prerequisites such as safety and cycle characteristics still remain. Accordingly, a hybrid supercapacitor as a capacitor capable of being charged and discharged at a high speed with a high energy density needs to be developed, and studies for application to various fields are being conducted.

Further, when a supercapacitor is produced, activated carbon for forming an electrode accounts for 43% of the material cost, which means that the electrode is the dominant component that determines the characteristics and price of the supercapacitor, and, thus, a high efficiency and economic feasibility need to be considered.

In addition to activated carbon which has been typically used as a carbonaceous electrode material, there are various alternative materials. Specifically, examples thereof may include graphene, carbon onion, carbon nanotube, carbide-induced carbon, and templated carbon. Particularly, graphene has excellent physical and electrical properties and is a noticeable new material. However, in order to show its excellent properties, graphene needs to be exfoliated to atom layer thickness, and such mechanical exfoliation has a low yield. Therefore, currently, a method of obtaining reduced graphene by preparing graphene oxide and then reducing the graphene oxide via a chemical process is the most commonly used. However, the reduction method using a high-temperature reducing gas is not suitable for mass production and increases the unit cost of production.

A high energy density along with excellent power density and robust cycle life of electrode structures during repeated ion insertion/desertion reactions are critical to satisfy the more challenging standards in performance for future electrochemical energy storage systems such as hybrid plug-in electric vehicles (HPEVs) and even pure electric vehicles (EVs). Currently, the dominating electrochemical energy storage remains on a lithium ion battery (LIB) with high energy density although an electrochemical capacitor (EC) with high power density along with robust cycle life has great potential for many energy storage devices. This is because the EC has the relatively low specific energy density compared to that of the LIB. In addition, it was found that the sole usage of an LIB or an EC alone could not provide simultaneously high energy and power densities because of its complementary ion storage mechanism. In this view, a lithium ion hybrid capacitor (LHC) has been recently suggested as one of the promising energy storages in that the LHC could take the advantages of battery and capacitor energy storage mechanisms on conjugation of the battery-type anode along with the capacitor-type cathode. However, there exist other challenges to realize a high-performance LHC due to several obstacles such as kinetic imbalance and poor capacity in the full-cell configuration of anode and cathode electrode materials. Meanwhile, the conversion or alloying reaction in the anode electrode for the LHC was found to be better for a high capacity. The Sn metal capable of leading to an alloying reaction is one of the great candidates to realize the anode electrode for an LHC since the Sn metal's high theoretical specific capacity of 990 mAhg$^{-1}$ and operation potential of ~0.25 V vs Li/Li$^+$ have a potential to give a higher energy density required for the next-generation energy storage, while the Sn metal's large volume expansion, typically reaching 300% during an alloying reaction, may cause pulverization of Sn metals and interruption of electron/ion transportation. This in turn leads to fast fading of capacity, thus resulting in short cycle life and poor rate capability. One approach to overcome these drawbacks is to reduce the average size of crystalline particles for the electrode to the scale of several nanometers as ultrafine nanoparticles (NPs) can mitigate the strain induced by a large volume change of particles and retard pulverization. The problem is in that even ultrafine metal NPs on a simple substrate can be agglomerated during repeated redox cycles, thus eventually causing capacity fading during repeated discharge/charge cycles.

Korean Patent No. 10-0866311 discloses a method for preparing a nitrogen-rich nanoporous graphite carbon nitride structure.

DISCLOSURE OF THE INVENTION

Problems to be Solved by the Invention

The present disclosure is conceived to provide a carbonaceous structure including one or more hollow internal compartments connected to outside through one or more open porous channels and a method for preparing the same, an electrode material including the carbonaceous structure, an energy storage device including the electrode material, and a catalyst including the carbonaceous structure.

However, problems to be solved by the present disclosure are not limited to the above-described problems. Although not described herein, other problems to be solved by the present disclosure can be clearly understood by those skilled in the art from the following description.

Means for Solving the Problems

According to a first aspect of the present disclosure, there is provided a carbonaceous structure, including: one or more hollow internal compartments, wherein each of the hollow internal compartments is connected through to outside and to the one or more hollow internal compartments adjacent thereto through one or more open porous channels formed in the carbonaceous structure, and the carbonaceous structure includes a carbonaceous matrix.

According to a second aspect of the present disclosure, there is provided an electrode material, including: a carbonaceous structure including one or more hollow internal compartments, wherein each of the hollow internal compartments is connected through to outside and to the one or more hollow internal compartments adjacent thereto through one or more open porous channels formed in the carbonaceous structure, and the carbonaceous structure includes a carbonaceous matrix.

According to a third aspect of the present disclosure, there is provided an energy storage device, including an electrode material according to the second aspect, wherein the electrode material includes a carbonaceous structure including one or more hollow internal compartments, each of the hollow internal compartments is connected through to outside and to the one or more hollow internal compartments adjacent thereto through one or more open porous channels formed in the carbonaceous structure, and the carbonaceous structure includes a carbonaceous matrix.

According to a fourth aspect of the present disclosure, there is provided a method for preparing a carbonaceous structure, including: injecting a solution containing a carbon precursor and a soft template to a hard template, and then carbonizing the carbon precursor and removing the soft template and the hard template to obtain a carbonaceous structure including one or more hollow internal compartments, wherein the carbonaceous structure includes a carbonaceous matrix formed by the carbonization of the carbon precursor, and each of the hollow internal compartments is connected through to outside and to the one or more hollow internal compartments adjacent thereto through one or more open porous channels which are formed in the carbonaceous structure by the removal of the soft template.

According to a fifth aspect of the present disclosure, there is provided a catalyst, including a carbonaceous structure according to the first aspect, wherein the carbonaceous structure includes one or more hollow internal compartments, and each of the hollow internal compartments is connected through to outside and to the one or more hollow internal compartments adjacent thereto through one or more open porous channels formed in the carbonaceous structure, and the carbonaceous structure includes a carbonaceous matrix.

Effects of the Invention

A carbonaceous structure according to an exemplary embodiment of the present disclosure has a high specific surface area and a high porosity and is uniform in shape. The carbonaceous structure according to an exemplary embodiment of the present disclosure includes one or more hollow internal compartments, and each of the hollow internal compartments is connected through to outside and to the one or more hollow internal compartments adjacent thereto through one or more open porous channels formed in the carbonaceous structure and the carbonaceous structure includes a carbonaceous matrix and thus facilitates penetration and encapsulation of ions or particles (for non-limiting example, nanoparticles or subnano particles). The carbonaceous structure according to an exemplary embodiment of the present disclosure can adjust a size of the open porous channels included therein, a thickness of a wall of the carbonaceous structure, and a size of the encapsulated particles to the scale of nanometers, and, thus, the carbonaceous structure may be formed as a carbonaceous nanostructure.

The carbonaceous structure according to an exemplary embodiment of the present disclosure can be readily prepared and can be mass-produced with a high yield and thus has an advantage of a high technological competitiveness.

During penetration and encapsulation of particles (for non-limiting example, nanoparticles or subnano particles) in the carbonaceous structure according to an exemplary embodiment of the present disclosure, the particles can be uniformly dispersed and encapsulated since the carbonaceous structure has a high specific surface area and a high porosity due to the one or more hollow internal compartments and the one or more open porous channels, and, thus, agglomeration of the particles, nanoparticles or subnano particles in the carbonaceous structure can be suppressed.

The carbonaceous structure according to an exemplary embodiment of the present disclosure undergoes a volume change when the particles encapsulated by the carbonaceous structure make alloying/dealloying reactions with another metal having active reactivity, but the one or more hollow internal compartments of the carbonaceous structure and the one or more open porous channels can accommodate the volume change.

The particles (for non-limiting example, nanoparticles or subnano particles) encapsulated in the carbonaceous structure according to an exemplary embodiment of the present disclosure can provide additional active sites when an electrode material is prepared or the particles are used as a catalyst.

A novel electrode material and structure or methodology, i.e., a method that enables suppression of the agglomeration of NPs and thus enables robust capacity retention during repeated redox cycles, according to exemplary embodiments of the present disclosure can represent a breakthrough in realization of high-performance electrochemical storage devices.

A novel carbonaceous structure according to exemplary embodiments of the present disclosure offers facile ion pathways and thus can maximize the accessibility of ions to their active sites while reducing the gap of kinetic imbalances during electrochemical reactions in anode and cathode electrodes is also essential to realize a high-performance hybrid full-cell capacitor.

The carbonaceous structure according to an exemplary embodiment of the present disclosure has a high specific surface area and a high porosity, and, thus, when the carbonaceous structure is used as an electrode material of an energy storage device, the structure is applied with a very small stress/strain despite repeated cycles and can thus maintain the structure. Therefore, a charge/discharge capacity ratio can be maintained for a long time and high-speed charging can be achieved in a short time.

The carbonaceous structure according to an exemplary embodiment of the present disclosure has a high specific surface area and a high porosity, and, thus, when the carbonaceous structure is used as an electrode material of the energy storage device, the energy storage device has advantages of rapid movement and storage, excellent reversibility, facile adsorption/desorption of ions and also includes many active sites. Therefore, it is possible to realize a high energy density, a high power density, and an excellent charge/discharge capacity ratio.

An energy storage device according to an exemplary embodiment of the present disclosure has a higher energy density and a higher charge/discharge efficiency and includes a more stable electrode structure than conventional supercapacitors.

The carbonaceous structure according to an exemplary embodiment of the present disclosure has a high specific surface area and a high porosity, and, thus, when the carbonaceous structure is used as a catalyst, the catalyst has advantages of rapid movement and storage, excellent reversibility, facile adsorption/desorption of ions and also includes many active sites. Therefore, it is possible to increase the catalytic activity and also increase the stability.

BEST MODE FOR CARRYING OUT THE INVENTION

Figure 1:
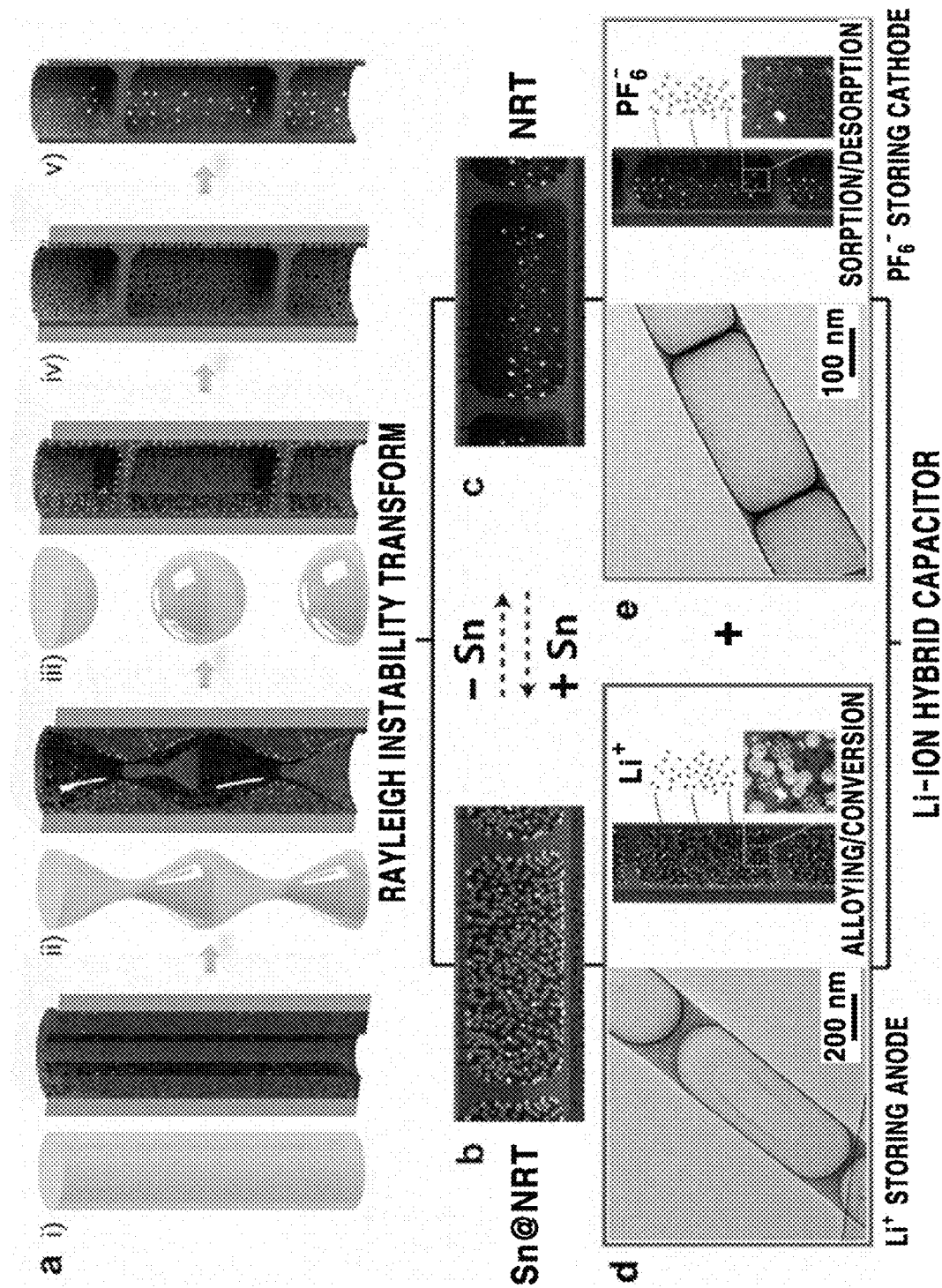
FIG. 1 is a schematic diagram illustrating a fabrication process of a carbonaceous structure and an internal structure of the carbonaceous structure in accordance with an exemplary embodiment of the present disclosure.

Hereinafter, examples of the present disclosure will be described in detail with reference to the accompanying drawings so that the present disclosure may be readily implemented by those skilled in the art. However, it is to be noted that the present disclosure is not limited to the examples but can be embodied in various other ways. In drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element.

Through the whole document, the term "on" that is used to designate a position of one element with respect to another element includes both a case that the one element is adjacent to the another element and a case that any other element exists between these two elements.

Further, through the whole document, the term "comprises or includes" and/or "comprising or including" used in the document means that one or more other components, steps, operation and/or existence or addition of elements are not excluded in addition to the described components, steps, operation and/or elements unless context dictates otherwise. Through the whole document, the term "about or approximately" or "substantially" is intended to have meanings close to numerical values or ranges specified with an allowable error and intended to prevent accurate or absolute numerical values disclosed for understanding of the present disclosure from being illegally or unfairly used by any unconscionable third party. Through the whole document, the term "step of" does not mean "step for".

Through the whole document, the term "combination(s) of" included in Markush type description means mixture or combination of one or more components, steps, operations and/or elements selected from a group consisting of components, steps, operation and/or elements described in Markush type and thereby means that the disclosure includes one or more components, steps, operations and/or elements selected from the Markush group.

Through the whole document, a phrase in the form "A and/or B" means "A or B, or A and B".

Hereinafter, embodiments and examples of the present disclosure will be described in detail with reference to the accompanying drawings. However, the present disclosure may not be limited to the following embodiments, examples and drawings.

According to a first aspect of the present disclosure, there is provided a carbonaceous structure, including: one or more hollow internal compartments, wherein each of the hollow internal compartments is connected through to outside and to the one or more hollow internal compartments adjacent thereto through one or more open porous channels formed in the carbonaceous structure, and the carbonaceous structure includes a carbonaceous matrix.

In an exemplary embodiment of the present disclosure, the one or more open porous channels in the carbonaceous structure may be formed by penetrating a wall of the carbonaceous structure.

In an exemplary embodiment of the present disclosure, the carbonaceous matrix constituting the wall of the carbonaceous structure may further include an element of Group 15 of the Periodic Table, but may not be limited thereto. For example, the carbonaceous matrix may further include an element of N, P, As, Sb, or Bi, but may not be limited thereto.

In an exemplary embodiment of the present disclosure, the carbonaceous structure may further include one or more particles encapsulated by each of the hollow internal compartments, but may not be limited thereto.

In an exemplary embodiment of the present disclosure, the particles encapsulated by each of the hollow internal compartments are nanoparticles or subnano particles, and a size of the particles may be from an atom size level to about 1 μm, but may not be limited thereto. For example, a size of the particles may be about 1,000 nm or less, about 100 nm or less, about 10 nm or less, or about 1 nm or less, but may not be limited thereto. For example, a size of the particles may be about 1,000 nm or less, about 500 nm or less, about 100 nm or less, about 10 nm or less, about 5 nm or less, about 1 nm or less, from about 1 nm to about 1,000 nm, from about 1 nm to about 950 nm, from about 1 nm to about 900 nm, from about 1 nm to about 850 nm, from about 1 nm to about 800 nm, from about 1 nm to about 750 nm, from about 1 nm to about 700 nm, from about 1 nm to about 650 nm, from about 1 nm to about 600 nm, from about 1 nm to about 550 nm, from about 1 nm to about 500 nm, from about 1 nm to about 450 nm, from about 1 nm to about 400 nm, from about 1 nm to about 350 nm, from about 1 nm to about 300 nm, from about 1 nm to about 250 nm, from about 1 nm to about 200 nm, from about 1 nm to about 150 nm, from about 1 nm to about 100 nm, from about 1 nm to about 50 nm, from about 1 nm to about 30 nm, from about 1 nm to about 10 nm, from about 1 nm to about 5 nm, from about 10 nm to about 1,000 nm, from about 10 nm to about 950 nm, from about 10 nm to about 900 nm, from about 10 nm to about 850 nm, from about 10 nm to about 800 nm, from about 10 nm to about 750 nm, from about 10 nm to about 700 nm, from about 10 nm to about 650 nm, from about 10 nm to about 600 nm, from about 10 nm to about 550 nm, from about 10 nm to about 500 nm, from about 10 nm to about 450 nm, from about 10 nm to about 400 nm, from about 10 nm to about 350 nm, from about 10 nm to about 300 nm, from about 10 nm to about 250 nm, from about 10 nm to about 200 nm, from about 10 nm to about 150 nm, from about 10 nm to about 100 nm, from about 10 nm to about 50 nm, or from about 10 nm to about 30 nm, but may not be limited thereto.

In an exemplary embodiment of the present disclosure, the particles may be dispersed on a surface of the one or more hollow internal compartments, and the particles may be dispersed in the carbonaceous matrix of the carbonaceous structure, but may not be limited thereto.

The carbonaceous structure according to an exemplary embodiment of the present disclosure has a high specific surface area and a high porosity and is uniform in shape. The carbonaceous structure according to an exemplary embodiment of the present disclosure includes one or more hollow internal compartments, and each of the hollow internal compartments is connected through to outside and to the one or more hollow internal compartments adjacent thereto through one or more open porous channels formed in the carbonaceous structure and the carbonaceous structure includes a carbonaceous matrix and thus facilitates penetration and encapsulation of ions or particles (for non-limiting example, nanoparticles or subnano particles). The carbonaceous structure according to an exemplary embodiment of the present disclosure can adjust a size of the open porous channels included therein and a thickness of a wall of the carbonaceous structure to the scale of nanometers, and, thus, the carbonaceous structure may be formed as a carbonaceous nanostructure.

The carbonaceous structure according to an exemplary embodiment of the present disclosure can be readily prepared and can be mass-produced with a high yield and thus has an advantage of a high technological competitiveness.

During penetration and encapsulation of particles (for non-limiting example, nanoparticles or subnano particles) in the carbonaceous structure according to an exemplary embodiment of the present disclosure, the particles can be uniformly dispersed and encapsulated since the carbonaceous structure has a high specific surface area and a high porosity due to the one or more hollow internal compartments and the one or more open porous channels, and, thus, agglomeration of the particles, nanoparticles or subnano particles in the carbonaceous structure can be suppressed.

The carbonaceous structure according to an exemplary embodiment of the present disclosure undergoes a volume change when the particles encapsulated in the carbonaceous structure make alloying/dealloying reactions with another metal having active reactivity, but the one or more hollow internal compartments of the carbonaceous structure and the one or more open porous channels can accommodate the volume change.

The particles (for non-limiting example, nanoparticles or subnano particles) encapsulated in the carbonaceous structure according to an exemplary embodiment of the present disclosure can provide additional active sites when an electrode material is prepared or the particles are used as a catalyst.

In an exemplary embodiment of the present disclosure, the particles may be semiconductive or conductive, but may not be limited thereto.

In an exemplary embodiment of the present disclosure, the particles may include one or more elements selected from the group consisting of Si, Fe, Ni, Co, Al, Ge, Sn, Mn, Ti, V, Cu, Zn, W, Ag, Pt, Ga, Au, Sb, Te, Pb, Bi, Cd, P and S, but may not be limited thereto. For example, the particles may include the element or a compound or alloy including the element, but may not be limited thereto.

In an exemplary embodiment of the present disclosure, a size of the hollow internal compartments may be about 100 μm or less, but may not be limited thereto. For example, a size of the hollow internal compartments may be about 100 μm or less, about 10 μm or less, about 1 μm or less, about 800 nm or less, about 600 nm or less, about 500 nm or less, about 400 nm or less, about 300 nm or less, about 200 nm or less, about 100 nm or less, about 50 nm or less, about 10 nm or less, from about 10 nm to about 100 μm, from about 10 nm to about 50 μm, from about 10 nm to about 10 μm, from about 10 nm to about 1 μm, from about 10 nm to about 500 nm, from about 10 nm to about 100 nm, from about 100 nm to about 100 μm, from about 100 nm to about 50 μm, from about 100 nm to about 10 μm, from about 100 nm to about 1 μm, from about 100 nm to about 500 nm, from about 100 nm to about 400 nm, from about 100 nm to about 300 nm, or from about 100 nm to about 200 nm, but may not be limited thereto.

In an exemplary embodiment of the present disclosure, a cross-sectional shape of the hollow may include a circular shape, an elliptical shape, a polygonal shape, or a combination thereof, but may not be limited thereto.

In an exemplary embodiment of the present disclosure, a thickness of the wall of the carbonaceous structure may be about 1 μm or less, but may not be limited thereto. For example, a thickness of the wall of the carbonaceous structure may be about 1 μm or less, about 800 nm or less, about 600 nm or less, about 500 nm or less, about 400 nm or less, about 300 nm or less, about 200 nm or less, about 100 nm or less, about 50 nm or less, about 10 nm or less, from about 1 nm to about 1,000 nm, from about 1 nm to about 900 nm, from about 1 nm to about 800 nm, from about 1 nm to about 700 nm, from about 1 nm to about 600 nm, from about 1 nm to about 500 nm, from about 1 nm to about 400 nm, from about 1 nm to about 300 nm, from about 1 nm to about 200 nm, from about 1 nm to about 100 nm, from about 1 nm to about 50 nm, from about 1 nm to about 10 nm, from about 10 nm to about 1,000 nm, from about 10 nm to about 900 nm, from about 10 nm to about 800 nm, from about 10 nm to about 700 nm, or from about 10 nm to about 600 nm, from about 10 nm to about 500 nm, from about 10 nm to about 400 nm, from about 10 nm to about 300 nm, from about 10 nm to about 200 nm, from about 10 nm to about 100 nm, from about 50 nm to about 1,000 nm, from about 50 nm to about 900 nm, from about 50 nm to about 800 nm, from about 50 nm to about 700 nm, or from about 50 nm to about 600 nm, from about 50 nm to about 500 nm, from about 50 nm to about 400 nm, from about 50 nm to about 300 nm, from about 50 nm to about 200 nm, from about 50 nm to about 100 nm, from about 100 nm to about 1,000 nm, from about 100 nm to about 900 nm, from about 100 nm to about 800 nm, from about 100 nm to about 700 nm, or from about 100 nm to about 600 nm, from about 100 nm to about 500 nm, from about 100 nm to about 400 nm, from about 100 nm to about 300 nm, or from about 100 nm to about 200 nm, but may not be limited thereto.

The carbonaceous structure in accordance with an exemplary embodiment of the present disclosure may have a uniform size, but may not be limited thereto.

In an exemplary embodiment of the present disclosure, the one or more open porous channels may have mesoporosity, but may not be limited thereto.

In an exemplary embodiment of the present disclosure, a diameter of the one or more open porous channels may be about 10 nm or less, but may not be limited thereto. For example, a diameter of the one or more open porous channels may be about 10 nm or less, about 5 nm or less, about 3 nm or less, about 1 nm or less, from about 0.1 nm to about 10 nm, from about 0.1 nm to about 8 nm, from about 0.1 nm to about 6 nm, from about 0.1 nm to about 4 nm, from about 0.1 nm to about 2 nm, from about 0.1 nm to about 1 nm, from about 1 nm to about 10 nm, from about 1 nm to about 8 nm, from about 1 nm to about 6 nm, from about 1 nm to about 4 nm, or from about 1 nm to about 2 nm, but may not be limited thereto.

In an exemplary embodiment of the present disclosure, a content of the element of Group 15 of the Periodic Table included in the carbonaceous matrix may be about 50 weight parts or less with respect to 100 weight parts of the carbonaceous structure, but may not be limited thereto. For example, a content of the element of Group 15 of the Periodic Table included in the carbonaceous matrix may be about 50 weight parts or less, about 40 weight parts or less, about 30 weight parts or less, about 20 weight parts or less, about 10 weight parts or less, from about 1 weight part to about 50 weight parts, from about 1 weight part to about 40 weight parts, from about 1 weight part to about 30 weight parts, from about 1 weight part to about 20 weight parts, from about 1 weight part to about 10 weight parts, from about 5 weight parts to about 10 weight parts, from about 10 weight parts to about 50 weight parts, from about 10 weight parts to about 40 weight parts, from about 10 weight parts to about 30 weight parts, or from about 10 weight parts to about 20 weight parts with respect to 100 weight parts of the carbonaceous structure, but may not be limited thereto.

In an exemplary embodiment of the present disclosure, the element of Group 15 of the Periodic Table included in the carbonaceous matrix constituting the wall of the carbonaceous structure may be dispersed in the carbonaceous matrix and/or a surface of the carbonaceous structure, and at least a part of the element of Group 15 of the Periodic Table may form chemical active species and/or defects. Therefore, when a precursor for forming the particles is injected into the carbonaceous structure to encapsulate the particles in the one or more hollow internal compartments, a site of the element of Group 15 of the Periodic Table may act as a seed for forming the particles and thus facilitate the formation of the particles (nanoparticles). Further, the chemical active species and/or defects including the element of Group 15 of the Periodic Table may be helpful in storing various ions in the one or more hollow internal compartments.

For example, if the element of Group 15 of the Periodic Table is nitrogen (N), when the nitrogen element is inserted into the carbonaceous structure, a large number of C—N structures such as pyridine, pyridone, and pyrrole may be formed and it is known that defects (twisted plate-shaped aromatic structures) formed at that time may be helpful in storing various ions, and when the precursor for forming the particles is introduced to encapsulate the particles in the one or more hollow internal compartments, the particles (nanoparticles) may be readily formed at a site where nitrogen is located in the carbonaceous structure.

In an exemplary embodiment of the present disclosure, the carbonaceous structure may have a specific surface area in a range of from about 10 $m^2$ $g^{-1}$ to about 4,000 $m^2$ $g^{-1}$, but may not be limited thereto. For example, the carbonaceous structure may have a specific surface area in a range of from about 10 $m^2$ $g^{-1}$ to about 4,000 $m^2$ $g^{-1}$, from about 10 $m^2$ $g^{-1}$ to about 3,000 $m^2$ $g^{-1}$, from about 10 $m^2$ $g^{-1}$ to about 2,000 $m^2$ $g^{-1}$, from about 10 $m^2$ $g^{-1}$ to about 1,000 $m^2$ $g^{-1}$, from about 10 $m^2$ $g^{-1}$ to about 500 $m^2$ $g^{-1}$, from about 100 $m^2$ $g^{-1}$ to about 4,000 $m^2$ $g^{-1}$, from about 100 $m^2$ $g^{-1}$ to about 3,000 $m^2$ $g^{-1}$, from about 100 $m^2$ $g^{-1}$ to about 2,000 $m^2$ $g^{-1}$, from about 100 $m^2$ $g^{-1}$ to about 1,000 $m^2$ $g^{-1}$, or from about 100 $m^2$ $g^{-1}$ to about 500 $m^2$ $g^{-1}$, but may not be limited thereto.

In an exemplary embodiment of the present disclosure, the carbonaceous structure may have various possible shapes such as a spherical particle, an ellipse particle, a polyhedron, a nanotube, a nanorod, a nanobelt, a nanopillar, a nanosphere or a nanoplate, but may not be limited thereto. For example, the carbonaceous structure may have a shape of a spherical nanoparticle, an ellipse nanoparticle, a nanopolyhedron, a nanotube, a nanorod, a nanobelt, a nanopillar, a nanosphere, a nanoplate, a nanocube, or a nanopolyhedron, but may not be limited thereto.

According to a second aspect of the present disclosure, there is provided an electrode material, including: a carbonaceous structure including one or more hollow internal compartments, wherein each of the hollow internal compartments is connected through to outside and to the one or more hollow internal compartments adjacent thereto through one or more open porous channels formed in the carbonaceous structure, and the carbonaceous structure includes a carbonaceous matrix.

In an exemplary embodiment of the present disclosure, the one or more open porous channels in the carbonaceous structure may be formed by penetrating a wall of the carbonaceous structure, but may not be limited thereto.

In an exemplary embodiment of the present disclosure, the carbonaceous matrix constituting the wall of the carbonaceous structure may further include an element of Group 15 of the Periodic Table, but may not be limited thereto. For example, the carbonaceous matrix may further include an element of N, P, As, Sb, or Bi, but may not be limited thereto.

All the descriptions of the first aspect of the present disclosure can be applied to the present aspect.

In an exemplary embodiment of the present disclosure, the carbonaceous structure may further include one or more particles encapsulated by each of the hollow internal compartments, but may not be limited thereto.

In an exemplary embodiment of the present disclosure, the particles may be dispersed on a surface of the one or more hollow internal compartments, and the particles may be dispersed in the carbonaceous matrix of the carbonaceous structure, but may not be limited thereto.

In an exemplary embodiment of the present disclosure, the particles may be semiconductive or conductive, but may not be limited thereto.

In an exemplary embodiment of the present disclosure, the particles may include one or more elements selected from the group consisting of Si, Fe, Ni, Co, Al, Ge, Sn, Mn, Ti, V, Cu, Zn, W, Ag, Pt, Ga, Au, Sb, Te, Pb, Bi, Cd, P, and S, but may not be limited thereto. For example, the particles may include the element or a compound or alloy including the element, but may not be limited thereto.

In an exemplary embodiment of the present disclosure, the particles encapsulated by each of the hollow internal compartments are nanoparticles or subnano particles, and a size of the particles may be from an atom size level to about 1 μm, but may not be limited thereto. For example, a size of the particles may be about 1,000 nm or less, about 100 nm or less, about 10 nm or less, or about 1 nm or less, and specifically, a size of the particles may be about 1,000 nm or less, about 500 nm or less, about 100 nm or less, about 10 nm or less, about 5 nm or less, about 1 nm or less, about 1 nm to about 1,000 nm or less, from about 1 nm to about 950 nm, from about 1 nm to about 900 nm, from about 1 nm to about 850 nm, from about 1 nm to about 800 nm, from about 1 nm to about 750 nm, from about 1 nm to about 700 nm, from about 1 nm to about 650 nm, from about 1 nm to about 600 nm, from about 1 nm to about 550 nm, from about 1 nm to about 500 nm, from about 1 nm to about 450 nm, from about 1 nm to about 400 nm, from about 1 nm to about 350 nm, from about 1 nm to about 300 nm, from about 1 nm to about 250 nm, from about 1 nm to about 200 nm, from about 1 nm to about 150 nm, from about 1 nm to about 100 nm, from about 1 nm to about 50 nm, from about 1 nm to about 30 nm, from about 1 nm to about 10 nm, from about 1 nm to about 5 nm, from about 10 nm to about 1,000 nm, from about 10 nm to about 950 nm, from about 10 nm to about 900 nm, from about 10 nm to about 850 nm, from about 10 nm to about 800 nm, from about 10 nm to about 750 nm, from about 10 nm to about 700 nm, from about 10 nm to about 650 nm, from about 10 nm to about 600 nm, from about 10 nm to about 550 nm, from about 10 nm to about 500 nm, from about 10 nm to about 450 nm, from about 10 nm to about 400 nm, from about 10 nm to about 350 nm, from about 10 nm to about 300 nm, from about 10 nm to about 250 nm, from about 10 nm to about 200 nm, from about 10 nm to about 150 nm, from about 10 nm to about 100 nm, from about 10 nm to about 50 nm, or from about 10 nm to about 30 nm, but may not be limited thereto.

In an exemplary embodiment of the present disclosure, a size of the hollow internal compartments may be about 100 μm or less, but may not be limited thereto. For example, a size of the hollow internal compartments may be about 100 μm or less, about 10 μm or less, about 1 μm or less, about 800 nm or less, about 600 nm or less, about 500 nm or less, about 400 nm or less, about 300 nm or less, about 200 nm or less, about 100 nm or less, about 50 nm or less, about 10 nm or less, from about 10 nm to about 100 μm, from about 10 nm to about 50 μm, from about 10 nm to about 10 μm, from about 10 nm to about 1 μm, from about 10 nm to about 500 nm, from about 10 nm to about 100 nm, from about 100 nm to about 100 μm, from about 100 nm to about 50 μm, from about 100 nm to about 10 μm, from about 100 nm to about 1 μm, from about 100 nm to about 500 nm, from about 100 nm to about 400 nm, from about 100 nm to about 300 nm, or from about 100 nm to about 200 nm, but may not be limited thereto.

In an exemplary embodiment of the present disclosure, a cross-sectional shape of the hollow may include a circular shape, an elliptical shape, a polygonal shape, or a combination thereof, but may not be limited thereto.

In an exemplary embodiment of the present disclosure, the one or more open porous channels may have mesoporosity, but may not be limited thereto.

In an exemplary embodiment of the present disclosure, a thickness of the wall of the carbonaceous structure may be about 1 μm or less, but may not be limited thereto. For example, a thickness of the wall of the carbonaceous structure may be about 1 μm or less, about 800 nm or less, about 600 nm or less, about 500 nm or less, about 400 nm or less, about 300 nm or less, about 200 nm or less, about 100 nm or less, about 50 nm or less, about 10 nm or less, from about 1 nm to about 1,000 nm, from about 1 nm to about 900 nm, from about 1 nm to about 800 nm, from about 1 nm to about 700 nm, from about 1 nm to about 600 nm, from about 1 nm to about 500 nm, from about 1 nm to about 400 nm, from about 1 nm to about 300 nm, from about 1 nm to about 200 nm, from about 1 nm to about 100 nm, from about 1 nm to about 50 nm, from about 1 nm to about 10 nm, from about 10 nm to about 1,000 nm, from about 10 nm to about 900 nm, from about 10 nm to about 800 nm, from about 10 nm to about 700 nm, or from about 10 nm to about 600 nm, from about 10 nm to about 500 nm, from about 10 nm to about 400 nm, from about 10 nm to about 300 nm, from about 10 nm to about 200 nm, from about 10 nm to about 100 nm, from about 50 nm to about 1,000 nm, from about 50 nm to about 900 nm, from about 50 nm to about 800 nm, from about 50 nm to about 700 nm, or from about 50 nm to about 600 nm, from about 50 nm to about 500 nm, from about 50 nm to about 400 nm, from about 50 nm to about 300 nm, from about 50 nm to about 200 nm, from about 50 nm to about 100 nm, from about 100 nm to about 1,000 nm, from about 100 nm to about 900 nm, from about 100 nm to about 800 nm, from about 100 nm to about 700 nm, or from about 100 nm to about 600 nm, from about 100 nm to about 500 nm, from about 100 nm to about 400 nm, from about 100 nm to about 300 nm, or from about 100 nm to about 200 nm, but may not be limited thereto.

The carbonaceous structure in accordance with an exemplary embodiment of the present disclosure may have a uniform size, but may not be limited thereto.

In an exemplary embodiment of the present disclosure, the one or more open porous channels may have a size (thickness) of about 10 nm or less, but may not be limited thereto. For example, the one or more open porous channels may have a size (thickness) of about 10 nm or less, about 5 nm or less, about 3 nm or less, about 1 nm or less, from about 0.1 nm to about 10 nm, from about 0.1 nm to about 8 nm, from about 0.1 nm to about 6 nm, from about 0.1 nm to about 4 nm, from about 0.1 nm to about 2 nm, from about 0.1 nm to about 1 nm, from about 1 nm to about 10 nm, from about 1 nm to about 8 nm, from about 1 nm to about 6 nm, from about 1 nm to about 4 nm, or from about 1 nm to about 2 nm, but may not be limited thereto.

In an exemplary embodiment of the present disclosure, a content of the element of Group 15 of the Periodic Table included in the carbonaceous matrix may be about 50 weight parts or less with respect to 100 weight parts of the carbonaceous structure, but may not be limited thereto. For example, a content of the element of Group 15 of the Periodic Table included in the carbonaceous matrix may be about 50 weight parts or less, about 40 weight parts or less, about 30 weight parts or less, about 20 weight parts or less, about 10 weight parts or less, from about 1 weight part to about 50 weight parts, from about 1 weight part to about 40 weight parts, from about 1 weight part to about 30 weight parts, from about 1 weight part to about 20 weight parts, from about 1 weight part to about 10 weight parts, from about 10 weight parts to about 50 weight parts, from about 10 weight parts to about 40 weight parts, from about 10 weight parts to about 30 weight parts, or from about 10 weight parts to about 20 weight parts with respect to 100 weight parts of the carbonaceous structure, but may not be limited thereto.

In an exemplary embodiment of the present disclosure, the carbonaceous structure may have a specific surface area in a range of from about 10 m$^2$ g$^{-1}$ to about 4,000 m$^2$ g$^{-1}$, but may not be limited thereto. For example, the carbonaceous structure may have a specific surface area in a range of from about 10 m$^2$ g$^{-1}$ to about 4,000 m$^2$ g$^{-1}$, from about 10 m$^2$ g$^{-1}$ to about 3,000 m$^2$ g$^{-1}$, from about 10 m$^2$ g$^{-1}$ to about 2,000 m$^2$ g$^{-1}$, from about 10 m$^2$ g$^{-1}$ to about 1,000 m$^2$ g$^{-1}$, from about 10 m$^2$ g$^{-1}$ to about 500 m$^2$ g$^{-1}$, from about 100 m$^2$ g$^{-1}$ to about 4,000 m$^2$ g$^{-1}$, from about 100 m$^2$ g$^{-1}$ to about 3,000 m$^2$ g$^{-1}$, from about 100 m$^2$ g$^{-1}$ to about 2,000 m$^2$ g$^{-1}$, from about 100 m$^2$ g$^{-1}$ to about 1,000 m$^2$ g$^{-1}$, or from about 100 m$^2$ g$^{-1}$ to about 500 m$^2$ g$^{-1}$, but may not be limited thereto.

In an exemplary embodiment of the present disclosure, the carbonaceous structure may have a shape of a spherical particle, an ellipse particle, a polyhedron, a nanotube, a nanorod, a nanobelt, a nanopillar, a nanosphere, a nanoplate, a nanocube, or a nanopolyhedron, but may not be limited thereto. For example, the carbonaceous structure may have a shape of a spherical nanoparticle, an ellipse nanoparticle, a nanopolyhedron, a nanotube, a nanorod, a nanobelt, a nanopillar, a nanosphere, a nanoplate, a nanocube, or a nanopolyhedron, but may not be limited thereto.

Figure 17:
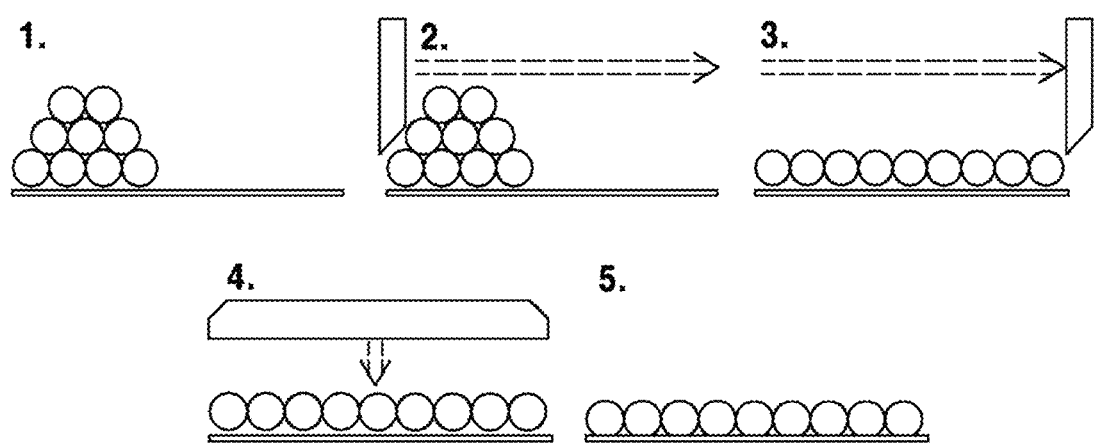
FIG. 17 is a schematic diagram illustrating a process of preparing an electrode material including a carbonaceous structure in accordance with an exemplary embodiment of the present disclosure.

An electrode may be manufactured by coating and stamping an electrode material including the carbonaceous structure according to an exemplary embodiment of the present disclosure on an electricity collector, but may not be limited thereto (see FIG. 17).

In an exemplary embodiment of the present disclosure, the electrode material may be used as an anode and/or a cathode, but may not be limited thereto.

The carbonaceous structure in accordance with an exemplary embodiment of the present disclosure may have a uniform size, and, thus, an electrode can be uniformly manufactured.

The carbonaceous structure included in the electrode material according to an exemplary embodiment of the present disclosure has a high specific surface area and a high porosity and is uniform in shape, and includes one or more hollow internal compartments, and each of the hollow internal compartments is connected through to outside and to the one or more hollow internal compartments adjacent thereto through one or more open porous channels formed in the carbonaceous structure and the carbonaceous structure includes a carbonaceous matrix and thus facilitates penetration and encapsulation of ions or particles (for non-limiting example, nanoparticles or subnano particles).

During penetration and encapsulation of particles (for non-limiting example, nanoparticles or subnano particles) in the carbonaceous structure included in the electrode material according to an exemplary embodiment of the present disclosure, the particles can be uniformly dispersed and encapsulated since the carbonaceous structure has a high specific surface area and a high porosity due to the one or more hollow internal compartments and the one or more open porous channels, and, thus, agglomeration of the particles, nanoparticles or subnano particles in the carbonaceous structure can be suppressed and the utility of the electrode material can be increased.

The carbonaceous structure included in the electrode material according to an exemplary embodiment of the present disclosure undergoes a volume change when the particles encapsulated by the carbonaceous structure make alloying/dealloying reactions with another metal having active reactivity, but the one or more hollow internal compartments of the carbonaceous structure and the one or more open porous channels can accommodate the volume change and thus increase the utility of the electrode material.

The particles (for non-limiting example, nanoparticles or subnano particles) encapsulated in the carbonaceous structure included in the electrode material according to an exemplary embodiment of the present disclosure can provide additional active sites in the structure when the electrode material is prepared.

The carbonaceous structure according to an exemplary embodiment of the present disclosure has a high specific surface area and a high porosity, and, thus, when the carbonaceous structure is used as the electrode material of an energy storage device, the carbonaceous structure is applied with a very small stress/strain despite repeated charge/discharge cycles and can thus maintain the structure. Therefore, a charge/discharge capacity ratio can be maintained for a long time and high-speed charging of the energy storage device can be achieved in a short time.

The carbonaceous structure included in the electrode material according to an exemplary embodiment of the present disclosure has a high specific surface area and a high porosity, and, thus, when the carbonaceous structure is used as an electrode material of the energy storage device, the energy storage device has advantages of rapid movement and storage, excellent reversibility, facile adsorption/desorption of ions and also includes many active sites. Therefore, it is possible to realize a high energy density, a high power density, and an excellent charge/discharge capacity ratio.

According to a third aspect of the present disclosure, there is provided an energy storage device, including an electrode material according to the second aspect, wherein the electrode material includes a carbonaceous structure including one or more hollow internal compartments, each of the hollow internal compartments is connected through to outside and to the one or more hollow internal compartments adjacent thereto through one or more open porous channels formed in the carbonaceous structure, and the carbonaceous structure includes a carbonaceous matrix.

All the descriptions of the carbonaceous structure according to the first aspect of the present disclosure and the electrode material according to the second aspect of the present disclosure can be applied to the energy storage device according to the present aspect even though they are omitted hereinafter.

In an exemplary embodiment of the present disclosure, the one or more open porous channels in the carbonaceous structure may be formed by penetrating a wall of the carbonaceous structure, but may not be limited thereto.

In an exemplary embodiment of the present disclosure, the electrode material may be used as an anode and/or a cathode in the energy storage device, but may not be limited thereto.

In an exemplary embodiment of the present disclosure, the carbonaceous matrix included in the electrode material may further include an element of Group 15 of the Periodic Table, but may not be limited thereto. For example, the carbonaceous matrix may further include an element of N, P, As, Sb, or Bi, but may not be limited thereto.

In an exemplary embodiment of the present disclosure, the electrode material may be used as a cathode in the energy storage device including the element of Group 15 of the Periodic Table, but may not be limited thereto.

In an exemplary embodiment of the present disclosure, the element of Group 15 of the Periodic Table included in the carbonaceous matrix constituting the wall of the carbonaceous structure may be dispersed in the carbonaceous matrix and/or a surface of the carbonaceous structure, and at least a part of the element of Group 15 of the Periodic Table may form chemical active species and/or defects. Therefore, when a precursor for forming the particles is injected into the carbonaceous structure to encapsulate the particles in the one or more hollow internal compartments, a site of the element of Group 15 of the Periodic Table may act as a seed for forming the particles and thus facilitate the formation of the particles (nanoparticles). Further, the chemical active species and/or defects including the element of Group 15 of the Periodic Table may be helpful in storing various ions in the one or more hollow internal compartments.

For example, if the element of Group 15 of the Periodic Table is nitrogen (N), when the nitrogen element is inserted into the carbonaceous structure, a large number of C—N structures such as pyridine, pyridone, and pyrrole may be formed and it is known that defects (twisted plate-shaped aromatic structures) formed at that time may be helpful in storing various ions, and when the precursor for forming the particles is introduced to encapsulate the particles in the one or more hollow internal compartments, the particles (nanoparticles) may be readily formed at a site where nitrogen is located in the carbonaceous structure.

In an exemplary embodiment of the present disclosure, the carbonaceous structure included in the electrode material may further include one or more particles encapsulated by each of the hollow internal compartments, but may not be limited thereto. In an exemplary embodiment of the present disclosure, the particles may be dispersed on a surface of the one or more hollow internal compartments, and the particles may be dispersed in the carbonaceous matrix of the carbonaceous structure, but may not be limited thereto.

In an exemplary embodiment of the present disclosure, the particles may be semiconductive or conductive, but may not be limited thereto.

In an exemplary embodiment of the present disclosure, the particles may include one or more elements selected from the group consisting of Si, Fe, Ni, Co, Al, Ge, Sn, Mn, Ti, V, Cu, Zn, W, Ag, Pt, Ga, P, Au, Sb, Te, Pb, Bi, Cd, and S, but may not be limited thereto. For example, the particles may include the element or a compound or alloy including the element, but may not be limited thereto.

In an exemplary embodiment of the present disclosure, the electrode material including the one or more particles including one or more elements selected from the group consisting of Si, Fe, Ni, Co, Al, Ge, Sn, Mn, Ti, V, Cu, Zn, W, Ag, Pt, Ga, P, Au, Sb, Te, Pb, Bi, and Cd may be used as an anode, but may not be limited thereto. For example, the particles may include the element or a compound or alloy including the element, but may not be limited thereto.

In an exemplary embodiment of the present disclosure, the electrode material including S as the one or more particles may be used as a cathode, but may not be limited thereto.

In an exemplary embodiment of the present disclosure, the particles may be alloyed with another metal element which can be used as an electrode material, but may not be limited thereto.

In an exemplary embodiment of the present disclosure, the particles encapsulated by each of the hollow internal compartments are nanoparticles or subnano particles, and a size of the particles may be from an atom size level to about 1 μm, but may not be limited thereto. For example, a size of the particles may be about 1,000 nm, about 100 nm or less, about 10 nm or less, or about 1 nm or less, but may not be limited thereto. For example, a size of the particles may be about 1,000 nm or less, about 500 nm or less, about 100 nm or less, about 10 nm or less, about 5 nm or less, about 1 nm or less, from about 1 nm to about 1,000 nm, from about 1 nm to about 950 nm, from about 1 nm to about 900 nm, from about 1 nm to about 850 nm, from about 1 nm to about 800 nm, from about 1 nm to about 750 nm, from about 1 nm to about 700 nm, from about 1 nm to about 650 nm, from about 1 nm to about 600 nm, from about 1 nm to about 550 nm, from about 1 nm to about 500 nm, from about 1 nm to about 450 nm, from about 1 nm to about 400 nm, from about 1 nm to about 350 nm, from about 1 nm to about 300 nm, from about 1 nm to about 250 nm, from about 1 nm to about 200 nm, from about 1 nm to about 150 nm, from about 1 nm to about 100 nm, from about 1 nm to about 50 nm, from about 1 nm to about 30 nm, from about 1 nm to about 10 nm, from about 1 nm to about 5 nm, from about 10 nm to about 1,000 nm, from about 10 nm to about 950 nm, from about 10 nm to about 900 nm, from about 10 nm to about 850 nm, from about 10 nm to about 800 nm, from about 10 nm to about 750 nm, from about 10 nm to about 700 nm, from about 10 nm to about 650 nm, from about 10 nm to about 600 nm, from about 10 nm to about 550 nm, from about 10 nm to about 500 nm, from about 10 nm to about 450 nm, from about 10 nm to about 400 nm, from about 10 nm to about 350 nm, from about 10 nm to about 300 nm, from about 10 nm to about 250 nm, from about 10 nm to about 200 nm, from about 10 nm to about 150 nm, from about 10 nm to about 100 nm, from about 10 nm to about 50 nm, or from about 10 nm to about 30 nm, but may not be limited thereto.

In an exemplary embodiment of the present disclosure, the particles may be dispersed on a surface of the one or more hollow internal compartments, and the particles may be dispersed in the carbonaceous matrix of the carbonaceous structure, but may not be limited thereto.

In an exemplary embodiment of the present disclosure, a size of the hollow internal compartments may be about 100 μm or less, but may not be limited thereto. For example, a size of the hollow internal compartments may be about 100 μm or less, about 10 μm or less, about 1 μm or less, about 800 nm or less, about 600 nm or less, about 500 nm or less, about 400 nm or less, about 300 nm or less, about 200 nm or less, about 100 nm or less, about 50 nm or less, about 10 nm or less, from about 10 nm to about 100 μm, from about 10 nm to about 50 μm, from about 10 nm to about 10 μm, from about 10 nm to about 1 μm, from about 10 nm to about 500 nm, from about 10 nm to about 100 nm, from about 100 nm to about 100 μm, from about 100 nm to about 50 μm, from about 100 nm to about 10 μm, from about 100 nm to about 1 μm, from about 100 nm to about 500 nm, from about 100 nm to about 400 nm, from about 100 nm to about 300 nm, or from about 100 nm to about 200 nm, but may not be limited thereto.

In an exemplary embodiment of the present disclosure, a cross-sectional shape of the hollow may include a circular shape, an elliptical shape, a polygonal shape, or a combination thereof, but may not be limited thereto.

In an exemplary embodiment of the present disclosure, a thickness of the wall of the carbonaceous structure may be about 1 μm or less, but may not be limited thereto. For example, a thickness of the wall of the carbonaceous structure may be about 1 μm or less, about 800 nm or less, about 600 nm or less, about 500 nm or less, about 400 nm or less, about 300 nm or less, about 200 nm or less, about 100 nm or less, about 50 nm or less, about 10 nm or less, from about 1 nm to about 1,000 nm, from about 1 nm to about 900 nm, from about 1 nm to about 800 nm, from about 1 nm to about 700 nm, from about 1 nm to about 600 nm, from about 1 nm to about 500 nm, from about 1 nm to about 400 nm, from about 1 nm to about 300 nm, from about 1 nm to about 200 nm, from about 1 nm to about 100 nm, from about 1 nm to about 50 nm, from about 1 nm to about 10 nm, from about 10 nm to about 1,000 nm, from about 10 nm to about 900 nm, from about 10 nm to about 800 nm, from about 10 nm to about 700 nm, or from about 10 nm to about 600 nm, from about 10 nm to about 500 nm, from about 10 nm to about 400 nm, from about 10 nm to about 300 nm, from about 10 nm to about 200 nm, from about 10 nm to about 100 nm, from about 50 nm to about 1,000 nm, from about 50 nm to about 900 nm, from about 50 nm to about 800 nm, from about 50 nm to about 700 nm, or from about 50 nm to about 600 nm, from about 50 nm to about 500 nm, from about 50 nm to about 400 nm, from about 50 nm to about 300 nm, from about 50 nm to about 200 nm, from about 50 nm to about 100 nm, from about 100 nm to about 1,000 nm, from about 100 nm to about 900 nm, from about 100 nm to about 800 nm, from about 100 nm to about 700 nm, or from about 100 nm to about 600 nm, from about 100 nm to about 500 nm, from about 100 nm to about 400 nm, from about 100 nm to about 300 nm, or from about 100 nm to about 200 nm, but may not be limited thereto.

The carbonaceous structure in accordance with an exemplary embodiment of the present disclosure may have a uniform size, but may not be limited thereto.

In an exemplary embodiment of the present disclosure, the one or more open porous channels may have mesoporosity, but may not be limited thereto.

In an exemplary embodiment of the present disclosure, a diameter of the one or more open porous channels may be about 10 nm or less, but may not be limited thereto. For example, a diameter of the one or more open porous channels may be about 10 nm or less, about 5 nm or less, about 3 nm or less, about 1 nm or less, from about 0.1 nm to about 10 nm, from about 0.1 nm to about 8 nm, from about 0.1 nm to about 6 nm, from about 0.1 nm to about 4 nm, from about 0.1 nm to about 2 nm, from about 0.1 nm to about 1 nm, from about 1 nm to about 10 nm, from about 1 nm to about 8 nm, from about 1 nm to about 6 nm, from about 1 nm to about 4 nm, or from about 1 nm to about 2 nm, but may not be limited thereto.

In an exemplary embodiment of the present disclosure, a content of the element of Group 15 of the Periodic Table included in the carbonaceous matrix may be about 50 weight parts or less with respect to 100 weight parts of the carbonaceous structure, but may not be limited thereto. For example, a content of the element of Group 15 of the Periodic Table included in the carbonaceous matrix may be about 50 weight parts or less, about 40 weight parts or less, about 30 weight parts or less, about 20 weight parts or less, about 10 weight parts or less, from about 1 weight part to about 50 weight parts, from about 1 weight part to about 40 weight parts, from about 1 weight part to about 30 weight parts, from about 1 weight part to about 20 weight parts, from about 1 weight part to about 10 weight parts, from about 5 weight parts to about 10 weight parts, from about 10 weight parts to about 50 weight parts, from about 10 weight parts to about 40 weight parts, from about 10 weight parts to about 30 weight parts, or from about 10 weight parts to about 20 weight parts with respect to 100 weight parts of the carbonaceous structure, but may not be limited thereto.

In an exemplary embodiment of the present disclosure, the energy storage device may be a battery, a capacitor, or a battery-capacitor hybrid, but may not be limited thereto.

In an exemplary embodiment of the present disclosure, the energy storage device may be a lithium ion battery, a sodium ion battery, a lithium air battery, a sodium air battery, a lithium metal battery, a sodium metal battery, a lithium ion hybrid capacitor, or a sodium ion hybrid capacitor, but may not be limited thereto.

The energy storage device according to an exemplary embodiment of the present disclosure may include the electrode material as an anode and/or a cathode and may also include an electrolyte, but may not be limited thereto.

If the energy storage device according to an exemplary embodiment of the present disclosure includes the electrode material as an anode and/or a cathode, the anode and/or the cathode may be formed by the method known in the art in which the carbonaceous structure is coated or pasted on metal foil such as Cu foil, but may not be limited thereto.

The energy storage device according to an exemplary embodiment of the present disclosure may include the electrode material as an anode and/or a cathode and may also include an electrolyte and a separator, but may not be limited thereto. The electrolyte and the separator may be appropriately selected by those skilled in the art from among those known in the art and may be used without particular limitations.

For example, the separator is a component typically used in a lithium ion battery, a lithium ion hybrid capacitor, and the like and configured to separate the cathode and the anode to suppress an electric contact between the electrodes, and needs to be thin and have high intensity, ion permeability, and current breaking characteristics for stability of the battery. The separator may be located between the anode and the cathode to suppress a short circuit, and any separator typically used in the art can be used without particular limitations. A main material of the separator may be, for example, a PE, PP, PE/PP laminated structure or a PE/PP phase separation structure, but may not be limited thereto. For example, the separator may be a porous polymer membrane which may be provided as a conduit for lithium ions moving back and forth between the electrodes. The cathode, the anode, and the separator may form "a battery stack" together. The battery stack and the electrolyte are air-tightly sealed in a metallic battery casing, which enables a contact with an external circuit.

For example, the electrode material includes cathode active materials and anode active materials and may be selected on the basis of compatibility of a combination thereof known in the art with the selected electrolyte. For example, a cathode active material suitable for the energy storage device such as a lithium ion battery and a lithium ion hybrid capacitor may include a member selected from the group consisting of $LiCoO_2$, $LiMn_2O_4$, $LiFePO_4$, $Li_{1-x}Fe_xPO_4$ ($0 \leq x \leq 1$), $Li[Mn_{2-x}M_x]O_4$ (M=Co, Ni, Cr, Al, Mg, $0 \leq x \leq 0.1$), $Li_aCoM_aO_2$, $Li_{1-b}CoM'_yO_2$ (M and M' represent W, Mo, Zr, Ti, Mg, Ta, Al, Fe, V, Cr, and/or Nb; $1 \leq a \leq 1.2$, $0 < b \leq 0.05$, $0 \leq x \leq 0.02$ and $0 \leq y \leq 0.02$), $LiNiO_2$, $LiNiMnCoO_2$, $Li_2FePO_4F$, $LiCo_{0.33}Ni_{0.33}Mn_{0.33}O_2$, $Li(Li_aNi_x$-

$Mn_yCo_z)O_2$ (also known as NMC), $LiNiCoAlO_2$, $Li_4Ti_5O_{12}$, $Li_3V_2(PO_4)_3$, and combinations thereof, but may not be limited thereto. For example, the active materials may be used in the form of a suspension of nanoparticles having an average particle size (e.g., diameter) in a range of from about 10 nm to about 1000 nm, but may not be limited thereto, and some of these materials are commercially available in a proper size range.

For example, the electrolyte is a component that facilitates ion exchange between the anode and the cathode, and in recent years, ionic liquid electrolytes or gel polymer electrolytes with low volatility and inflammability have been mainly used, but the electrolyte may not be limited thereto. Specifically, the electrolyte may include an organic solvent and a lithium salt. The organic solvent may be used without particular limitations as long as it acts as a medium in which ions involved in electrochemical reactions of the battery can move. Specifically, the organic solvent may include ester-based solvents such as methyl acetate, ethyl acetate, butyrolactone, and caprolactone; ether-based solvents such as dibutyl ether or tetrahydrofuran; ketone-based solvents such as cyclohexanone; aromatic hydrocarbon-based solvents such as benzene and fluorobenzene; carbonate-based solvents such as dimethylcarbonate (DMC), diethylcarbonate (DEC), methylethylcarbonate (MEC), ethylmethylcarbonate (EMC), ethylene carbonate (EC), and propylene carbonate (PC); alcohol-based solvents such as ethyl alcohol and isopropyl alcohol; nitriles such as R—CN (herein, R is a $C_2$ to $C_{20}$ linear, branched, or cyclic hydrocarbon group and may include a double bond direction ring or an ether bond); amides such as dimethyl formamide and the like; dioxolanes such as 1,3-dioxolane and the like; or sulfolanes. Particularly, the carbonate-based solvents are preferable and a mixture of cyclic carbonate (e.g., ethylene carbonate or propylene carbonate) having a high ion conductivity and a high dielectric constant and capable of improving the charge/discharge performance of the battery and a low-viscosity linear carbonate-based compound (e.g., ethylmethylcarbonate, dimethylcarbonate, or diethylcarbonate) is more preferable. In this case, when the cyclic carbonate and the chain carbonate are mixed at a volume ratio of from about 1:1 to about 1:9, the electrolyte shows the excellent performance.

The lithium salt may be used without particular limitations as long as it is a compound capable of supplying lithium ions to be used in the lithium ion battery. Specifically, the lithium salt may include $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$.

For example, a liquid electrolyte may include $LiPF_6$-EC/DEC, a solid polymer electrolyte may include $LiBF_4$+PEO, a gel polymer electrolyte may include $LiPF_6$-EC/DMC+PVdF-HFP, and an ionic liquid electrolyte may include LiTFSI-EMITFSI, but may not be limited thereto.

The carbonaceous structure according to an exemplary embodiment of the present disclosure has a high specific surface area and a high porosity, and, thus, when the carbonaceous structure is used as an electrode material of the energy storage device, the energy storage device has advantages of facile movement and storage of ions and also includes many active sites. Therefore, it is possible to realize a high energy density, a high power density, and an excellent charge/discharge capacity ratio.

The carbonaceous structure included in the electrode material according to an exemplary embodiment of the present disclosure has a high specific surface area and a high porosity and is uniform in shape, and includes one or more hollow internal compartments, and each of the hollow internal compartments is connected through to outside and to the one or more hollow internal compartments adjacent thereto through one or more open porous channels formed in the carbonaceous structure and the carbonaceous structure includes a carbonaceous matrix and thus facilitates penetration and encapsulation of ions or particles (for non-limiting example, nanoparticles or subnano particles).

During penetration and encapsulation of particles (for non-limiting example, nanoparticles or subnano particles) in the carbonaceous structure included in the electrode material according to an exemplary embodiment of the present disclosure, the particles can be uniformly dispersed and encapsulated since the carbonaceous structure has a high specific surface area and a high porosity due to the one or more hollow internal compartments and the one or more open porous channels, and, thus, agglomeration of the particles, nanoparticles or subnano particles in the carbonaceous structure can be suppressed and the utility of the electrode material can be increased.

The carbonaceous structure included in the electrode material according to an exemplary embodiment of the present disclosure undergoes a volume change when the particles encapsulated in the carbonaceous structure make alloying/dealloying reactions with another metal having active reactivity, but the one or more hollow internal compartments of the carbonaceous structure and the one or more open porous channels can accommodate the volume change and thus increase the utility of the electrode material.

The particles (for non-limiting example, nanoparticles or subnano particles) included in the electrode material according to an exemplary embodiment of the present disclosure can provide additional active sites in the structure when the electrode material is prepared.

The carbonaceous structure according to an exemplary embodiment of the present disclosure has a high specific surface area and a high porosity, and, thus, when the carbonaceous structure is used as an electrode material of the energy storage device, the structure is applied with a very small stress/strain despite repeated cycles and can thus maintain the structure. Therefore, a charge/discharge capacity ratio can be maintained and high-speed charging of the energy storage device can be achieved in a short time.

The carbonaceous structure according to an exemplary embodiment of the present disclosure has a high specific surface area and a high porosity, and, thus, when the carbonaceous structure is used as an electrode material of the energy storage device, the energy storage device has advantages of rapid movement and storage, excellent reversibility, facile adsorption/desorption of ions and also includes many active sites. Therefore, it is possible to realize a high energy density, a high power density, and an excellent charge/discharge capacity ratio.

According to a fourth aspect of the present disclosure, there is provided a method for preparing a carbonaceous structure, including: injecting a solution containing a carbon precursor and a soft template to a hard template, and then carbonizing the carbon precursor, and removing the soft template and the hard template to obtain a carbonaceous structure including one or more hollow internal compartments, wherein the carbonaceous structure includes a carbonaceous matrix formed by the carbonization of the carbon precursor, and each of the hollow internal compartments is connected through to outside and to the one or more hollow internal compartments adjacent thereto through one or more open porous channels which are formed in the carbonaceous structure by the removal of the soft template.

In an exemplary embodiment of the present disclosure, the particles encapsulated by each of the hollow internal compartments are nanoparticles or subnano particles, and a size of the particles may be from an atom size level to about 1 μm, but may not be limited thereto. For example, a size of the particles may be about 1,000 nm or less, about 100 nm or less, about 10 nm or less, or about 1 nm or less, but may not be limited thereto. For example, a size of the particles may be about 1,000 nm or less, about 500 nm or less, about 100 nm or less, about 10 nm or less, about 5 nm or less, about 1 nm or less, from about 1 nm to about 1,000 nm, from about 1 nm to about 950 nm, from about 1 nm to about 900 nm, from about 1 nm to about 850 nm, from about 1 nm to about 800 nm, from about 1 nm to about 750 nm, from about 1 nm to about 700 nm, from about 1 nm to about 650 nm, from about 1 nm to about 600 nm, from about 1 nm to about 550 nm, from about 1 nm to about 500 nm, from about 1 nm to about 450 nm, from about 1 nm to about 400 nm, from about 1 nm to about 350 nm, from about 1 nm to about 300 nm, from about 1 nm to about 250 nm, from about 1 nm to about 200 nm, from about 1 nm to about 150 nm, from about 1 nm to about 100 nm, from about 1 nm to about 50 nm, from about 1 nm to about 30 nm, from about 1 nm to about 10 nm, from about 1 nm to about 5 nm, from about 10 nm to about 1,000 nm, from about 10 nm to about 950 nm, from about 10 nm to about 900 nm, from about 10 nm to about 850 nm, from about 10 nm to about 800 nm, from about 10 nm to about 750 nm, from about 10 nm to about 700 nm, from about 10 nm to about 650 nm, from about 10 nm to about 600 nm, from about 10 nm to about 550 nm, from about 10 nm to about 500 nm, from about 10 nm to about 450 nm, from about 10 nm to about 400 nm, from about 10 nm to about 350 nm, from about 10 nm to about 300 nm, from about 10 nm to about 250 nm, from about 10 nm to about 200 nm, from about 10 nm to about 150 nm, from about 10 nm to about 100 nm, from about 10 nm to about 50 nm, or from about 10 nm to about 30 nm, but may not be limited thereto.

In an exemplary embodiment of the present disclosure, the particles may be dispersed on a surface of the one or more hollow internal compartments, and the particles may be dispersed in the carbonaceous matrix of the carbonaceous structure, but may not be limited thereto.

The carbonaceous structure according to an exemplary embodiment of the present disclosure has a high specific surface area and a high porosity and is uniform in shape. The carbonaceous structure according to an exemplary embodiment of the present disclosure includes one or more hollow internal compartments, and each of the hollow internal compartments is connected through to outside and to the one or more hollow internal compartments adjacent thereto through one or more open porous channels formed in the carbonaceous structure and the carbonaceous structure includes a carbonaceous matrix and thus facilitates penetration and encapsulation of ions or particles (for non-limiting example, nanoparticles or subnano particles). The carbonaceous structure according to an exemplary embodiment of the present disclosure can adjust a size of the open porous channels included therein and a thickness of a wall of the carbonaceous structure to the scale of nanometers, and, thus, the carbonaceous structure may be formed as a carbonaceous nanostructure.

In an exemplary embodiment of the present disclosure, the carbonizing of the carbon precursor and removing of the soft template may be performed via a heat treatment, but may not be limited thereto.

In an exemplary embodiment of the present disclosure, the heat treatment may be performed under an inert or reducing atmosphere. For example, the reducing atmosphere may include hydrogen and/or an inert gas (gas including He, Ar, or $N_2$ gas), but may not be limited thereto.

In an exemplary embodiment of the present disclosure, the heat treatment may be performed in a temperature range of from about 473 K to about 1373 K, but may not be limited thereto. For example, the heat treatment may be performed in a temperature range of from about 473 K to about 1373 K, from about 473 K to about 1273 K, from about 473 K to about 1173 K, from about 473 K to about 1073 K, from about 473 K to about 973 K, from about 473 K to about 873 K, from about 473 K to about 773 K, from about 473 K to about 673 K, or from about 473 K to about 573 K, but may not be limited thereto.

In an exemplary embodiment of the present disclosure, the hard template may be removed by immersing the carbonaceous structure obtained after the heat treatment in an alkaline solution, but may not be limited thereto.

In an exemplary embodiment of the present disclosure, the method for preparing a carbonaceous structure may further include performing a secondary heat treatment to the carbonaceous structure obtained after the removal of the hard template, but may not be limited thereto. For example, the secondary heat treatment may be performed in a temperature range of from about 400 K to about 1200 K, but may not be limited thereto, and specifically, the secondary heat treatment may be performed in a temperature range of from about 400 K to about 1200 K, from about 500 K to about 1200 K, from about 600 K to about 1200 K, from about 700 K to about 1200 K, from about 800 K to about 1200 K, from about 1000 K to about 1200 K, from about 400 K to about 1000 K, from about 600 K to about 1000 K, from about 800 K to about 1000 K, from about 400 K to about 800 K, from about 600 K to about 800 K, or from about 400 K to about 600 K, but may not be limited thereto.

In an exemplary embodiment of the present disclosure, the secondary heat treatment may be performed under a reducing atmosphere including hydrogen and/or an inert gas (gas including He, Ar, or $N_2$ gas). The carbonaceous structure may be further improved in surface area and increased in intensity by the secondary heat treatment, but may not be limited thereto. As a part of the carbonaceous structure is degraded by the secondary heat treatment, pores in the structure can be extended and added and impurities such as moisture present in the pores are expected to be removed. The high-temperature heat treatment may improve the crystallinity (ratio of the G-peak in a Raman spectrum of an aromatic ring) of the carbonaceous structure, but the present disclosure may not be limited thereto.

In an exemplary embodiment of the present disclosure, the carbon precursor is not particularly limited as long as it is a material which can be converted into a carbonaceous material or a carbonaceous matrix via carbonization, and may include, for example, hydrocarbon-based polymer materials or resins. For example, the carbon precursor may include polymer materials such as polycarbonate, polystyrene, polyethylene, polypropylene, or polymethylmethacrylate or resins such as resorcinol formaldehyde resin, but may not be limited thereto, and various carbon precursors known in the art may be used by those skilled in the art without particular limitations.

In an exemplary embodiment of the present disclosure, the carbon precursor may further include an element of Group 15 of the Periodic Table, and in this case, the carbon precursor may be carbonized by the heat treatment to form the carbonaceous matrix including the element of Group 15 of the Periodic Table, but may not be limited thereto. For example, the element of Group 15 of the Periodic Table may include an element of N, P, As, Sb, or Bi, but may not be limited thereto.

In an exemplary embodiment of the present disclosure, the carbon precursor may further include an element of Group 15 of the Periodic Table besides carbon element, and may further include an element of, e.g., N, P, As, Sb, or Bi. For example, the carbon precursor may include nitrogen-containing resins or nitrogen-containing polymers, and the nitrogen-containing resins may include one or more members selected from the group consisting of melamine formaldehyde resin, nylon, polycarbonate, methyl methacrylate, ABS, and urea formaldehyde resin, but may not be limited thereto.

In an exemplary embodiment of the present disclosure, the soft template may be used without particular limitations as long as it can form micelles under conditions of the method for preparing a carbonaceous structure, and may include, for example, one or more members selected from the group consisting of a surfactant, sulfur, water, and an oil, but may not be limited thereto. The surfactant may be used without particular limitations as long as it can form micelles under conditions of the method for preparing a carbonaceous structure, and may be appropriately selected by those skilled in the art from among surfactants known as being used as pore forming agents in the art and may be used without particular limitations. For example, the surfactant may use a non-ionic surfactant or amphoteric surfactant and may use a cationic surfactant or an anionic surfactant in some cases, but may not be limited thereto. For example, the non-ionic surfactant may include one or more members selected from the group consisting of aliphatic ($C_6$ to $C_{18}$) primary or secondary linear or branched acid, alcohol or phenol, alkyl ethoxylate, alkyl phenol alkoxylate, a block oxyalkylene condensate of alkyl phenol, an oxyalkylene condensate of alkanol, an oxyethylene/oxypropylene block copolymer, a semi-polar non-ionic material (for example, amine oxide and phosphine oxide), alkylamine oxide, mono or dialkyl alkanolamide, alkyl polysaccharide, sorbitan fatty acid ester, polyoxyethylene sorbitan fatty acid ester, polyoxyethylene sorbitol ester, polyoxyethylene nonylphenyl ether, polyoxyethylenic acid, polyoxyethylene alcohol, coco mono or diethanolamide, coco diglucoside, alkyl polyglucoside, cocamidopropyl, lauramine oxide, polysorbate 20, ethoxylated linear alcohol, cetearyl alcohol, lanolin alcohol, stearic acid, glyceryl stearate, PEG-100 stearate, Oleth 20 TX-100 (Trion X-100), Brij 56 ($C_{16}EO_{10}$), Brij 78 ($C_{18}EO_{20}$), Pluronic F127 ($EO_{106}PO_{70}EO_{106}$), and P123 ($EO_{20}PO_{70}EO_{20}$), but may not be limited thereto. For example, examples of the amphoteric surfactant may include cocamidopropyl betaine, cocamidopropyl hydroxyl sulfate, coco-betaine, sodium cocoamidoacetate, cocodimethyl betaine, N-coco-3-aminobutyric acid, and an imidazolinium carboxyl compound, but may not be limited thereto.

In the method for preparing a carbonaceous structure according to an exemplary embodiment of the present disclosure, each of the hollow internal compartments is connected through to outside and to the one or more hollow internal compartments adjacent thereto through one or more open porous channels which are formed in the carbonaceous structure by the removal of the soft template.

In an exemplary embodiment of the present disclosure, a specific surface area of the carbonaceous structure, a size of the hollow internal compartments, a size of the open porous channels and/or a thickness of the wall of the carbonaceous structure may be adjusted depending on the kind and/or amount of the soft template and/or a size of micelles formed by the soft template, but may not be limited thereto.

In an exemplary embodiment of the present disclosure, a size of the hollow internal compartments may be about 100 μm or less, but may not be limited thereto. For example, a size of the hollow internal compartments may be about 100 μm or less, about 10 μm or less, about 1 μm or less, about 800 nm or less, about 600 nm or less, about 500 nm or less, about 400 nm or less, about 300 nm or less, about 200 nm or less, about 100 nm or less, about 50 nm or less, about 10 nm or less, from about 10 nm to about 100 μm, from about 10 nm to about 50 μm, from about 10 nm to about 10 μm, from about 10 nm to about 1 μm, from about 10 nm to about 500 nm, from about 10 nm to about 100 nm, from about 100 nm to about 100 μm, from about 100 nm to about 50 μm, from about 100 nm to about 10 μm, from about 100 nm to about 1 μm, from about 100 nm to about 500 nm, from about 100 nm to about 400 nm, from about 100 nm to about 300 nm, or from about 100 nm to about 200 nm, but may not be limited thereto.

In an exemplary embodiment of the present disclosure, a cross-sectional shape of the hollow may include a circular shape, an elliptical shape, a polygonal shape, or a combination thereof, but may not be limited thereto.

In an exemplary embodiment of the present disclosure, a thickness of the wall of the carbonaceous structure may be about 1 μm or less, but may not be limited thereto. For example, a thickness of the wall of the carbonaceous structure may be about 1 μm or less, about 800 nm or less, about 600 nm or less, about 500 nm or less, about 400 nm or less, about 300 nm or less, about 200 nm or less, about 100 nm or less, about 50 nm or less, about 10 nm or less, from about 1 nm to about 1,000 nm, from about 1 nm to about 900 nm, from about 1 nm to about 800 nm, from about 1 nm to about 700 nm, from about 1 nm to about 600 nm, from about 1 nm to about 500 nm, from about 1 nm to about 400 nm, from about 1 nm to about 300 nm, from about 1 nm to about 200 nm, from about 1 nm to about 100 nm, from about 1 nm to about 50 nm, from about 1 nm to about 10 nm, from about 10 nm to about 1,000 nm, from about 10 nm to about 900 nm, from about 10 nm to about 800 nm, from about 10 nm to about 700 nm, or from about 10 nm to about 600 nm, from about 10 nm to about 500 nm, from about 10 nm to about 400 nm, from about 10 nm to about 300 nm, from about 10 nm to about 200 nm, from about 10 nm to about 100 nm, from about 50 nm to about 900 nm, from about 50 nm to about 1,000 nm, from about 50 nm to about 800 nm, from about 50 nm to about 700 nm, or from about 50 nm to about 600 nm, from about 50 nm to about 500 nm, from about 50 nm to about 400 nm, from about 50 nm to about 300 nm, from about 50 nm to about 200 nm, from about 50 nm to about 100 nm, from about 100 nm to about 1,000 nm, from about 100 nm to about 900 nm, from about 100 nm to about 800 nm, from about 100 nm to about 700 nm, or from about 100 nm to about 600 nm, from about 100 nm to about 500 nm, from about 100 nm to about 400 nm, from about 100 nm to about 300 nm, or from about 100 nm to about 200 nm, but may not be limited thereto.

The carbonaceous structure in accordance with an exemplary embodiment of the present disclosure may have a uniform size, but may not be limited thereto.

In an exemplary embodiment of the present disclosure, the one or more open porous channels may have mesoporosity, but may not be limited thereto.

In an exemplary embodiment of the present disclosure, a diameter of the one or more open porous channels may be about 10 nm or less, but may not be limited thereto. For example, a diameter of the one or more open porous channels may be about 10 nm or less, about 5 nm or less, about 3 nm or less, about 1 nm or less, from about 0.1 nm to about 10 nm, from about 0.1 nm to about 8 nm, from about 0.1 nm to about 6 nm, from about 0.1 nm to about 4 nm, from about 0.1 nm to about 2 nm, from about 0.1 nm to about 1 nm, from about 1 nm to about 10 nm, from about 1 nm to about 8 nm, from about 1 nm to about 6 nm, from about 1 nm to about 4 nm, or from about 1 nm to about 2 nm, but may not be limited thereto.

In an exemplary embodiment of the present disclosure, a content of the element of Group 15 of the Periodic Table included in the carbonaceous matrix may be about 50 weight parts or less with respect to 100 weight parts of the carbonaceous structure, but may not be limited thereto. For example, a content of the element of Group 15 of the Periodic Table included in the carbonaceous matrix may be about 50 weight parts or less, about 40 weight parts or less, about 30 weight parts or less, about 20 weight parts or less, about 10 weight parts or less, from about 1 weight part to about 50 weight parts, from about 1 weight part to about 40 weight parts, from about 1 weight part to about 30 weight parts, from about 1 weight part to about 20 weight parts, from about 1 weight part to about 10 weight parts, from about 5 weight parts to about 10 weight parts, from about 10 weight parts to about 50 weight parts, from about 10 weight parts to about 40 weight parts, from about 10 weight parts to about 30 weight parts, or from about 10 weight parts to about 20 weight parts with respect to 100 weight parts of the carbonaceous structure, but may not be limited thereto.

In an exemplary embodiment of the present disclosure, the method for preparing a carbonaceous structure may further include immersing the obtained carbonaceous structure including the one or more hollow internal compartments in a precursor-containing solution for forming particles and then performing a heat treatment thereto to encapsulate particles in the one or more hollow internal compartments, but may not be limited thereto.

In an exemplary embodiment of the present disclosure, after the immersion of the carbonaceous structure in the precursor-containing solution for forming particles, the heat treatment may be performed in a temperature range of from about 400 K to about 1200 K, from about 500 K to about 1200 K, from about 600 K to about 1200 K, from about 800 K to about 1200 K, from about 1000 K to about 1200 K, from about 400 K to about 1000 K, from about 600 K to about 1000 K, from about 800 K to about 1000 K, from about 400 K to about 800 K, from about 600 K to about 800 K, or from about 400 K to about 600 K under a reducing atmosphere including hydrogen and/or an inert gas (gas including He, Ar, or $N_2$ gas). The precursor for forming particles may be decomposed and reduced to a desired state by the heat treatment and may form metal or alloy particles (nanoparticles or subnano particles), and the formed particles may be encapsulated by the one or more hollow internal compartments of the carbonaceous structure.

In an exemplary embodiment of the present disclosure, the particles encapsulated by each of the hollow internal compartments are nanoparticles or subnano particles, and a size of the particles may be from an atom size level to about 1 μm, but may not be limited thereto. For example, a size of the particles may be about 1,000 nm or less, about 100 nm or less, about 10 nm or less, or about 1 nm or less, but may not be limited thereto. For example, a size of the particles may be about 1,000 nm or less, about 500 nm or less, about 100 nm or less, about 10 nm or less, about 5 nm or less, about 1 nm or less, from about 1 nm to about 1,000 nm, from about 1 nm to about 950 nm, from about 1 nm to about 900 nm, from about 1 nm to about 850 nm, from about 1 nm to about 800 nm, from about 1 nm to about 750 nm, from about 1 nm to about 700 nm, from about 1 nm to about 650 nm, from about 1 nm to about 600 nm, from about 1 nm to about 550 nm, from about 1 nm to about 500 nm, from about 1 nm to about 450 nm, from about 1 nm to about 400 nm, from about 1 nm to about 350 nm, from about 1 nm to about 300 nm, from about 1 nm to about 250 nm, from about 1 nm to about 200 nm, from about 1 nm to about 150 nm, from about 1 nm to about 100 nm, from about 1 nm to about 50 nm, from about 1 nm to about 30 nm, from about 1 nm to about 10 nm, from about 1 nm to about 5 nm, from about 10 nm to about 1,000 nm, from about 10 nm to about 950 nm, from about 10 nm to about 900 nm, from about 10 nm to about 850 nm, from about 10 nm to about 800 nm, from about 10 nm to about 750 nm, from about 10 nm to about 700 nm, from about 10 nm to about 650 nm, from about 10 nm to about 600 nm, from about 10 nm to about 550 nm, from about 10 nm to about 500 nm, from about 10 nm to about 450 nm, from about 10 nm to about 400 nm, from about 10 nm to about 350 nm, from about 10 nm to about 300 nm, from about 10 nm to about 250 nm, from about 10 nm to about 200 nm, from about 10 nm to about 150 nm, from about 10 nm to about 100 nm, from about 10 nm to about 50 nm, or from about 10 nm to about 30 nm, but may not be limited thereto.

In an exemplary embodiment of the present disclosure, the particles may be dispersed on a surface of the one or more hollow internal compartments, and the particles may be dispersed in the carbonaceous matrix of the carbonaceous structure, but may not be limited thereto.

In an exemplary embodiment of the present disclosure, the hard template may include a porous membrane template, but may not be limited thereto. An external structure of the carbonaceous structure to be formed may be determined by the hard template, and for example, a size (diameter or length) or shape of the carbonaceous structure may be adjusted by the hard template and the characteristics of the hollow internal compartments may be adjusted by the Rayleigh instability, but the present disclosure may not be limited thereto.

In an exemplary embodiment of the present disclosure, the hard template is in the form of a porous membrane and may use an anodized aluminum membrane filter, but the present disclosure may not be limited thereto. For example, if the anodized aluminum membrane filter is used as the hard template, when the method for preparing a carbonaceous structure is performed, the carbonaceous structure or the carbonaceous structure-containing solution is injected into the anodized aluminum membrane filter in a vacuum, and, thus, the carbonaceous structure or the carbonaceous structure-containing solution can be injected into the anodized aluminum membrane filter due to a pressure difference, but may not be limited thereto.

In an exemplary embodiment of the present disclosure, the carbonaceous structure may have a shape of a spherical particle, an ellipse particle, a polyhedron, a nanotube, a nanorod, a nanobelt, a nanopillar, a nanosphere or a nanoplate, but may not be limited thereto. For example, the carbonaceous structure may have a shape of a spherical nanoparticle, an ellipse nanoparticle, a nanopolyhedron, or a nanocube, but may not be limited thereto.

In an exemplary embodiment of the present disclosure, if the carbonaceous structure is manufactured as a spherical carbonaceous nanostructure, the spherical carbonaceous nanostructure may be prepared by a method of spraying the carbon precursor such as a resin to air and then drying and carbonizing the carbon precursor or a method of forming a nanostructure by adjusting a stirring speed when a resin as the carbon precursor is polymerized and then carbonizing the nanostructure, but may not be limited thereto. For example, the spherical carbonaceous nanostructure may be prepared by a method of adding sulfur nanoparticles and a surfactant as the soft template to melamine formaldehyde resin synthesized as the carbon precursor and stirring the resin in air, but may not be limited thereto. For example, when the resin is naturally polymerized with uniform stirring, spherical nanostructures that are uniform in size may be prepared, and a heat treatment may be performed to the formed spherical polymer nanostructures at 800° C. under a carbon dioxide atmosphere to form the spherical carbonaceous structure or a nitrogen-containing spherical carbonaceous structure. For example, the carbonaceous structure may be prepared into various shapes with reference to various methods for preparing a porous structure known in the art except forming the open porous channels by adding the soft template.

All the descriptions of the first aspect of the present disclosure can be applied to the method for preparing a carbonaceous structure according to the present aspect even though they are omitted hereinafter.

Figure 2:
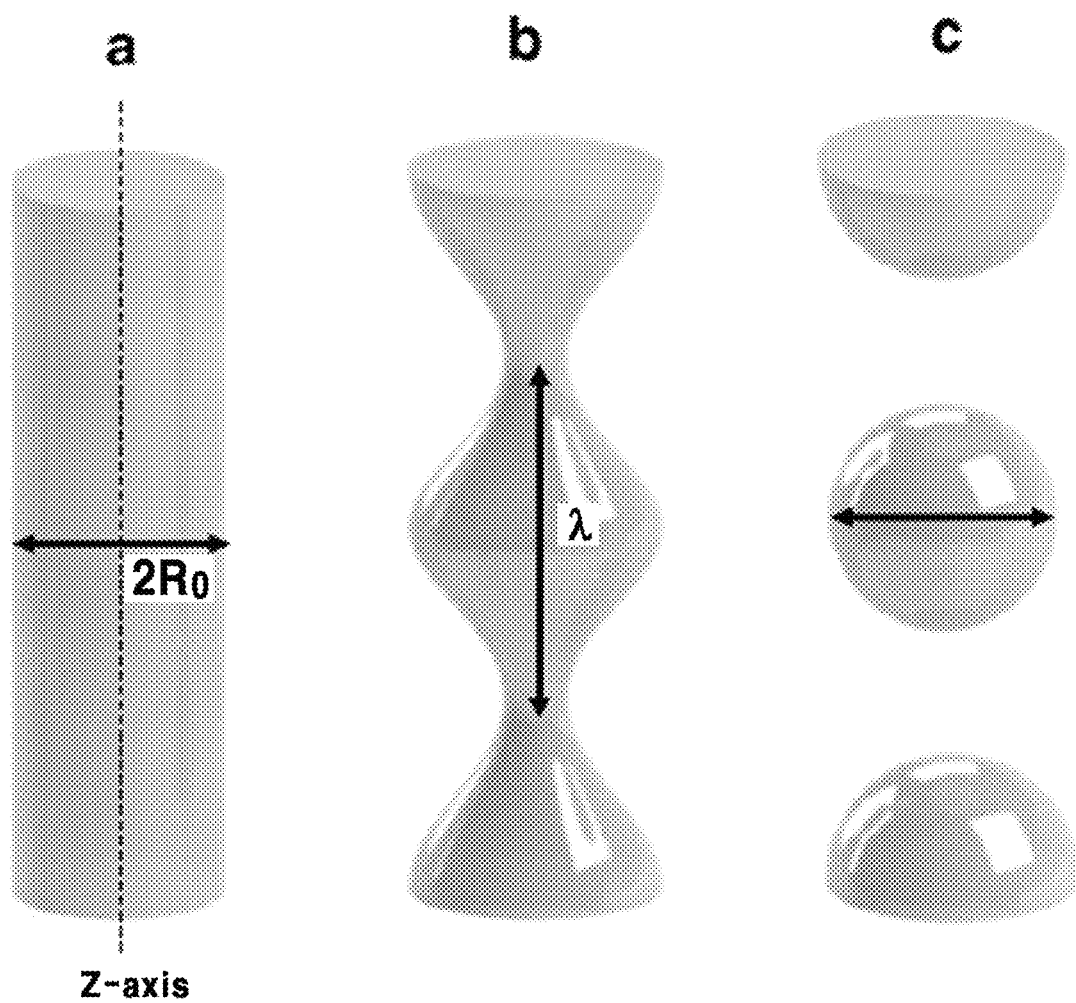
FIG. 2 is a schematic diagram for the Rayleigh instability transform process for preparing a carbonaceous structure in accordance with an exemplary embodiment of the present disclosure.

In an exemplary embodiment of the present disclosure, referring to FIG. 1 and FIG. 2, it was observed that the soft template such as the surfactant used in the method for preparing a carbonaceous structure formed micelles (FIG. 1, a-i). Then, it was observed that when the hard template was dried in a vacuum, the carbon precursor was transformed into Rayleigh-instability-induced structure (FIG. 1, a-ii and FIG. 1, a-iii) [Reference Document: C. C. Tsai, J. T. Chen, Langmuir 2014, 30, 387]. The Rayleigh instability originates from the instability of liquid cylinders by the surface tension. A liquid cylinder tends to undulate its free surface with wavelengths larger than the circumference of the cylinder. Consequently, the driving force for the surface undulation results in a decrease of the surface area and the total surface energy and thus determines a shape of the hollow internal compartments. Then, if the hard template including the carbon precursor is heated to be completely carbonized under an inert atmosphere, the carbonaceous matrix that constitutes the wall of the carbonaceous structure or the carbonaceous matrix containing the element of Group 15 of the Periodic Table is formed and the surfactant that forms the micelles is removed by pyrolysis at the same time, and, thus, mesopores are introduced into the wall of the carbonaceous structure (FIG. 1, a-iv). Then, the hard template is removed by a proper method, and, thus, the carbonaceous structure is finally obtained (FIG. 1, a-v).

According to a fifth aspect of the present disclosure, there is provided a catalyst, including a carbonaceous structure according to the first aspect, wherein the carbonaceous structure includes one or more hollow internal compartments, and each of the hollow internal compartments is connected through to outside and to the one or more hollow internal compartments adjacent thereto through one or more open porous channels formed in the carbonaceous structure, and the carbonaceous structure includes a carbonaceous matrix.

In an exemplary embodiment of the present disclosure, the one or more open porous channels in the carbonaceous structure may be formed by penetrating a wall of the carbonaceous structure, but may not be limited thereto.

In an exemplary embodiment of the present disclosure, a size of the hollow internal compartments may be about 100 µm or less, but may not be limited thereto. For example, a size of the hollow internal compartments may be about 100 µm or less, about 10 µm or less, about 1 µm or less, about 800 nm or less, about 600 nm or less, about 500 nm or less, about 400 nm or less, about 300 nm or less, about 200 nm or less, about 100 nm or less, about 50 nm or less, about 10 nm or less, from about 10 nm to about 100 µm, from about 10 nm to about 50 µm, from about 10 nm to about 10 µm, from about 10 nm to about 1 µm, from about 10 nm to about 500 nm, from about 10 nm to about 100 nm, from about 100 nm to about 100 µm, from about 100 nm to about 50 µm, from about 100 nm to about 10 µm, from about 100 nm to about 1 µm, from about 100 nm to about 500 nm, from about 100 nm to about 400 nm, from about 100 nm to about 300 nm, or from about 100 nm to about 200 nm, but may not be limited thereto.

In an exemplary embodiment of the present disclosure, a cross-sectional shape of the hollow may include a circular shape, an elliptical shape, a polygonal shape, or a combination thereof, but may not be limited thereto.

In an exemplary embodiment of the present disclosure, a thickness of the wall of the carbonaceous structure may be about 1 µm or less, but may not be limited thereto. For example, a thickness of the wall of the carbonaceous structure may be about 1 µm or less, about 800 nm or less, about 600 nm or less, about 500 nm or less, about 400 nm or less, about 300 nm or less, about 200 nm or less, about 100 nm or less, about 50 nm or less, about 10 nm or less, from about 1 nm to about 1,000 nm, from about 1 nm to about 900 nm, from about 1 nm to about 800 nm, from about 1 nm to about 700 nm, from about 1 nm to about 600 nm, from about 1 nm to about 500 nm, from about 1 nm to about 400 nm, from about 1 nm to about 300 nm, from about 1 nm to about 200 nm, from about 1 nm to about 100 nm, from about 1 nm to about 50 nm, from about 1 nm to about 10 nm, from about 10 nm to about 1,000 nm, from about 10 nm to about 900 nm, from about 10 nm to about 800 nm, from about 10 nm to about 700 nm, or from about 10 nm to about 600 nm, from about 10 nm to about 500 nm, from about 10 nm to about 400 nm, from about 10 nm to about 300 nm, from about 10 nm to about 200 nm, from about 10 nm to about 100 nm, from about 50 nm to about 1,000 nm, from about 50 nm to about 900 nm, from about 50 nm to about 800 nm, from about 50 nm to about 700 nm, or from about 50 nm to about 600 nm, from about 50 nm to about 500 nm, from about 50 nm to about 400 nm, from about 50 nm to about 300 nm, from about 50 nm to about 200 nm, from about 50 nm to about 100 nm, from about 100 nm to about 1,000 nm, from about 100 nm to about 900 nm, from about 100 nm to about 800 nm, from about 100 nm to about 700 nm, or from about 100 nm to about 600 nm, from about 100 nm to about 500 nm, from about 100 nm to about 400 nm, from about 100 nm to about 300 nm, or from about 100 nm to about 200 nm, but may not be limited thereto.

The carbonaceous structure in accordance with an exemplary embodiment of the present disclosure may have a uniform size, but may not be limited thereto.

In an exemplary embodiment of the present disclosure, the one or more open porous channels may have mesoporosity, but may not be limited thereto.

In an exemplary embodiment of the present disclosure, a diameter of the one or more open porous channels may be about 10 nm or less, but may not be limited thereto. For example, a diameter of the one or more open porous channels may be about 10 nm or less, about 5 nm or less, about 3 nm or less, about 1 nm or less, from about 0.1 nm to about 10 nm, from about 0.1 nm to about 8 nm, from about 0.1 nm to about 6 nm, from about 0.1 nm to about 4 nm, from about 0.1 nm to about 2 nm, from about 0.1 nm to about 1 nm, from about 1 nm to about 10 nm, from about 1 nm to about 8 nm, from about 1 nm to about 6 nm, from about 1 nm to about 4 nm, or from about 1 nm to about 2 nm, but may not be limited thereto.

In an exemplary embodiment of the present disclosure, the carbonaceous matrix may further include an element of Group 15 of the Periodic Table, but may not be limited thereto. For example, the carbonaceous matrix may further include an element of N, P, As, Sb, or Bi, but may not be limited thereto.

In an exemplary embodiment of the present disclosure, a content of the element of Group 15 of the Periodic Table included in the carbonaceous matrix may be about 50 weight parts or less with respect to 100 weight parts of the carbonaceous structure, but may not be limited thereto. For example, a content of the element of Group 15 of the Periodic Table included in the carbonaceous matrix may be about 50 weight parts or less, about 40 weight parts or less, about 30 weight parts or less, about 20 weight parts or less, about 10 weight parts or less, from about 1 weight part to about 50 weight parts, from about 1 weight part to about 40 weight parts, from about 1 weight part to about 30 weight parts, from about 1 weight part to about 20 weight parts, from about 1 weight part to about 10 weight parts, from about 5 weight parts to about 10 weight parts, from about 10 weight parts to about 50 weight parts, from about 10 weight parts to about 40 weight parts, from about 10 weight parts to about 30 weight parts, or from about 10 weight parts to about 20 weight parts with respect to 100 weight parts of the carbonaceous structure, but may not be limited thereto.

In an exemplary embodiment of the present disclosure, the particles encapsulated by each of the hollow internal compartments are nanoparticles or subnano particles, and a size of the particles may be from an atom size level to about 1 μm, but may not be limited thereto. For example, a size of the particles may be about 1,000 nm or less, about 100 nm or less, about 10 nm or less, or about 1 nm or less, but may not be limited thereto. For example, a size of the particles may be about 1,000 nm or less, about 500 nm or less, about 100 nm or less, about 10 nm or less, about 5 nm or less, about 1 nm or less, from about 1 nm to about 1,000 nm, from about 1 nm to about 950 nm, from about 1 nm to about 900 nm, from about 1 nm to about 850 nm, from about 1 nm to about 800 nm, from about 1 nm to about 750 nm, from about 1 nm to about 700 nm, from about 1 nm to about 650 nm, from about 1 nm to about 600 nm, from about 1 nm to about 550 nm, from about 1 nm to about 500 nm, from about 1 nm to about 450 nm, from about 1 nm to about 400 nm, from about 1 nm to about 350 nm, from about 1 nm to about 300 nm, from about 1 nm to about 250 nm, from about 1 nm to about 200 nm, from about 1 nm to about 150 nm, from about 1 nm to about 100 nm, from about 1 nm to about 50 nm, from about 1 nm to about 30 nm, from about 1 nm to about 10 nm, from about 1 nm to about 5 nm, from about 10 nm to about 1,000 nm, from about 10 nm to about 950 nm, from about 10 nm to about 900 nm, from about 10 nm to about 850 nm, from about 10 nm to about 800 nm, from about 10 nm to about 750 nm, from about 10 nm to about 700 nm, from about 10 nm to about 650 nm, from about 10 nm to about 600 nm, from about 10 nm to about 550 nm, from about 10 nm to about 500 nm, from about 10 nm to about 450 nm, from about 10 nm to about 400 nm, from about 10 nm to about 350 nm, from about 10 nm to about 300 nm, from about 10 nm to about 250 nm, from about 10 nm to about 200 nm, from about 10 nm to about 150 nm, from about 10 nm to about 100 nm, from about 10 nm to about 50 nm, or from about 10 nm to about 30 nm, but may not be limited thereto.

In an exemplary embodiment of the present disclosure, the particles may be dispersed on a surface of the one or more hollow internal compartments, and the particles may be dispersed in the carbonaceous matrix of the carbonaceous structure, but may not be limited thereto.

The carbonaceous structure according to an exemplary embodiment of the present disclosure has a high specific surface area and a high porosity and is uniform in shape. The carbonaceous structure according to an exemplary embodiment of the present disclosure includes one or more hollow internal compartments, and each of the hollow internal compartments is connected through to outside and to the one or more hollow internal compartments adjacent thereto through one or more open porous channels formed in the carbonaceous structure and the carbonaceous structure includes a carbonaceous matrix and thus facilitates penetration and encapsulation of ions or particles (for non-limiting example, nanoparticles or subnano particles). The carbonaceous structure according to an exemplary embodiment of the present disclosure can adjust a size of the open porous channels included therein and a thickness of the wall of the carbonaceous structure to the scale of nanometers, and, thus, the carbonaceous structure may be formed as a carbonaceous nanostructure.

All the descriptions of the first aspect of the present disclosure can be applied to the present aspect even though are omitted hereinafter.

In an exemplary embodiment of the present disclosure, the catalyst may be used as a hydrocarbon-based oxidation catalyst, a photocatalyst or an electrochemical catalyst, but may not be limited thereto.

In an exemplary embodiment of the present disclosure, the carbonaceous structure included in the catalyst may further include one or more particles encapsulated by each of the hollow internal compartments, but may not be limited thereto.

In an exemplary embodiment of the present disclosure, the one or more particles may include a metal or a metal compound or alloy, but may not be limited thereto.

In an exemplary embodiment of the present disclosure, the catalyst may be used as a catalyst for electrochemically reducing $CO_2$, but may not be limited thereto.

In an exemplary embodiment of the present disclosure, the carbonaceous structure included in the catalyst may include one or more particles encapsulated in the one or more hollow internal compartments and including one or more elements selected from the group consisting of Si, Fe, Ni, Co, Al, Ge, Sn, Mn, Ti, V, Cu, Zn, W, Ag, Pt, Ga, Au, Sb, Te, Pb, Bi, Cd, P, and S, but may not be limited thereto. For example, the particles may include the element or a compound or alloy including the element, but may not be limited thereto.

The particles (for non-limiting example, nanoparticles or subnano particles) encapsulated in the carbonaceous structure according to an exemplary embodiment of the present disclosure can provide additional active sites in the structure when the particles are used as a catalyst.

The carbonaceous structure according to an exemplary embodiment of the present disclosure has a high specific surface area and a high porosity, and, thus, when the carbonaceous structure is used as a catalyst, the catalyst has advantages of rapid movement and storage, excellent reversibility, facile adsorption/desorption of ions and also includes many active sites. Therefore, it is possible to increase the catalytic activity and also increase the stability.

In an exemplary embodiment of the present disclosure, the catalyst may be used as a photocatalyst for water-splitting, but may not be limited thereto.

In an exemplary embodiment of the present disclosure, if the carbonaceous structure included in the catalyst includes Sn particles encapsulated in the one or more hollow internal compartments, it can be used for preparing formic acid through electrochemical reactions of $CO_2$, but may not be limited thereto.

Hereinafter, the present disclosure will be explained in more detail with reference to Examples. However, the following Examples are illustrative only for better understanding of the present disclosure but do not limit the present disclosure.

MODE FOR CARRYING OUT THE INVENTION

Examples

Hereinafter, a structure of a novel carbonaceous nanostructure and N-containing carbonaceous nanostructure (N-rich nanotube: hereinafter, referred to as "NRT") according to the present Examples provides a breakthrough solution to realize high-performance energy storage devices, where a hybrid full-cell capacitor is demonstrated by combining an Sn-encapsulated NRT composite as an anode with the NRT as a cathode.

The external morphology for the NRT was controlled using a hard template, whereas internal compartments with open mesoporous channels were created via the Rayleigh-instability transform using a soft template (FIG. 1, a). For the anode, ultrafine Sn NPs-encapsulated NRTs (Sn@NRTs) were prepared and assembled to be in a direct contact with a current collector (FIG. 1, b and d). The as-prepared Sn@NRT structure were shown to give the high capacity at a high current density of 12 $Ag^{-1}$, which is also an appropriate scan rate for testing the full-cell configuration combined with the capacitor-type cathode material. Also, the NRTs, having many open mesoporous channels and thus facilitating the accessibility of anion ions inside a 1D channel (FIG. 1, c and e), were employed for fabrication of the cathode electrode to achieve the high capacity, which is threefold higher than that of the commercial AC.

The unique properties of the NRT can be summarized as follows:

1) the NRT contains open mesoporous channels enabling easy penetration of electrochemical ion carriers between the electrolyte and active sites inside its internal compartments;

2) ultrafine nanocrystals can be encapsulated inside the NRT, which establishes high specific capacity over a long cycle life of repeated charge/discharge cycles;

3) the heterogeneous N atoms in the carbon matrix in the NRT lead to enhanced electrochemical ion sorption/desorption during repeated redox cycles; and 4) the bare NRT and its metal-encapsulated NRT are compatible to realize anode and cathode electrodes for an LHC in the full-cell configuration.

Indeed, conjugation of the NRT and metal-encapsulated NRT as the cathode and the anode materials is proven to give the high-level operation voltage and the excellent capacity retention of charge carriers in an Sn @ NRT∥NRT full-cell device, thus showing high energy density along with excellent power density and fast rate capability over a long cycle life of 3000 discharge/charge cycles.

Reagents

All reagents unless being stated were obtained from commercial sources (Sigma Aldrich, Junsei and Duksan) and were used without a purification. Specifically, melamine, formaldehyde solution (37 wt % in $H_2O$), Tin(IV) chloride ($SnCl_4$), and Pluronic F127 [$HO(C_2H_4O)a(C_3H_6O)b(C_2H_4O)aH$] were purchased from Sigma-Aldrich. Sodium hydroxide (NaOH) and potassium hydroxide (KOH) were purchased from Junsei. Ethanol and distilled water were purchased from Duksan. All chemicals were used as received in air.

<Example 1> Synthesis of N-Rich Nanotube (Hereinafter, Referred to as "NRT") as Carbonaceous Structure Melamine (5.0448 g, 0.04 mol) and a formaldehyde solution (8.924 mL, 0.12 mol) were mixed with a 1 M NaOH aqueous solution (0.2 mL) in water (100 mL). The mixed solution was heated at 373 K for 10 min to synthesize an MF (melamine-formaldehyde) resin to be used as a N-containing carbonaceous structure. The Pluronic F127 (2 g) which is a surfactant serving as a soft template was dissolved in the MF resin while cooling the solution. The solution is then slowly dropped onto an anodized aluminum oxide (AAO) membrane filter (Whatman Anodisc 25, 0.2 μm) using a filtering equipment with an aspirator. The wetted membrane filter was dried in a vacuum oven for 3 hours. A heat treatment of the membrane filters was then performed in an $H_2$ and Ar atmosphere under 1,073 K for 1 hour using a well-sealed tube furnace. After the heat treatment, the membrane filter mixed with the carbonized resin was removed in a 2M KOH aqueous solution. Then, a carbonaceous nanostructure, which was designated as N-rich nanotubes (NRTs), was obtained by centrifugal separation and washed by an ethanol-water solution during the separation. Finally, the NRT powder was dried in a vacuum oven and heat-treated in an $H_2$ atmosphere under 1,073 K for 30 minutes.

In addition to the melamine formaldehyde resin, the resin aqueous solution may use synthetic resins such as nylon, polycarbonate, ABS (acrylonitrile-butadiene-styrene) dissolved in a solvent for synthesis, and Examples of the respective materials will be described below.

<Example 2> Synthesis of Carbonaceous Nanostructure (Nanotube)

Figure 5A:
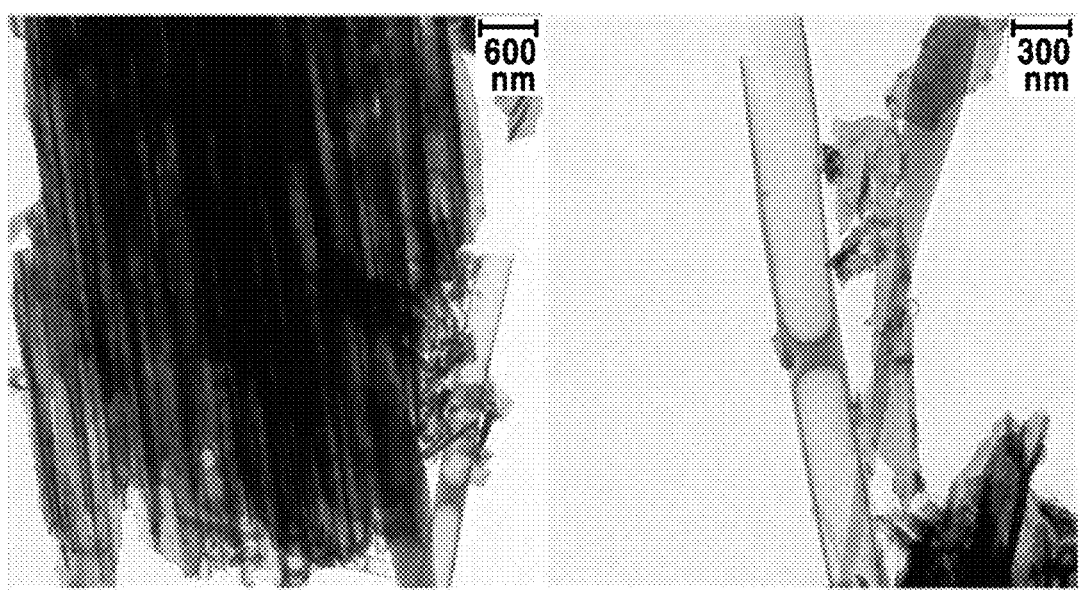
FIGS. 5A to 5H are TEM images and XPS and/or Raman analysis spectra of carbonaceous structures in accordance with examples of the present disclosure.
Figure 5B:
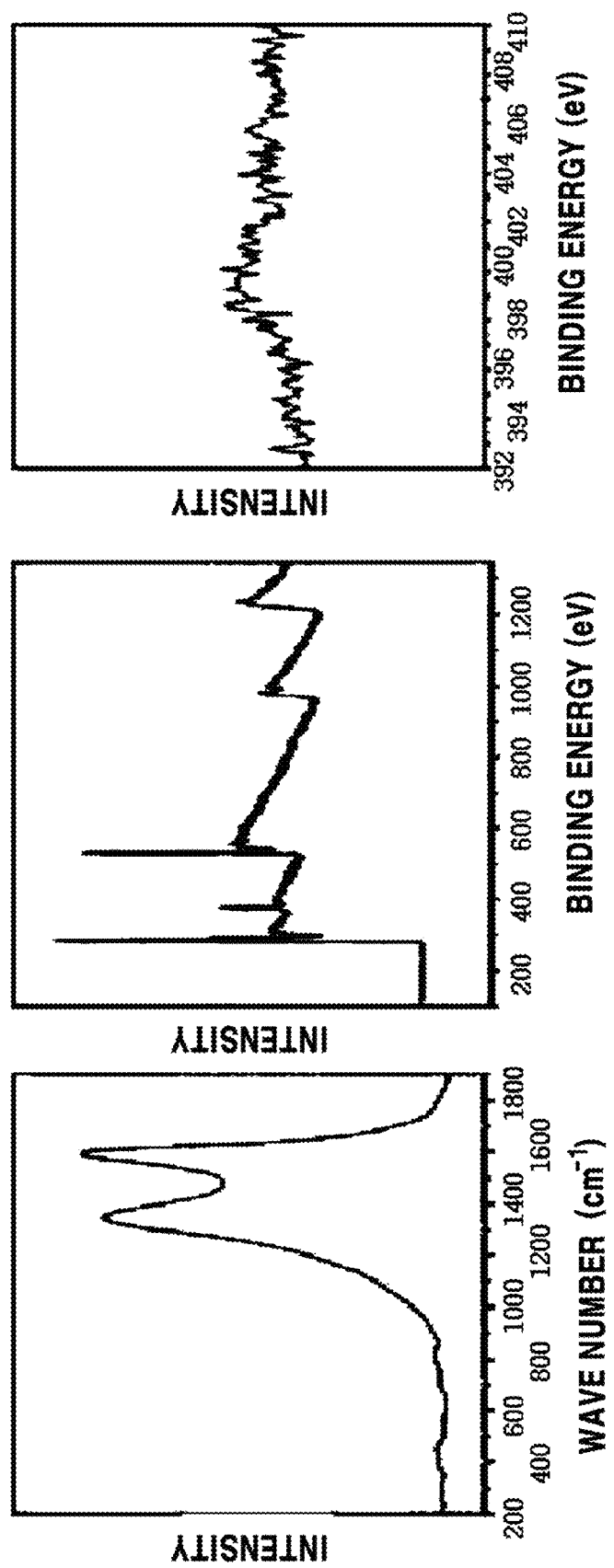

A carbonaceous nanostructure (nanotube) was synthesized in the same manner as in Example 1 except that polycarbonate was used as a carbon precursor. FIG. 5A illustrates a carbonaceous nanostructure (nanotube) prepared using polycarbonate. Further, FIG. 5B shows the results of Raman spectroscopy, XPS, and XPS N1s analysis on the carbonaceous nanostructure (nanotube) prepared using polycarbonate.

<Example 3> Synthesis of NRT

Figure 5C:
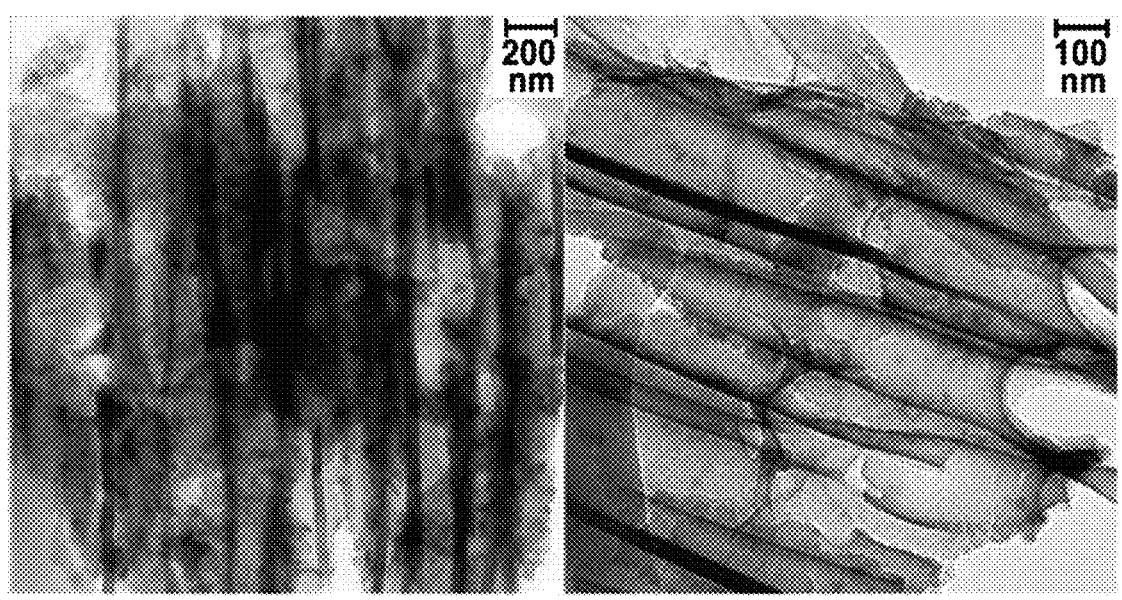
Figure 5D:
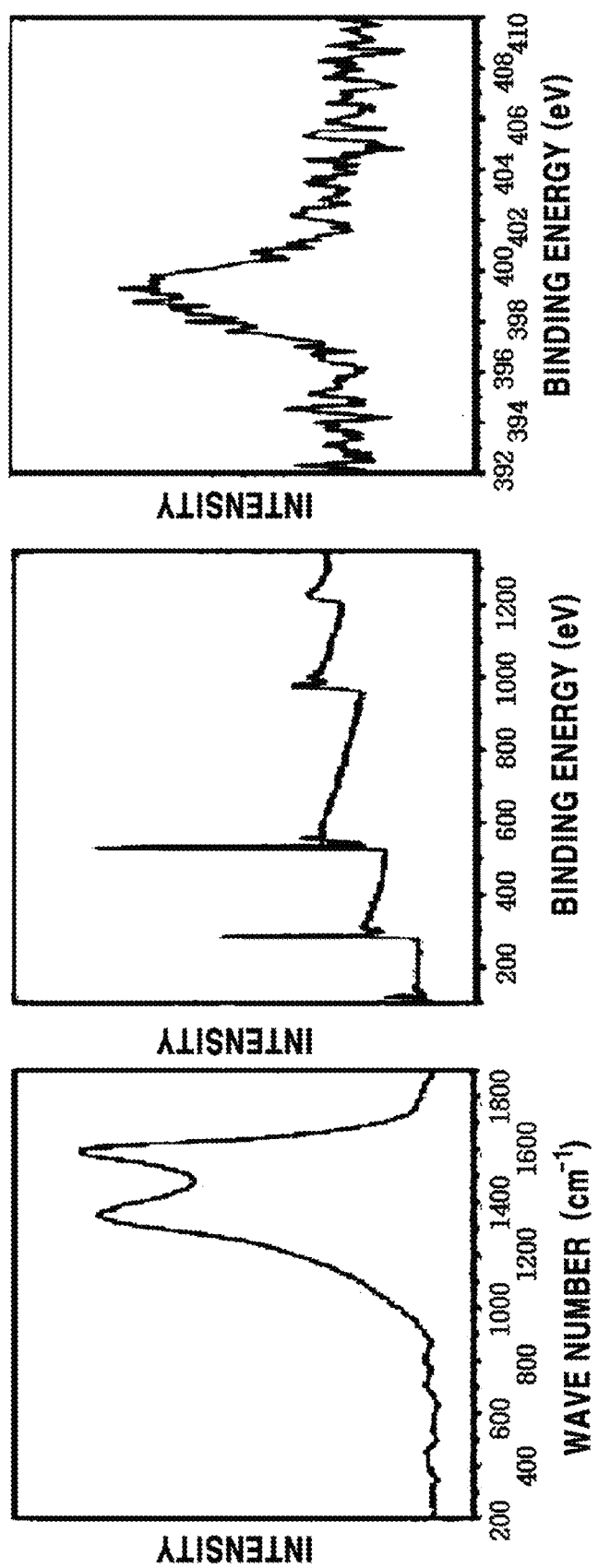

NRT was synthesized in the same manner as in Example 1 except that nylon was used as a resin. FIG. 5C illustrates NRT prepared using nylon. Further, FIG. 5D shows the results of Raman spectroscopy, XPS, and XPS N1s analysis on the NRT prepared using nylon.

<Example 4> Synthesis of Carbonaceous Nanostructure (Nanotube)

Figure 5E:
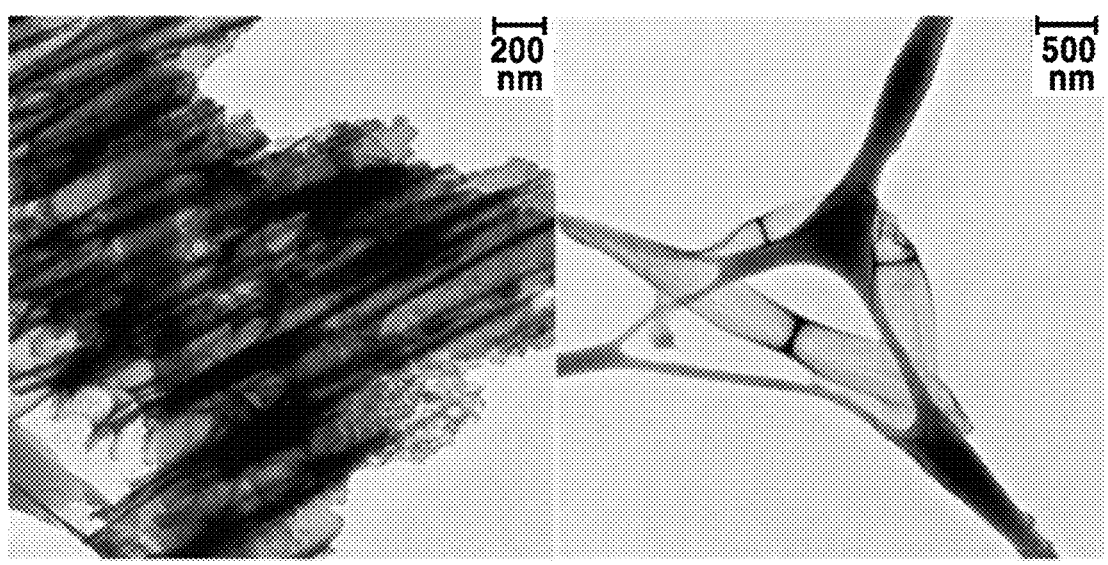
Figure 5F:
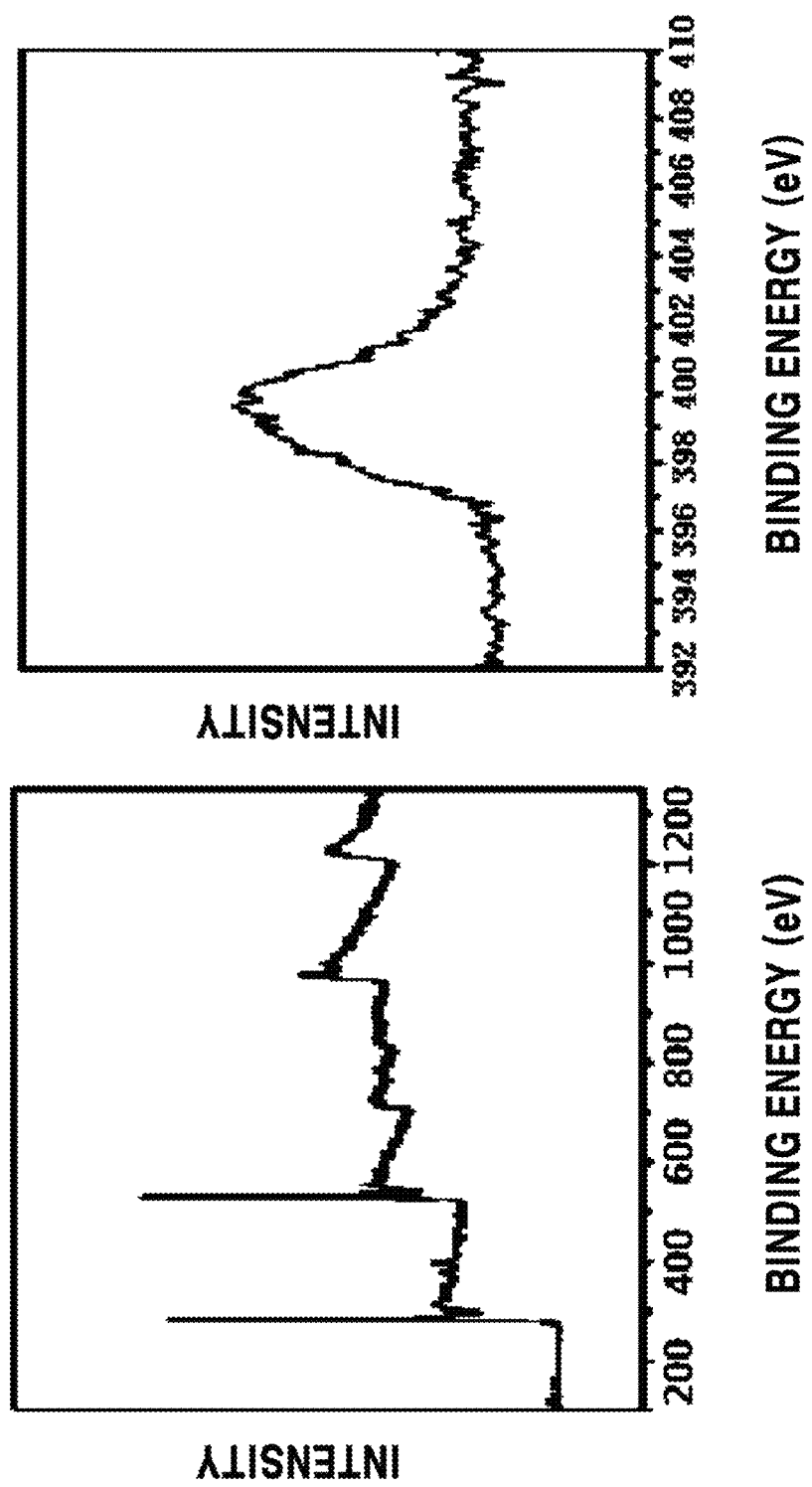

A carbonaceous nanostructure (nanotube) was synthesized in the same manner as in Example 1 except that methyl methacrylate was used as a resin. FIG. 5E illustrates a carbonaceous nanostructure (nanotube) prepared using methyl methacrylate. Further, FIG. 5F shows the results of XPS and XPS N1s analysis on the carbonaceous nanostructure (nanotube) prepared using methyl methacrylate.

<Example 5> Synthesis of Carbonaceous Nanostructure (Nanotube)

Figure 5G:
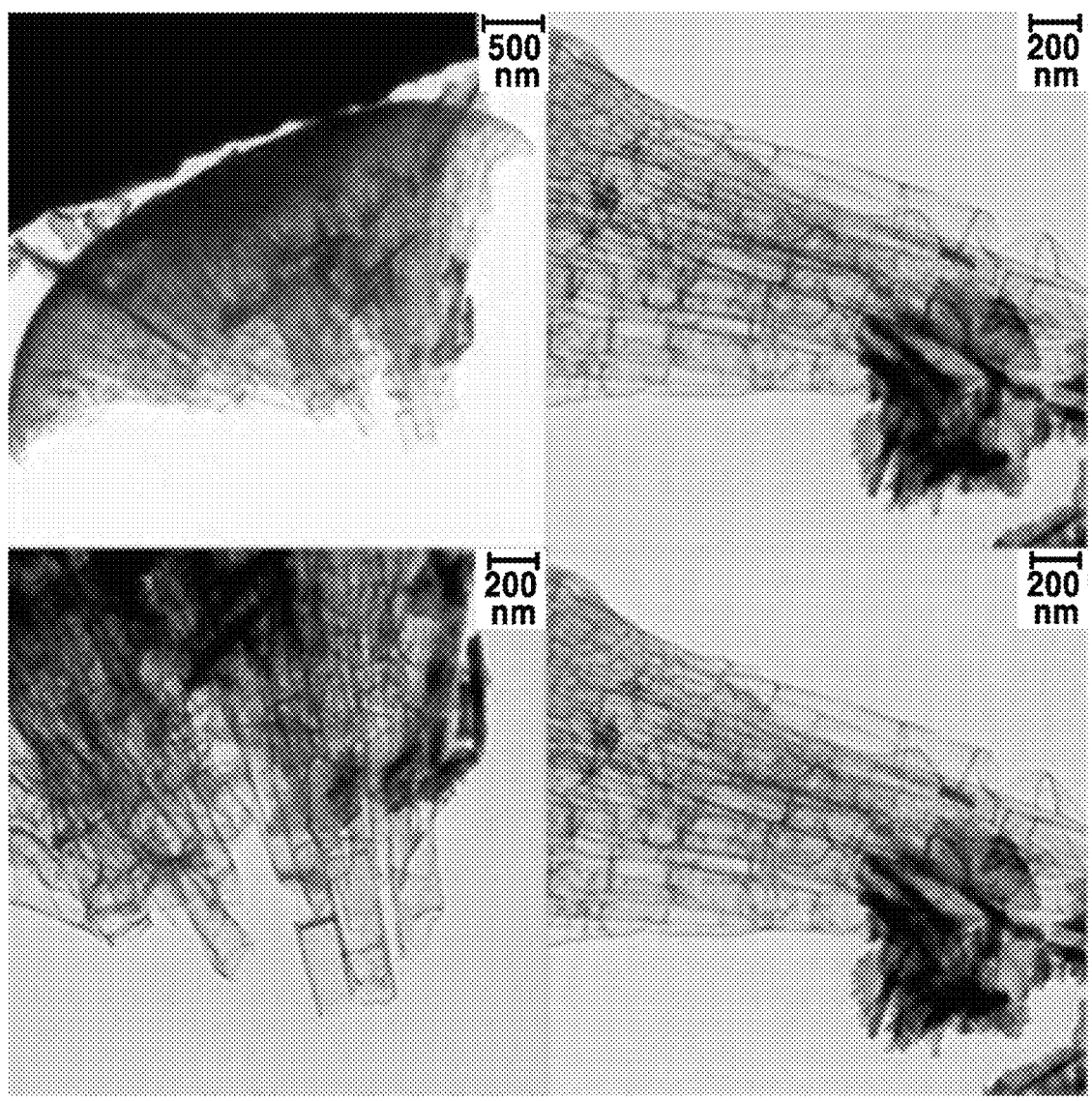
Figure 5H:
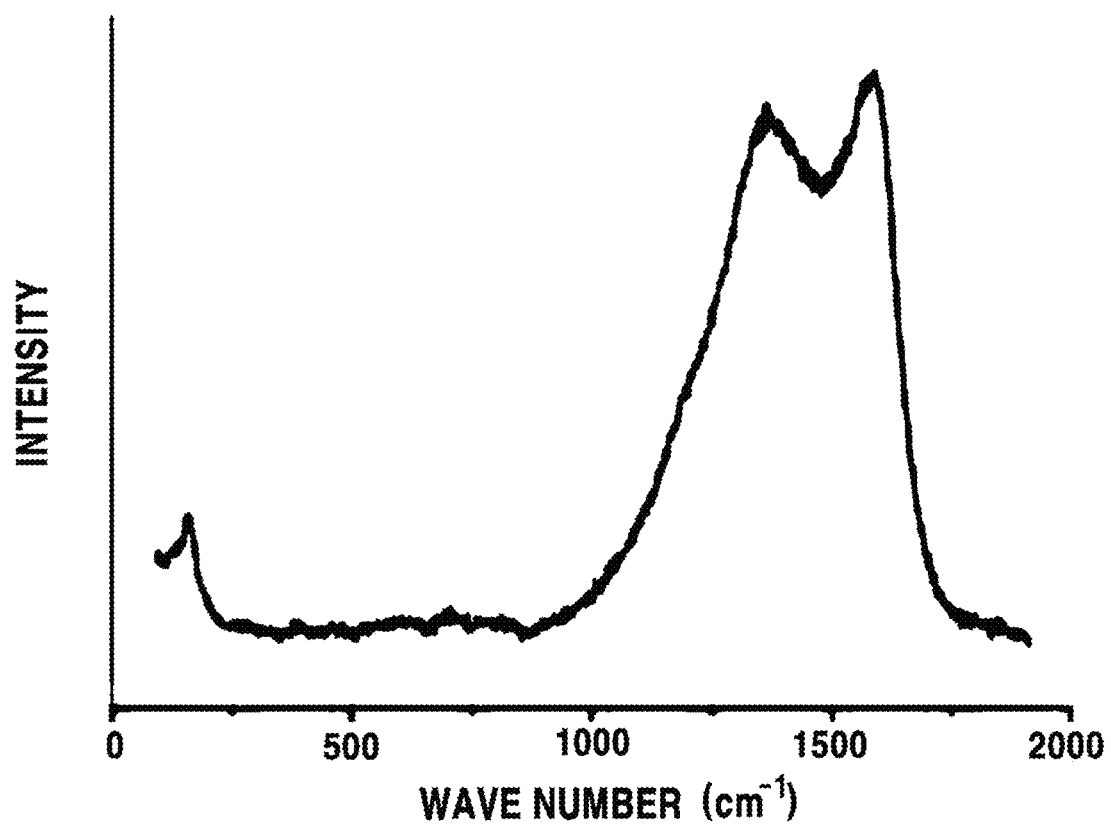

A carbonaceous nanostructure (nanotube) was synthesized in the same manner as in Example 1 except that resorcinol formaldehyde was used as a resin. FIG. 5G illustrates a carbonaceous nanostructure (nanotube) prepared using resorcinol formaldehyde. Further, FIG. 5H shows the results of Raman spectroscopy on the carbonaceous nanostructure (nanotube) prepared using resorcinol formaldehyde.

<Example 6> Preparation of Sn@NRT Composite

The NRT prepared in Example 1 have hollow compartment rooms inside, lots of pores, and open mesoporous channels on its own wall that was induced after removal of the F127 surfactants via full carbonization. The prepared NRT was dispersed in water and then rapidly mixed with a tin chloride alcohol solution (100 mmol). The NRT was easily wetted by the solution due to a lot of nitrogen in its own structure. The tin chloride solution penetrated into the compartment rooms of the NRT through the porous channels developed on its wall. Further, tin chloride salts were then located inside the internal compartment spaces of the NRT. Then, the solution was filtered through a membrane filter, and, thus, Sn@NRT powder was obtained. Finally, the Sn@NRT powder was dried in a vacuum oven and then reduced by a heat treatment at 1,073 K for 30 minutes in an $H_2$ atmosphere.

<Example 7> Preparation of Pt@NRT Composite

Figure 6A:
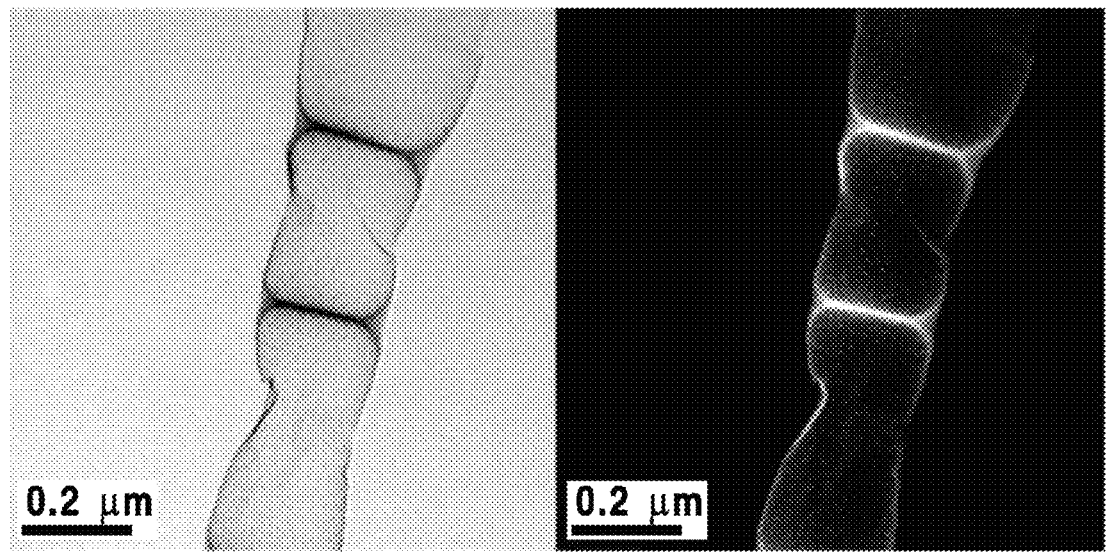
FIGS. 6A to 6H are TEM images and EDA elemental analysis results of carbonaceous structures in accordance with examples of the present disclosure.
Figure 6B:
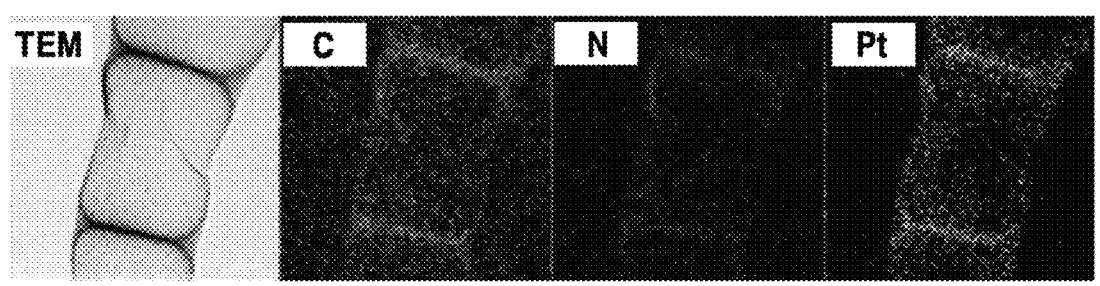

Pt@NRT was synthesized in the same manner as in Example 6 except that a Pt@NRT composite was prepared by mixing the NRT prepared in Example 1 and an $H_2PtCl_6$ aqueous solution. Further, FIG. 6A shows TEM images thereof and FIG. 6B shows the result of EDS (Energy-dispersive X-ray spectroscopy) elemental analysis using TEM.

<Example 8> Preparation of Ni@NRT Composite

Figure 6C:
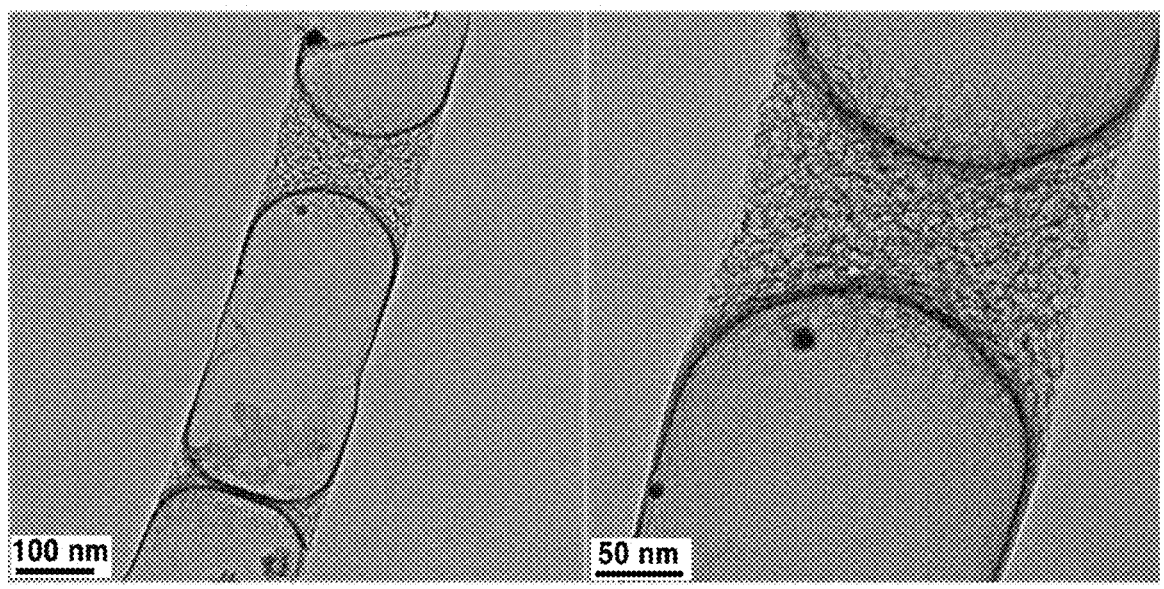
Figure 6D:
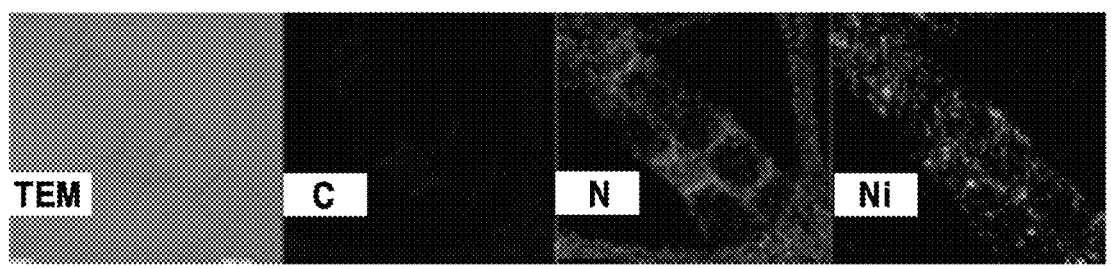

Ni@NRT was synthesized in the same manner as in Example 6 except that a Ni@NRT composite was prepared by mixing the NRT prepared in Example 1 and a $NiCl_2$ aqueous solution. Further, FIG. 6C shows TEM images thereof and FIG. 6D shows the result of EDS elemental analysis using TEM.

<Example 9> Preparation of Co@NRT Composite

Figure 6E:
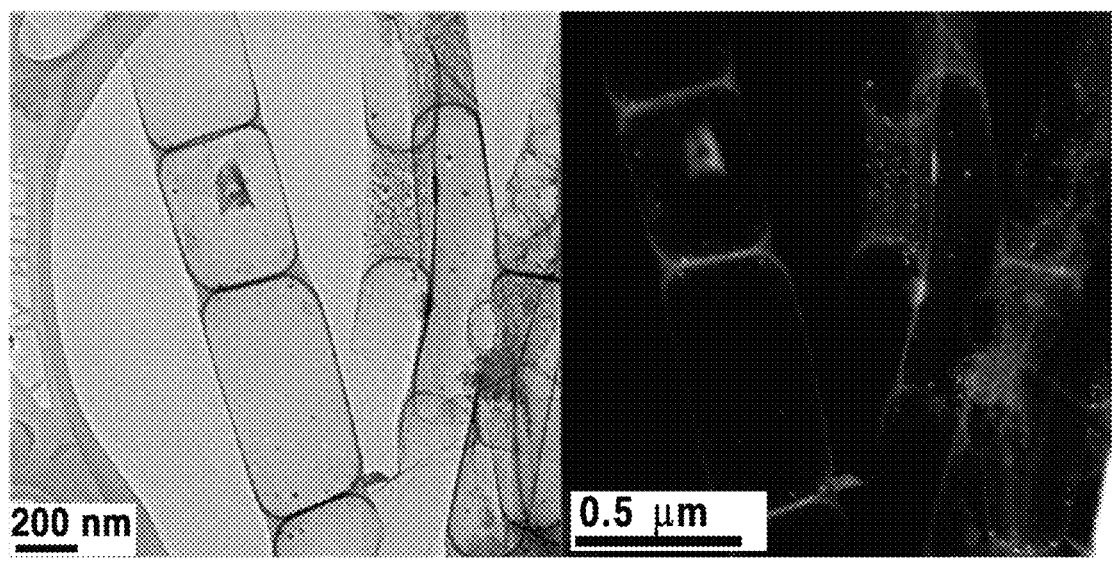
Figure 6F:
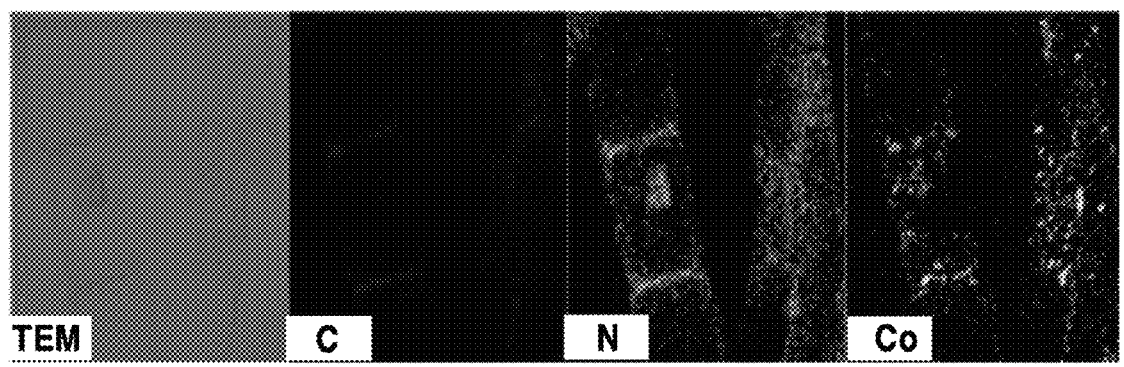

Co@NRT was synthesized in the same manner as in Example 6 except that a Co@NRT composite was prepared by mixing the NRT prepared in Example 1 and a $CoCl_2$ aqueous solution. Further, FIG. 6E shows TEM images thereof and FIG. 6F shows the result of EDS elemental analysis using TEM.

<Example 10> Preparation of Fe@NRT Composite

Figure 6G:
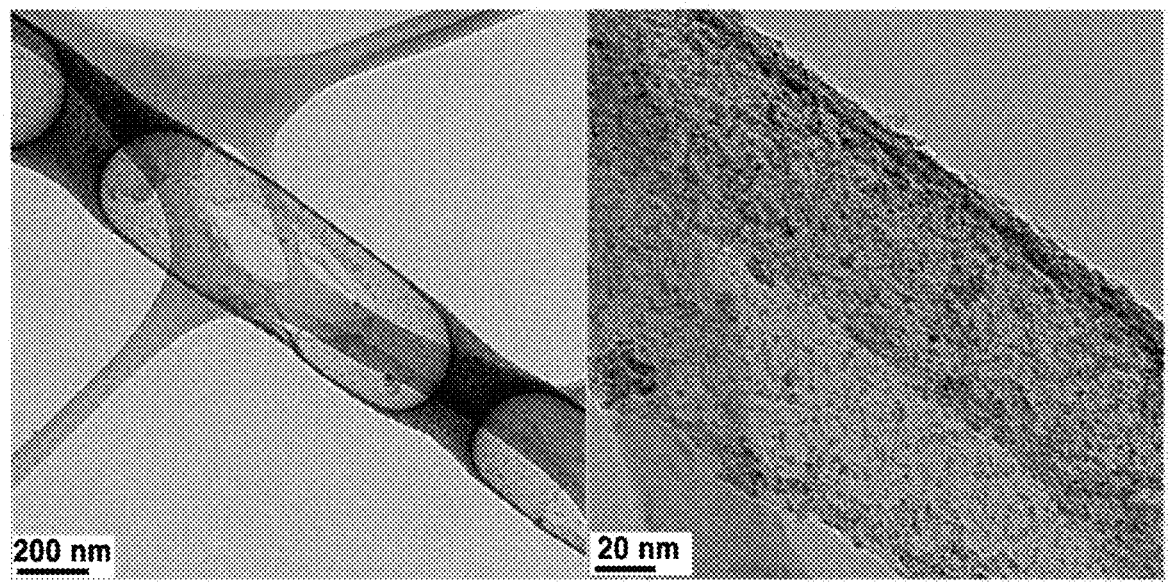
Figure 6H:
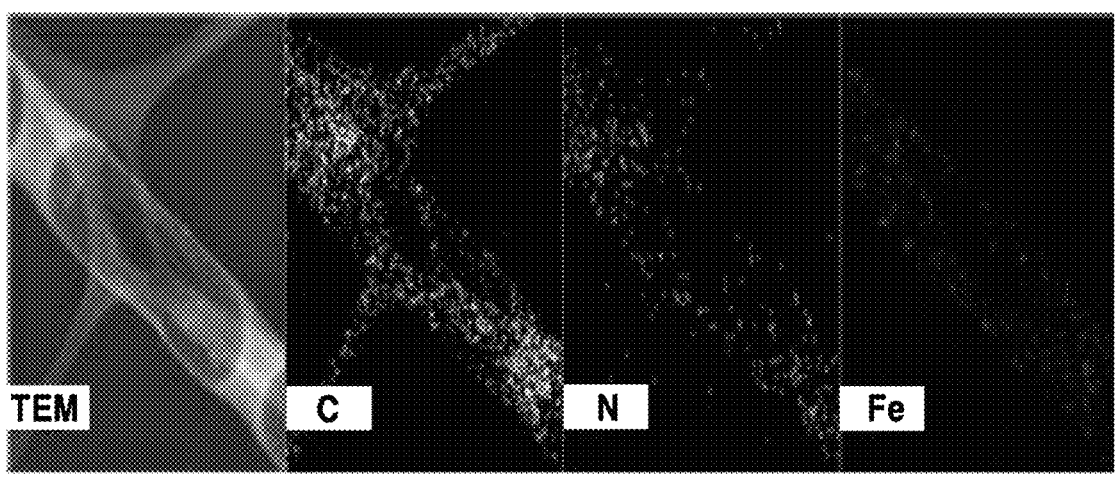

Fe@NRT was synthesized in the same manner as in Example 6 except that a Fe@NRT composite was prepared by mixing the NRT prepared in Example 1 and a $FeCl_2$ aqueous solution. Further, FIG. 6G shows TEM images thereof and FIG. 6H shows the result of EDS elemental analysis using TEM.

<NRT Characterization>

FE-TEM (Feild Emission-Transmission Electron Microscope)

For TEM observation (Tecnai F20 produced by Philips/JEM-ARM200F produced by JEOL/Tiatan cubed G2 produced by FEI company), the NRT and Sn@NRT were dispersed with an acetone solvent and put on a Cu mesh grid. An energy dispersive spectrometer (EDS) attached to the TEM was used to obtain the local elemental information, the line elemental profile and the elemental mapping.

FE-SEM (Field Emission-Scanning Electron Microscope)

For SEM observation (Magellan 400 produced by FEI), the NRT and Sn@NRT were dispersed with an acetone solvent and dropped on a small piece of a silicon wafer. A back scattered electron (BSE) detector attached to the SEM was also used to obtain the image scan for heavy metals.

Fourier Transform Infrared Spectroscopy (FT-IR)

The functional groups in the NRT were analyzed by using a FT-IR spectroscope (FT/IR-6100, JASCO).

XPS (X-Ray Photoelectron Spectroscopy)

The XPS spectra were obtained using a Sigma Probe of Thermo VG Scientific, which was equipped with a 350 W Al anode x-ray source along with a multi-anode, a pulse counting, and a hemispherical analyzer. The spectra were collected using an incident photon energy of 1486.6 eV and also corrected for the detector's work function.

XRD (X-Ray Diffraction Spectroscopy)

The powder X-ray data were collected using a SmartLab θ-2θ diffractometer in the reflectance Bragg-Brentano geometry employing a Johansson type Ge (111) monochromator filtered Cu Kα1 radiation at 1200 W (40 KV, 30 mA) power and equipped with a high speed 1D detector (D/teX Ultra). Powder of the Sn@NRT structures was held in a holder stage and scanned at a scan speed of 2°/min in a continuous mode.

TGA (Thermogravimetric Analysis)

The weight portion of pure tin in the Sn@NRT samples was determined by using a TGA (Setsys16/18 thermogravimetric analyzer).

Raman Spectroscopy

The defect or distortion of the NRT and Sn@NRT was observed by the Raman spectra, which were obtained using a high resolution dispersive Raman microscope (ARAMIS, HORIBA) equipped with an Ar ion CW Laser (514.5 nm).

Surface Area and Pore Size Analyzer

The $N_2$ adsorption and desorption isotherms were determined by a Quantachrome Instruments Autosorb-1c apparatus at 77 K. The NRT and Sn@NRT were outgassed at 333 K and for 24 hours before measurements.

<Characterization of NRT>

Synthesis of the NRTs by Rayleigh Instability Transform

The unique structure of the NRT was controlled using the Rayleigh instability transform that is a very common phenomenon in nature. During the falling of a water from a faucet, a surface of a water cylinder undulates and finally forms separated droplets. The driving force of the transformation is the reduction of the surface energy. At first, the surface energy between air and the water cylinder is higher because of the larger surface area. The surface of the water cylinder undulates and finally breaks into individual spheres to reduce the surface energy. The phenomenon was first discovered by Plateau, who discovered that a liquid cylinder can undulate and disintegrate into a chain of droplets if the undulation wavelength ($\lambda$) is larger than the perimeter ($2\pi R_0$) of the liquid cylinder. Later, Rayleigh developed useful equations to predict the wavelength of the undulation by considering the fastest distortion mode.

The original theory of the Rayleigh instability is based on Newtonian fluids such as water. Later, similar phenomena were also discovered for other materials such as polymers and metals. Nichols and Mullins also used similar calculations and discussed the mass transport of solid cylinders. First-order perturbation solutions for surface diffusion and volume diffusion were obtained from their calculations. By introducing an infinitesimal longitudinal sinusoidal perturbation to an infinitely long cylinder of radius of $R_0$, the perturbed surfaces can be described as the following equation:

$$r = R_0 + \delta \sin(2\pi/\lambda)z \quad \text{Equation 1}$$

In the above equation, r is the radius, $\delta$ is the amplitude of the perturbation, $\lambda$ is the wavelength of the perturbation, and z is the coordinate along the cylinder axis. For the instability behavior of solid cylinders, the amplitude of a perturbation with a wavelength greater than $\lambda_0 = 2\pi^* R_0$ is unstable and can increase spontaneously with time. For surface diffusion dominating in most of the cases, the perturbation with a wavelength $\lambda_m = 2\pi\sqrt{2}R_0 = 8.89R_0$ yields the maximum growth rate. Under this condition, the cylinder breaks up into spheres with an average diameter d=3.78 $R_0$. Despite these equations, many factors on the behaviors of the Rayleigh-instability-type transformation of polymer thin films are confined in cylindrical pores. The thermal dynamics and kinetics of the transformation processes are related to many factors, such as the type of polymer, the polymer concentration, the annealing condition, and the interaction between the wall and the polymer. Usually, $\lambda$ is smaller than the expected value by the equation. This is because the equation is based on the water property, not the polymer. The polymer viscosity can lead to the different value from the equation.

In this work, FIG. 2 is a schematic diagram of the Rayleigh instability transformation, and a of FIG. 2 shows a process for a controlled synthesis of the external morphology using MF resins and surfactants F217 in the hard template, and b and c of FIG. 2 show processes for a controlled synthesis of the NRT having internal compartments connected via the Rayleigh instability transform.

Figure 3:
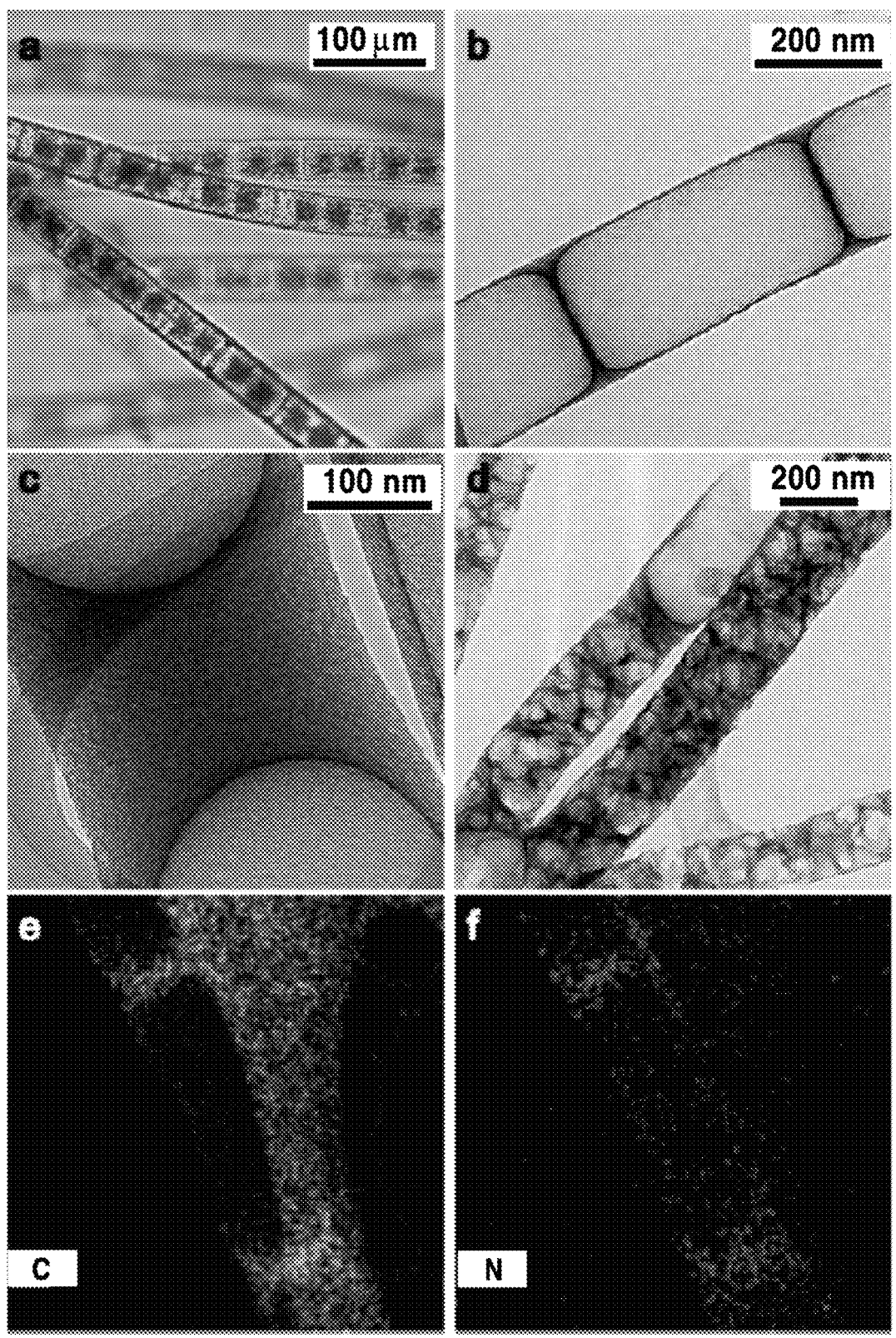
FIG. 3 provides TEM images showing the morphology of a carbonaceous structure in accordance with an example of the present disclosure.

In the present disclosure, a proper condition to make the biomimetic N-rich nanotube (NRT) using melamine formaldehyde resin was found via the Rayleigh instability transformation. Melamine formaldehyde resin is very easy to polymerize and concentrate in room temperature and atmosphere, thus it being very hard to make a specific morphology to be realized. In the present disclosure, the pertinent viscosity was made and the concentration of melamine formaldehyde resin was controlled by the addition of the surfactant F127. The F127 is the surfactant that can be used in appropriate conditions to make the NRT along with the other morphology depending on a flow rate. If the nanotube is prepared without additional surfactants, it may be possible to obtain only an amorphous carbon nanorod as shown in d of FIG. 3. Moreover, surfactants are very effective to create a lot of pores and channels on walls of the nanotube during an annealing process and can give positive effects to enhance electronic transfers.

Characteristics of NRT

Figure 4:
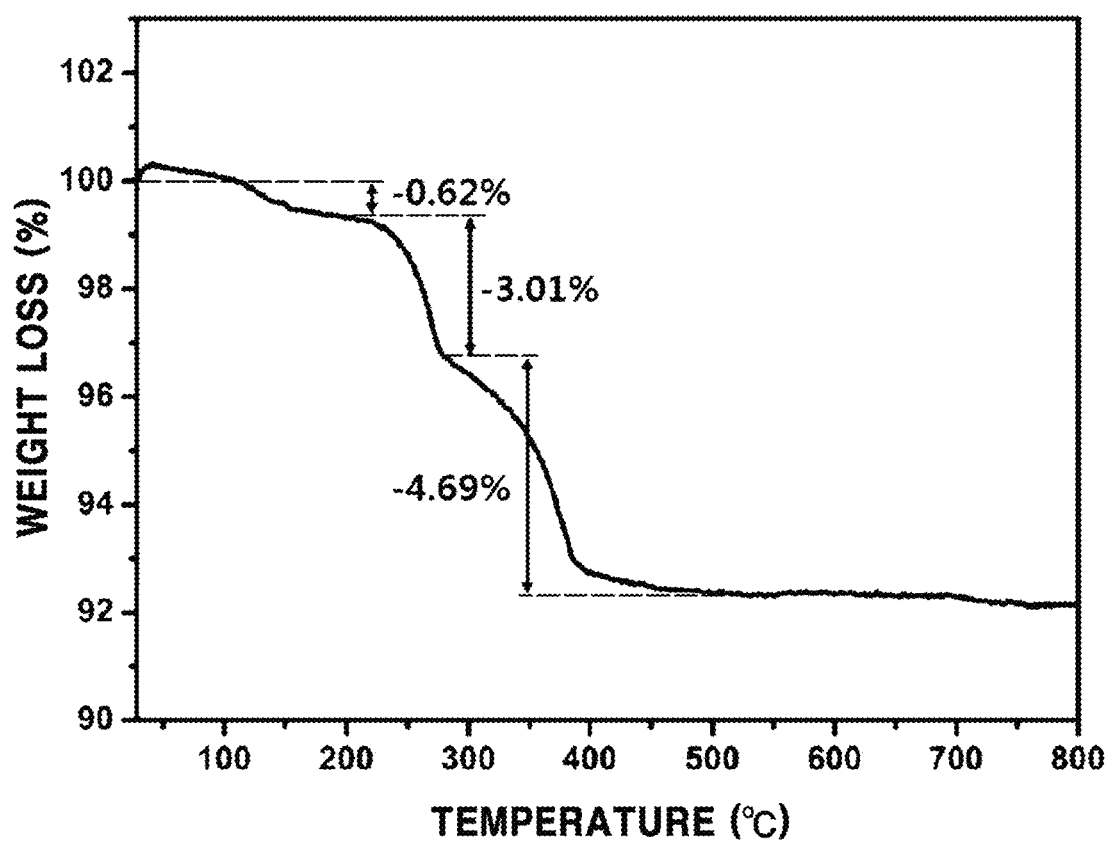
FIG. 4 shows thermogravimetric analysis data of a material for preparing a carbonaceous structure in accordance with an example of the present disclosure.
Figure 21:
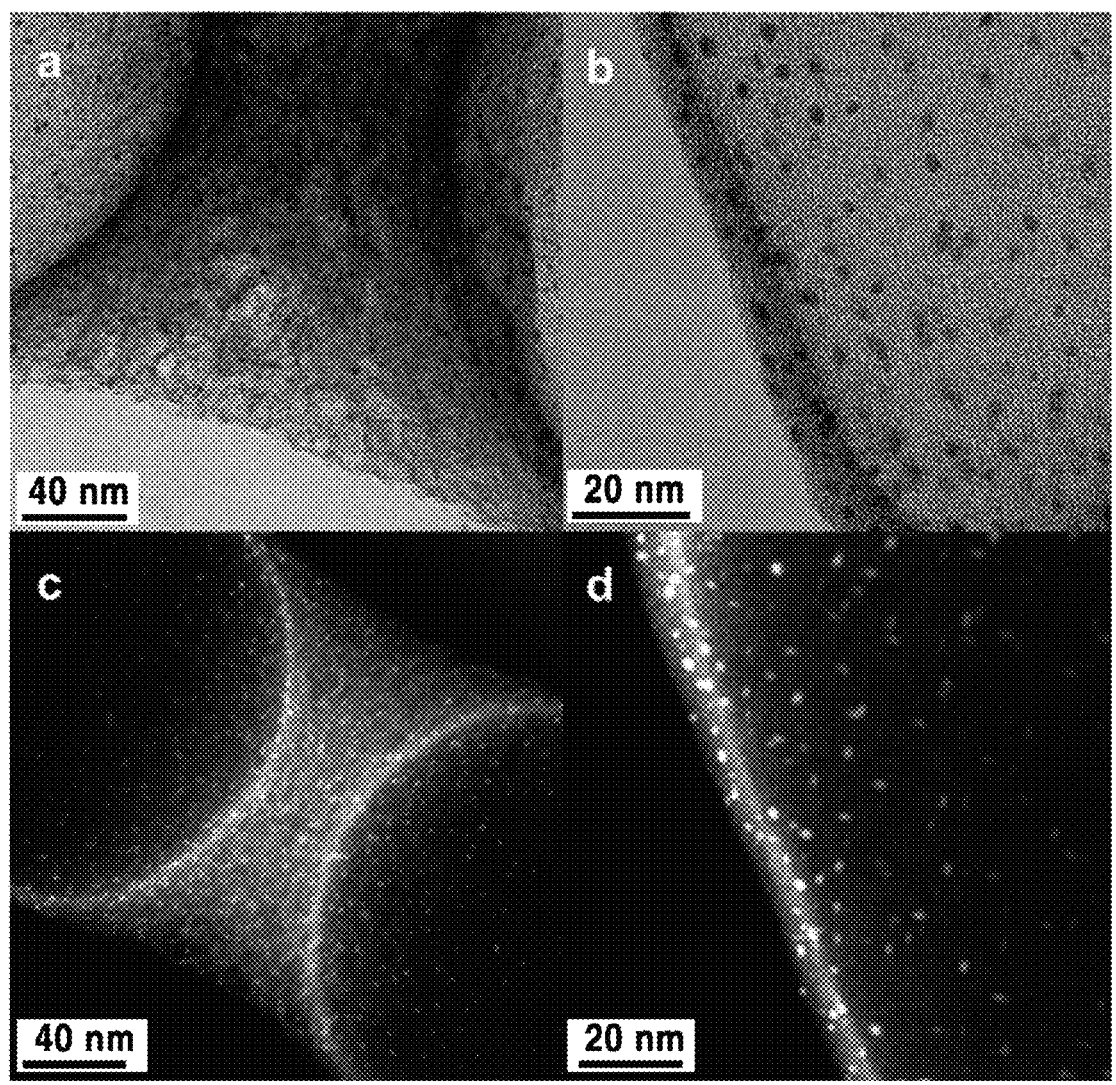
FIG. 21 shows TEM images (a, b) and STEM images (c, d) of a carbonaceous structure in accordance with an example of the present disclosure.
Figure 27:
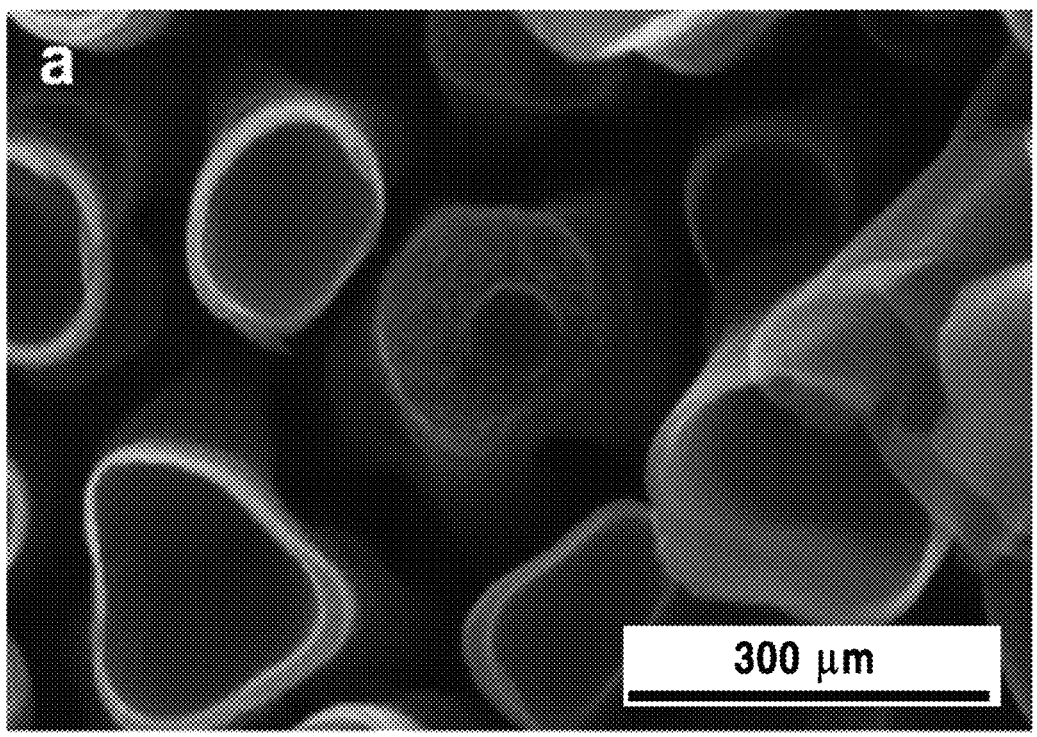
FIG. 27 shows cross-sectional SEM images of a film including a carbonaceous structure and a partition wall of the structure in accordance with an example of the present disclosure.
Figure 27:
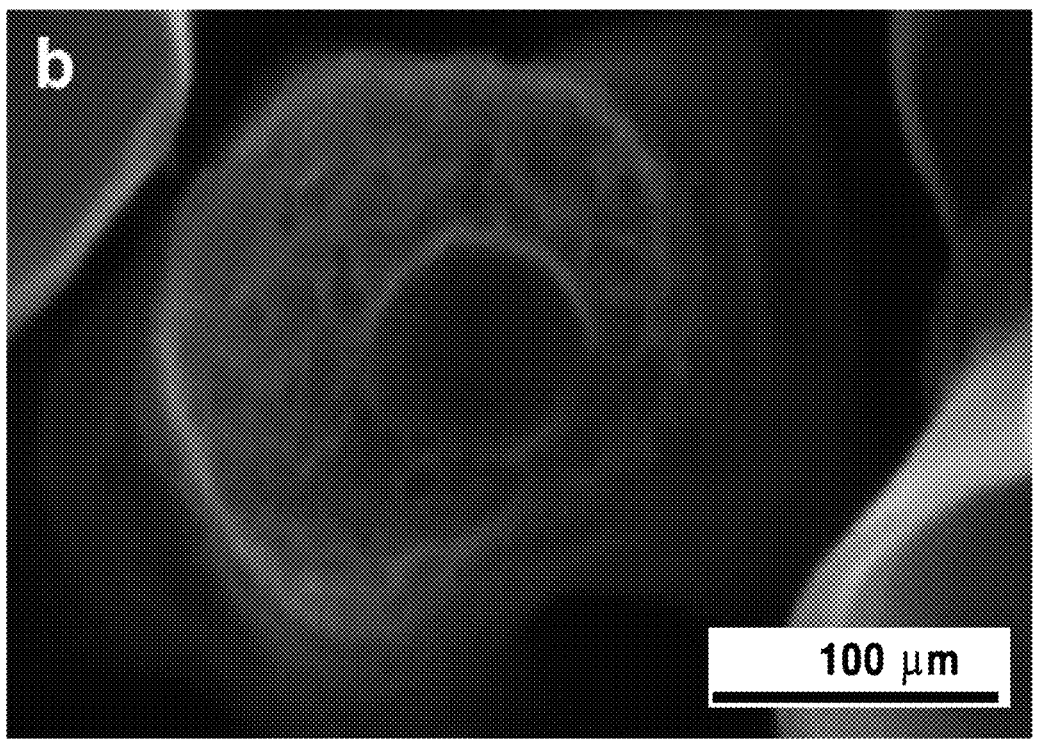

The NRT has hollow compartments that are continuously connected. It is possible to recognize the morphology of NRT from FIG. 3 providing the TEM images of NRTs. Further, FIG. 4 also provides the thermogravimetric analysis (TGA) data of melamine formaldehyde and surfactant mixtures along with the AAO template, where the TGA analysis were performed under an argon atmosphere at a heating rate of 1° C./min. The first weight loss stage from 100° C. to 210° C. is ascribed to the dehydration of the mixture. Further, a significant weight loss appears in the range of 210° C. to 260° C., mainly due to the decomposition of the surfactant F127. The decomposition of F127 was found to result in a lot of pores and open mesoporous channels on the NRT wall. Furthermore, the weight loss was determined to occur in the temperature range of 180° C. to 390° C. corresponding to the elimination of formaldehyde either forming methylene bridges or helping to break methylene bridges. Additionally, a tiny weight loss beyond 390° C. is attributed to the thermal degradation of a triazine ring. To determine the $N_2$ adsorption/desorption volume and the active surface area of the NRT and Sn@NRT, samples of the NRT and Sn@NRT films were prepared by filtration using a PTFE filter and an aspirator. In the present disclosure, it was found that the NRT and Sn@NRT can stack very easily to form the thick film homogeneously from their feature of cylindrical tube structures. Then, the $N_2$ isotherm measurements were performed on the samples synthesized under the various amounts of soft templates (FIG. 16). The NRTs synthesized using 1 g (NRT_1 g), 4 g (NRT_4 g) and 8 g (NRT_8 g) of F127 soft templates were provided to provide the similar $N_2$ isotherms and pore distributions with the NRTs (NRT_2 g) used in the present disclosure. The specific surface areas of the NRT_1 g, NRT_4 g, and NRT_8 g are 205.3 $m^2$ $g^{-1}$, 219.7 $m^2$ $g^{-1}$, and 189.92 $m^2$ $g^{-1}$, respectively, while the pore sizes for the NRT_1 g, NRT_4 g, and NRT_8 g are 4.0 nm, 2.9 nm, and 2.6 nm, respectively. The difference in the pore size distribution is attributed to the wall thickness of the NRT as it is decreased when the more amounts of soft templates have been used in the synthesis step. FIG. 27 also shows the cross-section of the NRT film. In the present disclosure, it was found that the NRTs are well aligned and the cross-section of the partition wall for the NRT can be observed. The partition wall of the NRT has lots of pores and open mesoporous channels that can facilitate transfer of Li ions and $PF_6$ ions. Further, to investigate how Li ions and $PF_6^-$ ions can penetrate through the NRT walls, a thin (0.01 M) chloroplatinic acid solution ($H_2PtCl_6$) was prepared and the NRT was put in the solution for 5 minutes. Then, a water washing treatment was performed twice using the centrifuge. Then, the washed NRT was annealed. FIG. 21 demonstrates that Pt nanoparticles are located inside the cylindrical walls of the NRT, in partition walls, and internal compartment spaces of the NRT, while they are excluded on the outer surface of the NRT. This provides the clue that $PtCl_6^{2-}$ ions can penetrate through the NRT walls and can stay in the inner spaces of the NRT. Furthermore, it is notable that the size of $PtCl_6^{2-}$ ions (219 $Å^3$) is much bigger than that for $Li^+$ ions (1.99 $Å^3$) and $PF_6^-$ ions (73 $Å^3$). As a result, these support that Li ions and $PF_6^-$ ions can penetrate through the NRT like $PtCl_6^{2-}$ ions. Moreover, in the present disclosure, the open pores of the NRT were directly observed from STEM images (FIG. 21).

<Characterization of Sn@NRT>

Figure 10:
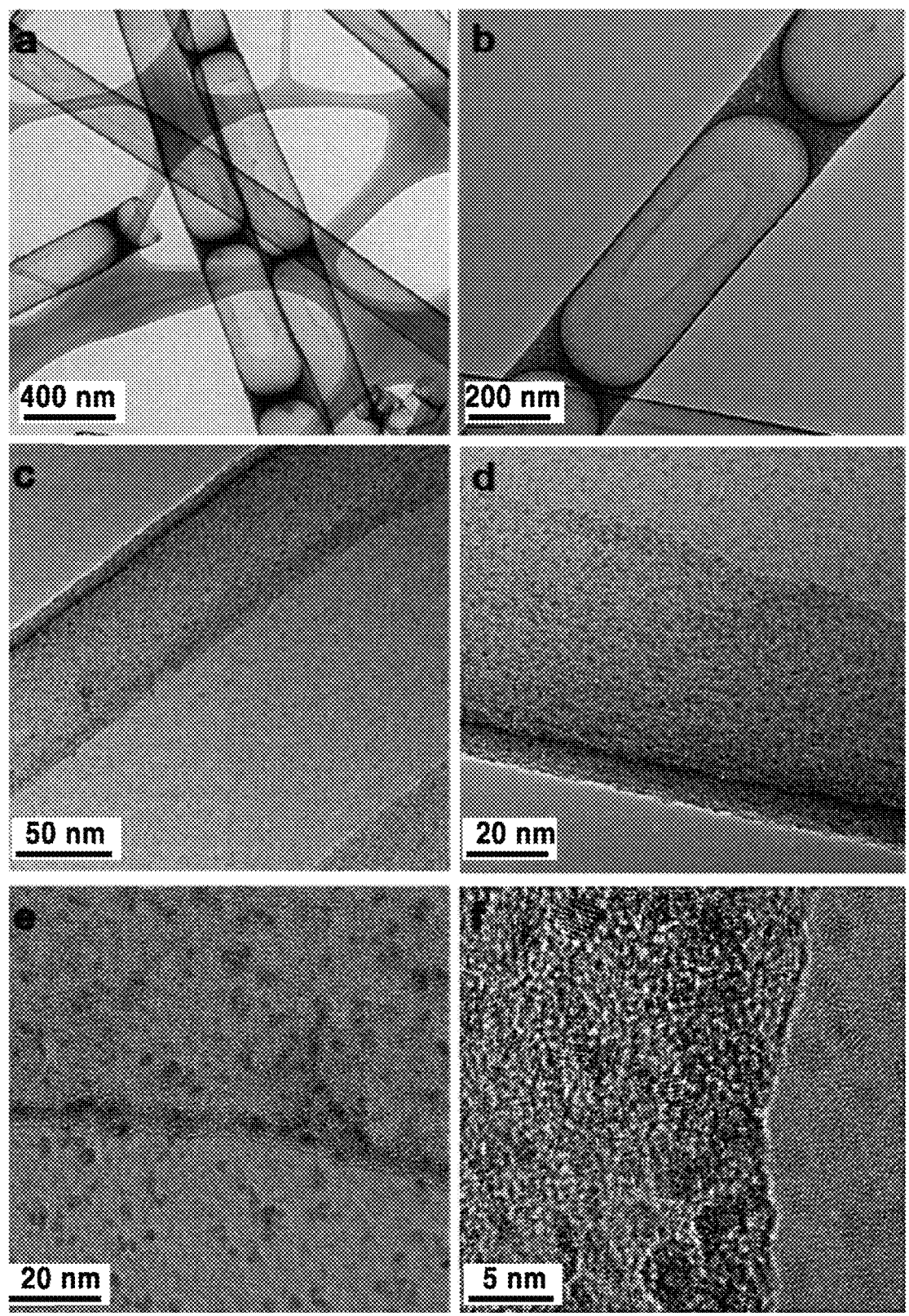
FIG. 10 shows TEM images of a carbonaceous structure in accordance with an example of the present disclosure.
Figure 11:
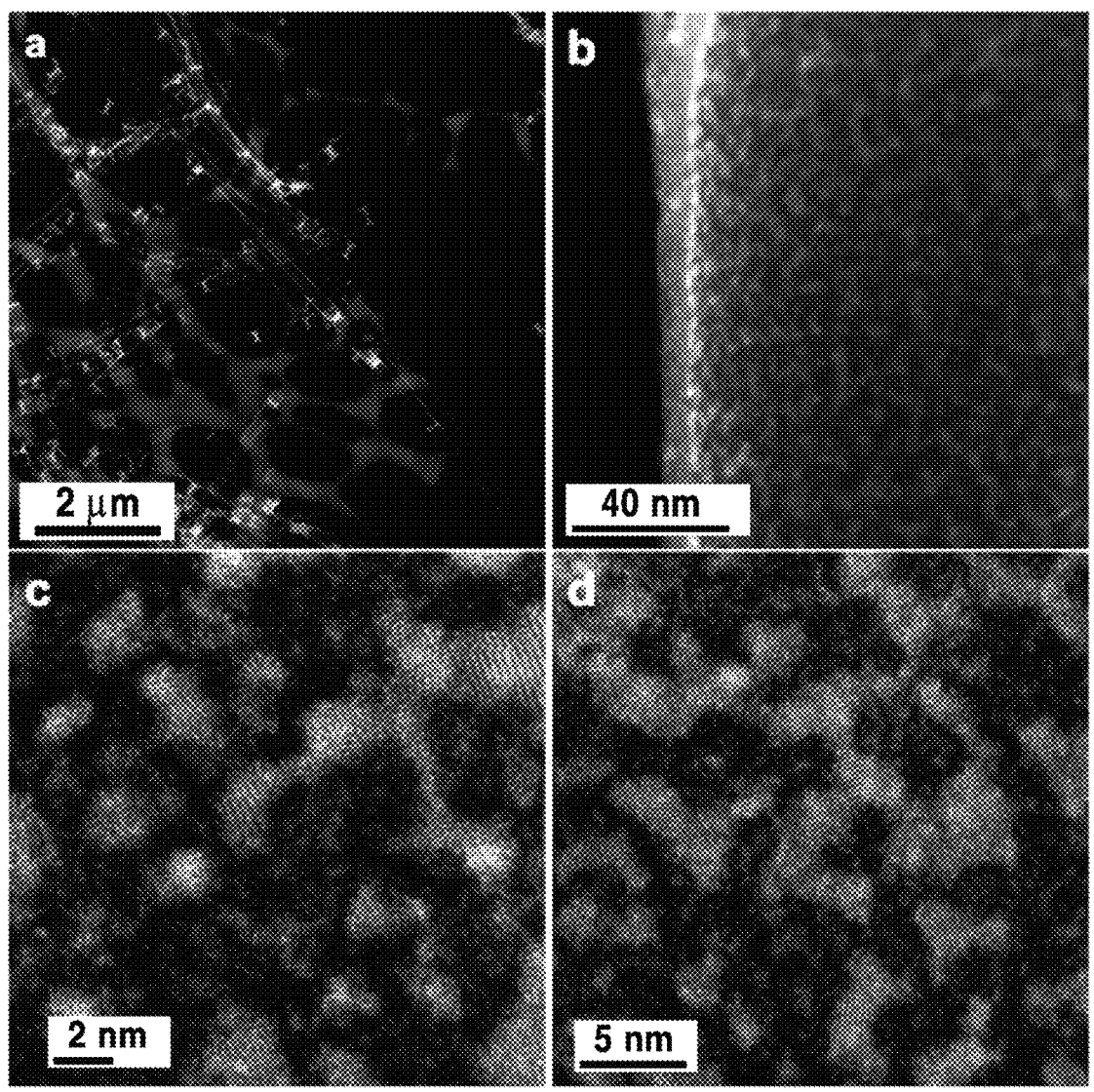
FIG. 11 shows STEM images of a carbonaceous structure in accordance with an example of the present disclosure.
Figure 12:
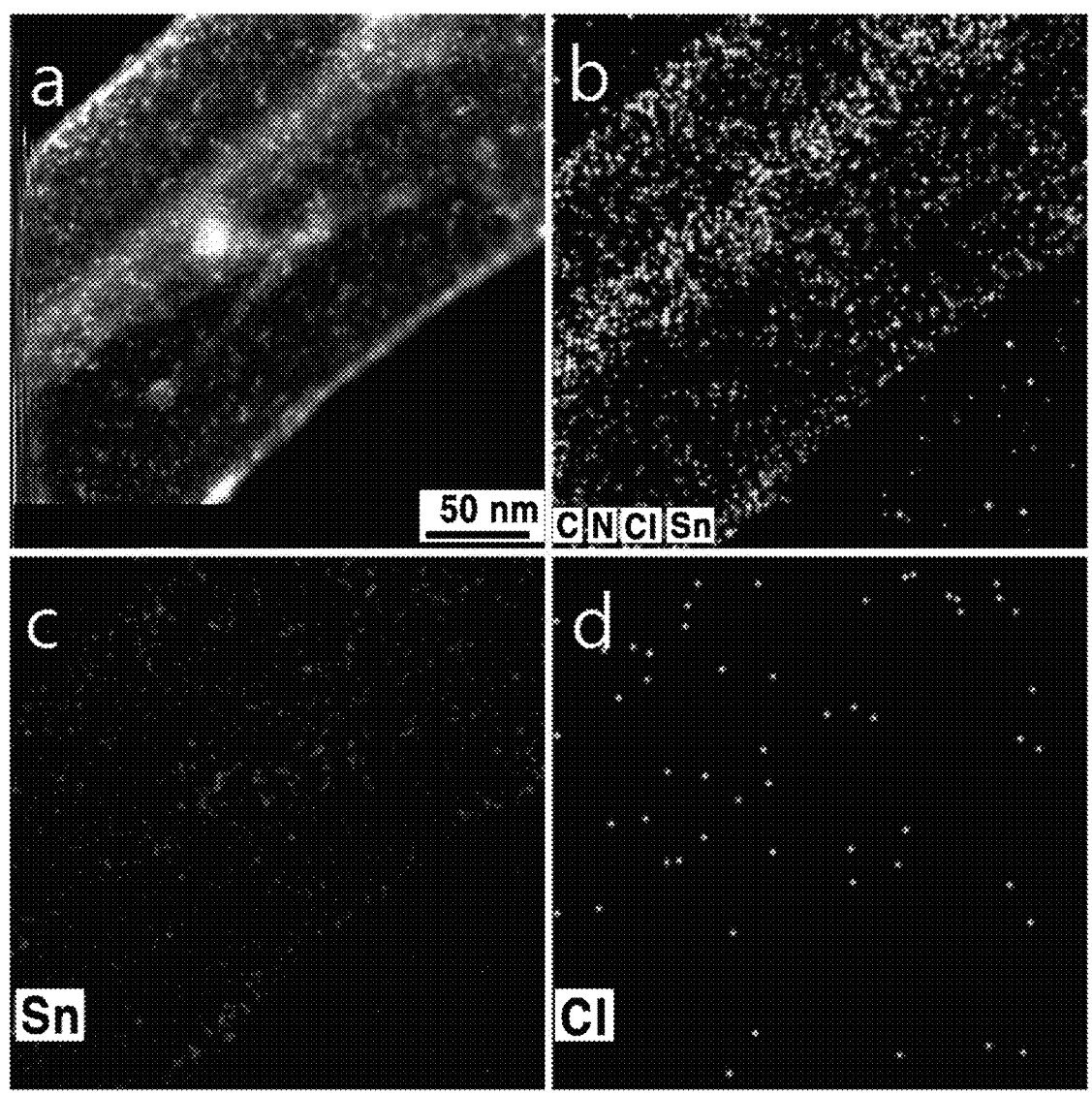
FIG. 12 provides an STEM image (a) and elemental mapping (b, c, d) of a carbonaceous structure in accordance with an example of the present disclosure.
Figure 13:
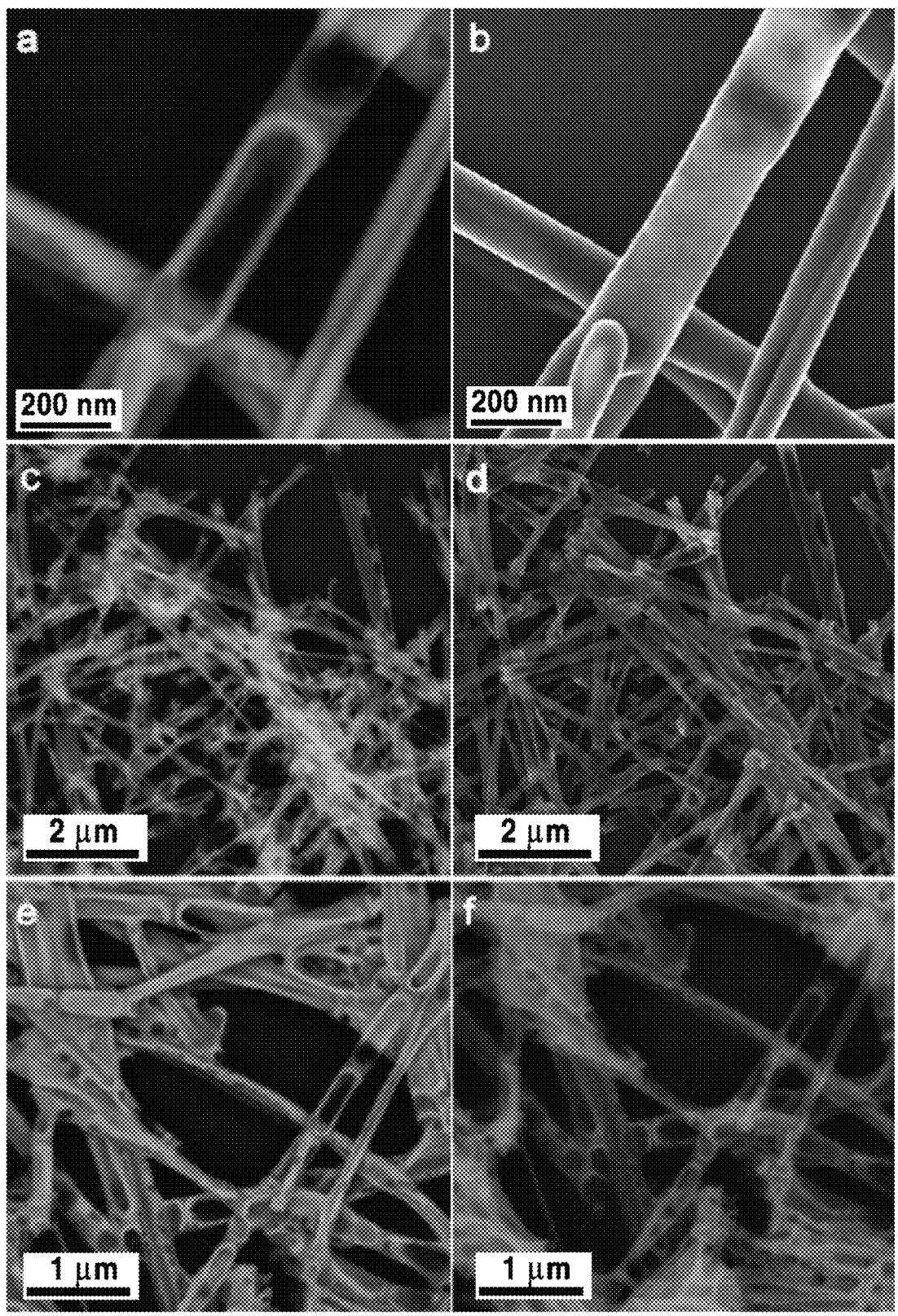
FIG. 13 shows backscattering electron (BSE) and secondary electron (SE) images of a carbonaceous structure in accordance with an example of the present disclosure.

TEM, STEM, BSE, and TGA analyses were used to characterize the Sn@NRT samples. FIG. 10 shows TEM images of the Sn@NRT. FIG. 11 shows STEM images of the Sn@NRT and further confirms that the Sn particles are located in the inner space of the NRT and form elliptical hollow shapes on the inner surface of each compartment room of the NRT. The results show that the tin particles in Sn@NRT are less than 5 nm in size. Additionally, c and d of FIG. 11 show the Sn@NRT treated for a longer time in the annealing step. The tin particles were found to be bigger than those of FIG. 10 and also to be more crystalized. Additionally, the elemental mapping images of FIG. 12 demonstrate that most of chlorides do not remain in the Sn@NRT structure. FIG. 13 (a to f) shows the BSE images of the same specimen in various magnifications, including the SEM image with the BSE detector using different beam voltages. In the present disclosure, it is possible to recognize the existence of tin in the inner spaces of the NRT structure from these images. The inner interface of the NRT is brighter than the wall of the NRT because of different atomic numbers between tin and carbon/nitrogen. A higher voltage SEM image with the BSE detector shows clearly that tin exists inside the NRT while the NRT wall is almost transparent in the image. Furthermore, the thermogravimetric analysis (TGA) result of Sn@NRT (FIG. 14) shows that the tin ratio in Sn@NRT is approximately 50%.

<Example 11> Preparation and Evaluation of Half-Cell

The NRT and Sn@NRT are found to have the uniformly sized long cylindrical shape like a pencil, so that it is very suitable to make an electrode uniformly. First, active materials, carbon black, and poly vinylidene fluoride binder (7:2:1 ratio) were mixed in N-methyl-2-pyrrolidone (NMP) to make a slurry. Then, the slurry was put on a pure Cu and Al foil current collector, and the slurry was plastered on the current collector using a uniform blade very carefully, where the NRT composites were allowed to move and roll on the current collector (FIG. 17). The cylindrical NRT-based materials were easy to be well arranged on the current collector. Then, the rolled NRT was stamped on the current collector to provide the enhanced contact with the current collector. The total mass loading of Sn@NRT and NRT electrodes were determined to be 1.1 mg cm$^{-2}$ and 1.43 mg cm$^{-2}$, respectively. The SEM image of the Sn@NRT electrode (FIG. 19) manifests the Sn@NRTs uniformly arranged on the current collector.

Figure 20:
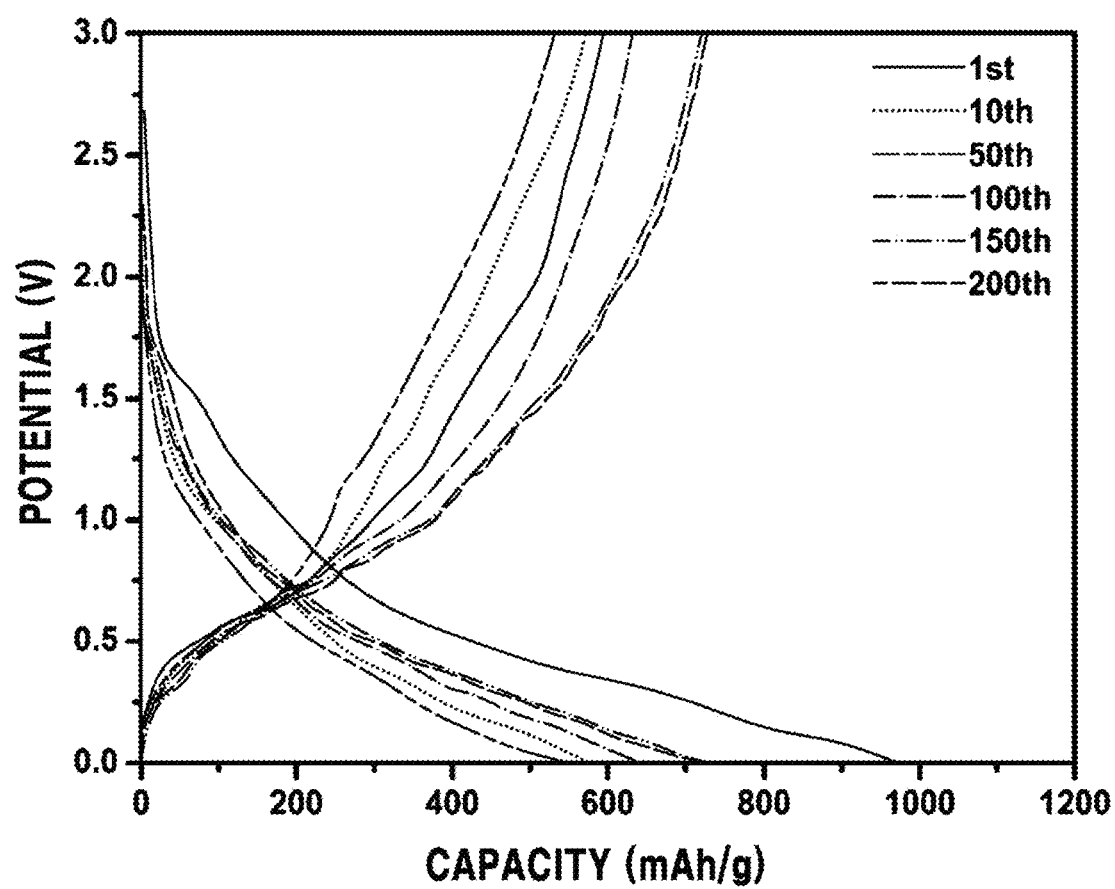
FIG. 20 shows voltage (0.02 V to 3 V) vs. capacity (50 mA/g) profiles during different cycles on an electrode material including a carbonaceous structure in accordance with an example of the present disclosure.
Figure 22:
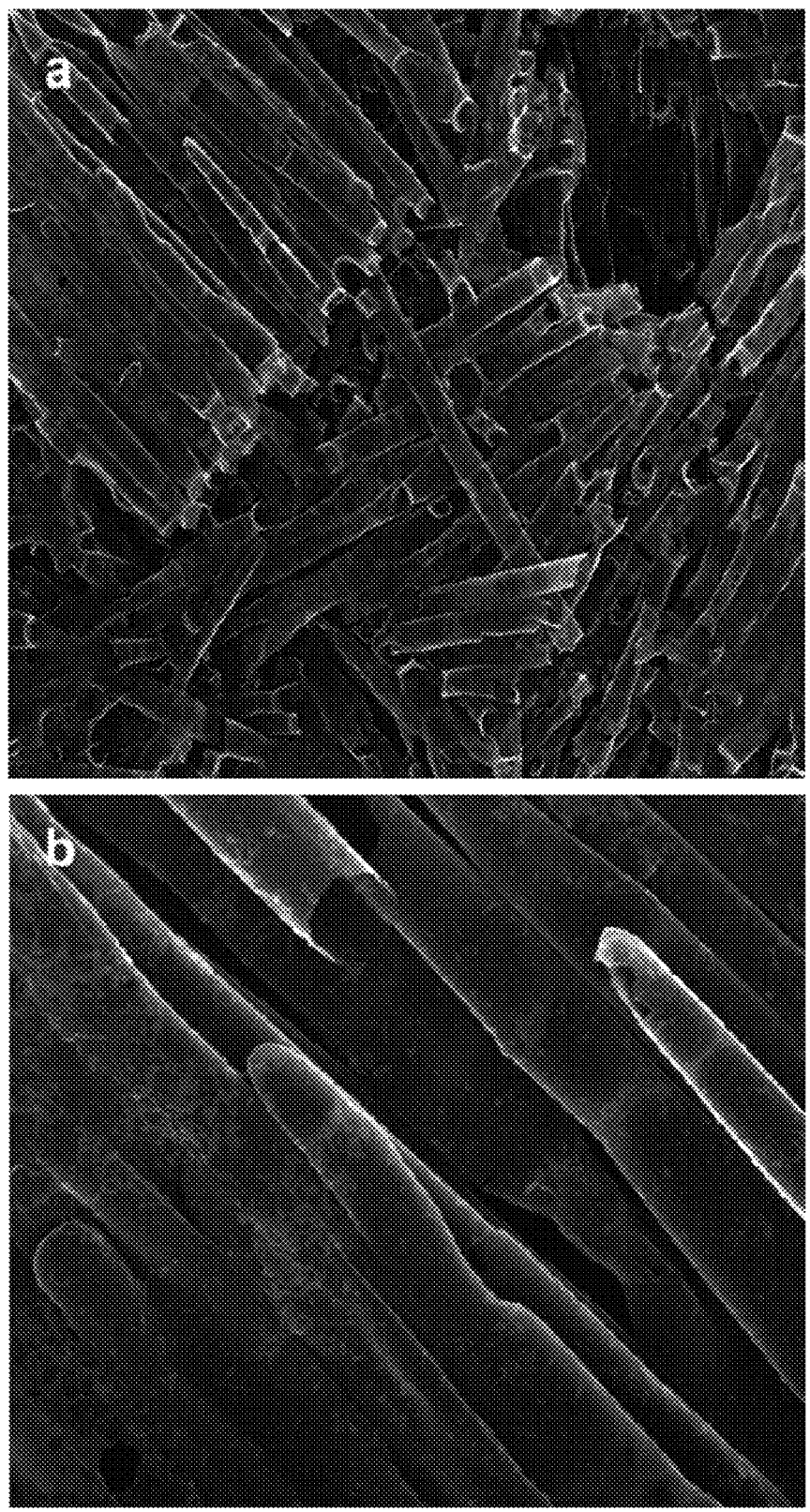
FIG. 22 shows an SEM image (a) of an initial electrode material including a carbonaceous structure and an SEM image (b) after 200 cycles in accordance with an example of the present disclosure.
Figure 23:
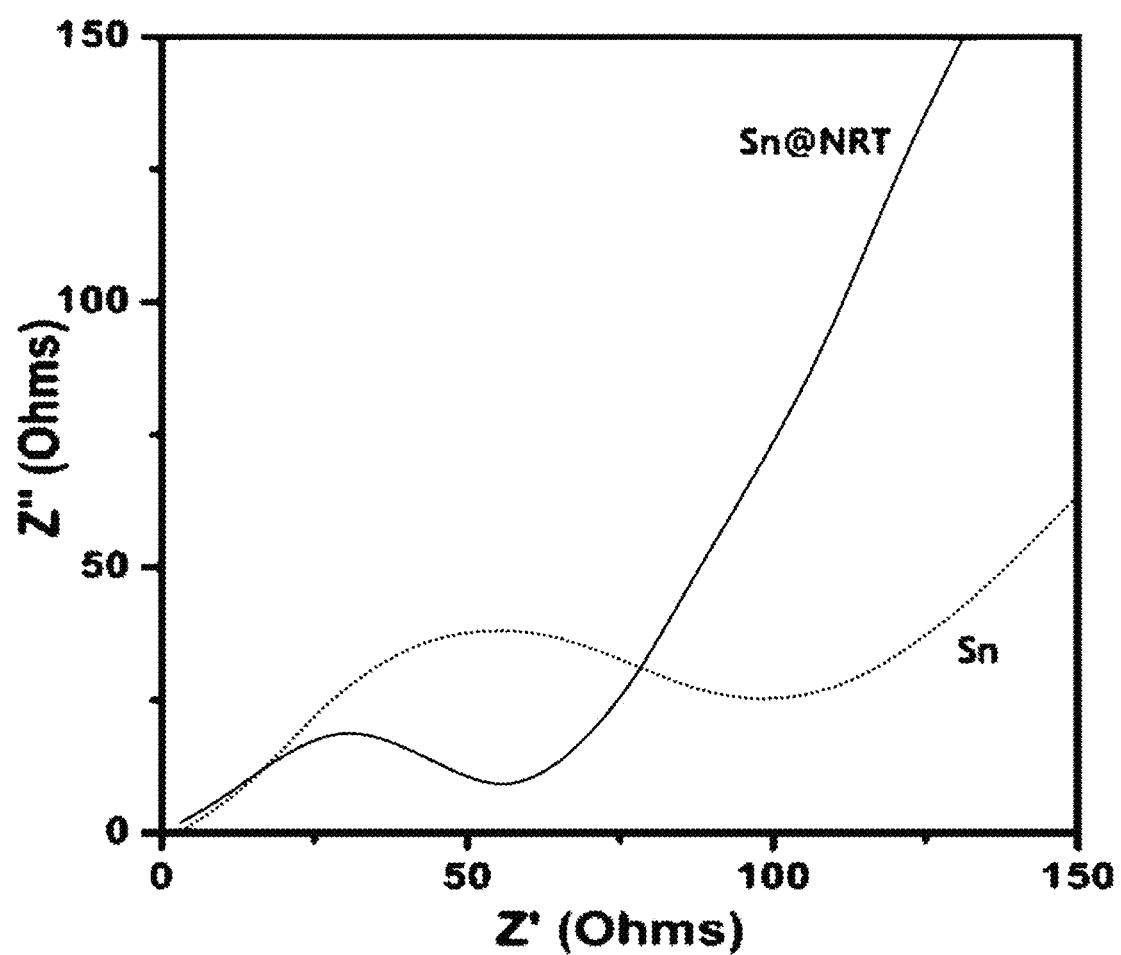
FIG. 23 shows electrochemical impedance spectroscopy (EIS) analysis data of an electrode material including a carbonaceous structure in accordance with an example of the present disclosure and a comparative example.
Figure 28:
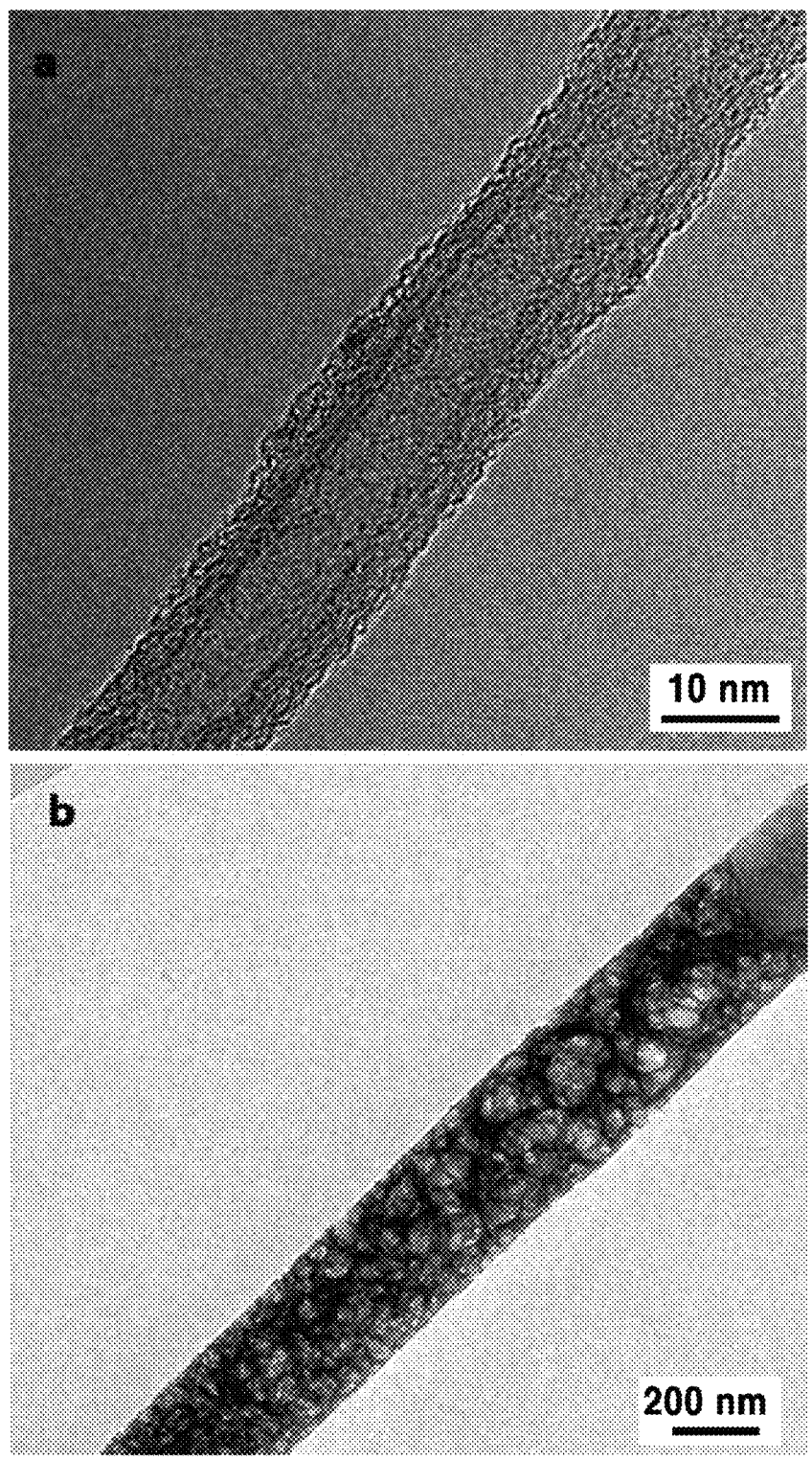
FIG. 28 shows TEM images of comparative examples of a carbonaceous structure in accordance with an example of the present disclosure.

The electrochemical performance of the prepared samples was investigated using a CR2032 coin type cell with a pure lithium metal as the counter/reference electrode. 1 M of lithium hexafluorophosphate (LiPF$_6$) dissolved in co-solvents of ethylene carbonate (EC) and diethyl carbonate (DEC) (v:v=1:1) was used as the electrolyte. Celgard 2400 polypropylene was used as a separator. The electrodes were cycled in a potential range of 0.02 V to 3 V and 3 V to 4.6 V (vs Li/Li+) for anode and cathode, respectively, at room temperature using a battery cycler (Biologic, VSP, Wonatech, WBCS-3000). FIG. 20 shows the Sn@NRT anode voltage vs. capacity profile which was examined at a specific current of 50 mA g$^{-1}$ with a high loading of 2 mg cm$^{-2}$. FIG. 23 shows the electrochemical impedance spectroscopy (EIS) analysis result about NRT and Sn@NRT. The Sn@NRT has obviously a lower resistance than that for Sn due to a significantly smaller diameter of the semicircle in the plot. In addition, it was found that the tin-encapsulated NRT composite could effectively enhance the electric conductivity and reduce charge transfer resistances. Additionally, the Sn@NRT electrode was checked after 200 cycles through the SEM analysis (FIG. 22). The results show that the Sn@NRT was not damaged from repeated cycles and the SEI layer was located uniformly on the NRT surface. FIG. 28 shows the result obtained through a half-cell test for the cathode electrode using NRR and MWCNT. The NRR was obtained by the same carbon-nitride precursor (melamine formaldehyde resin) and the same synthesis procedure used for synthesis for the NRT, but without a soft template leading to formation of controlled pores and open mesoporous channels in an NRT structure (b of FIG. 28). Also, the MWCNT was prepared using the commercial powder (Nanocyl, NC7000) that has a negligible nitrogen content in its own structure (a of FIG. 28). From FIG. 29, the NRR and MWCNT mark 31 mAh g$^{-1}$ and 22 mAh g$^{-1}$ at the current density of 100 mA g$^{-1}$, respectively. These capacities were proven to be much smaller than the capacity of 74.6 mAh g$^{-1}$ even at a higher current rate of 200 mA g$^{-1}$ for the NRT. For the formation of the NRT, soft surfactants result in controlled pores and open mesoporous channels in their own structures. However, conventional CNTs could not have these controlled pores and open mesoporous channels so that the PF$_6^-$ ions could not penetrate through the external surface of the CNT into the internal void spaces or vice versa. Similarly, the NRR structure does not form controlled pores and open mesoporous channels induced by soft templates. Consequently, controlled pores and open mesoporous channels existing in the NRT facilitate transfer of PF$_6^-$ ions inside the compartments so that the NRT can store PF$_6^-$ ions at both internal and external surfaces of the NRT using its open mesoporous channels. According to the literature, the volume of PF$_6^-$ ions is 73 Å$^3$ and PF$_6^-$ ions can penetrate easily through the open mesoporous channels of the NRT and then can be confined at controlled pores bigger than PF$_6^-$ ion. The NRR also has negligible amounts of pores at small sizes so that it could not provide sufficient sites for PF$_6^-$ ions. Moreover, the nitrogen gives synergetic effects for adsorption of PF$_6^-$ ions. As discussed above, the nitrogen in carbon matrix has been demonstrated to provide the additional sites for ion adsorption. N-containing parts in carbon matrix can be a factor for amplifying the specific capacitance by additional active sites, where the nitrogen in carbon matrix was demonstrated to improve the charge mobility of negative charges on carbon surfaces.

<Example 12> Preparation and Evaluation of Hybrid Device (Full-Cell)

Figure 30A:
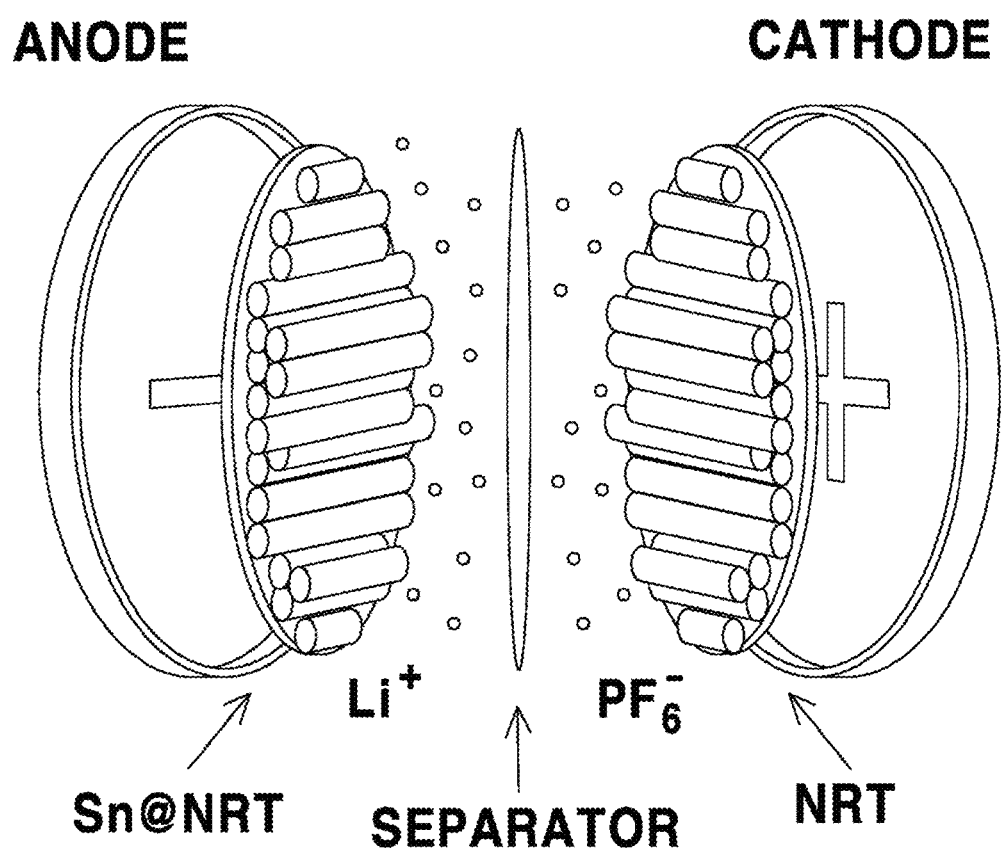
FIGS. 30A to 30G show a model of an energy storage device and the result of analysis on electrochemical performances thereof in accordance with an example of the present disclosure.
Figure 30B:
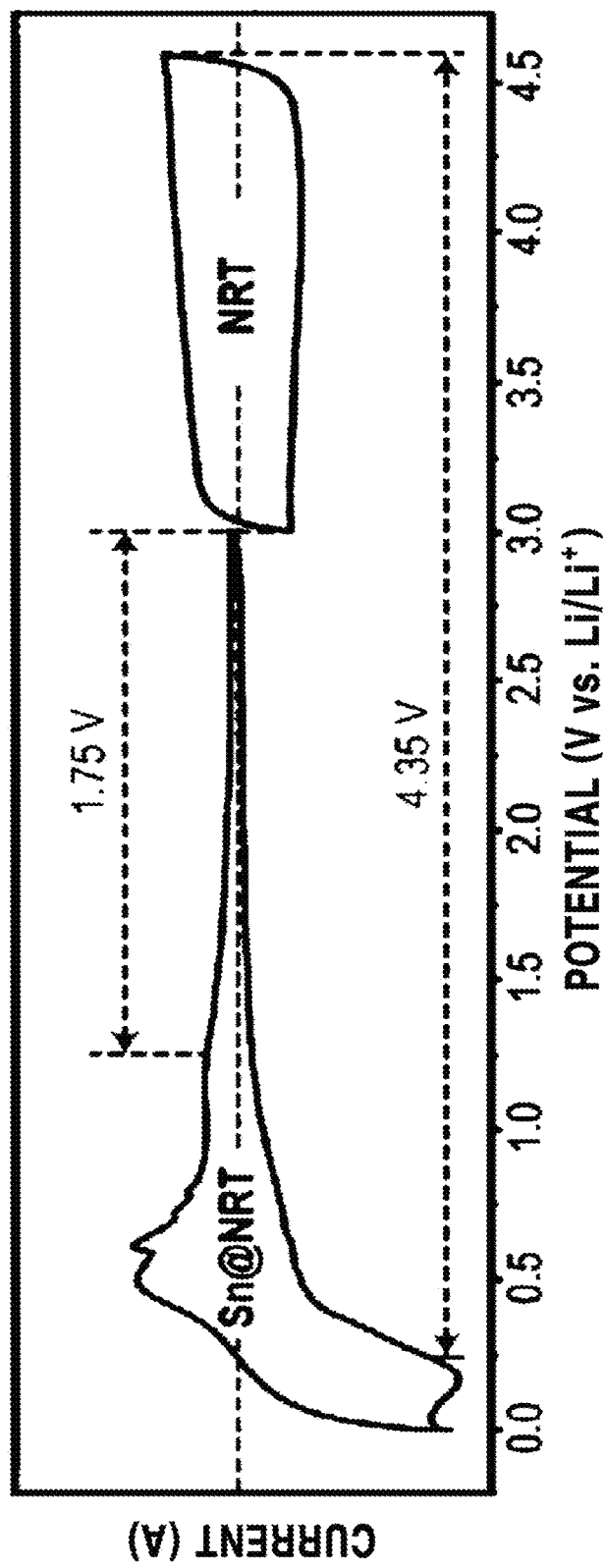
Figure 30C:
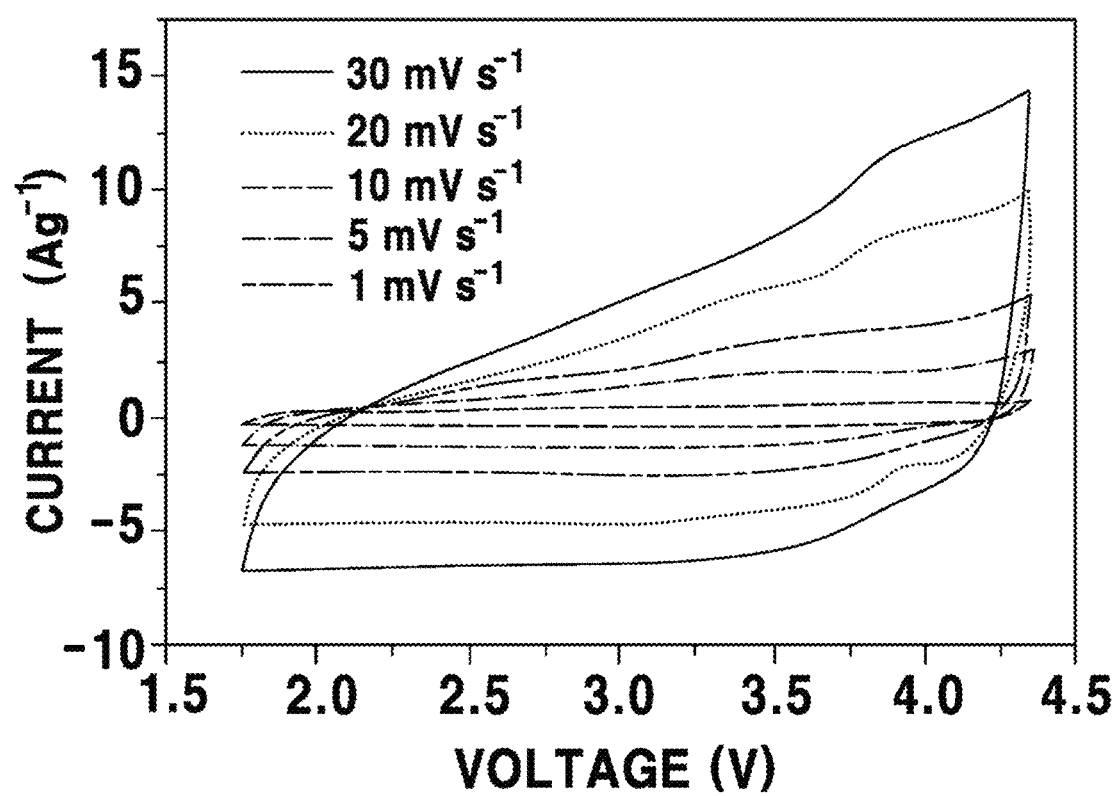

To evaluate the electrochemical performances of the Sn@NRT//NRT device in a full-cell configuration, an asymmetric hybrid type capacitor was fabricated using the Sn@NRT as the anode and the NRT as the cathode using a coin-type cell. Before fabrication, the Sn@NRT electrode was pre-lithiated to obtain the largest voltage difference between the anode and the cathode. The Sn@NRT electrode was in a direct contact to the lithium metal disc using the electrolyte for 3 hours and then the Sn@NRT electrode was assembled with the NRT cathode. 1 M lithium hexafluorophosphate (LiPF$_6$) dissolved in co-solvents of ethylene carbonate (EC) and diethyl carbonate (DEC) (v.v=1:1) was used as the electrolyte and the Celgard 2400 polypropylene was used as a separator. As shown in the CV profile of each electrode (see FIG. 18B and FIG. 24B), the Sn@NRT electrode demonstrates a major discharge potential at ~0.25 V (vs. Li/Li+) and the highest potential at ~1.25 V. Meanwhile, the NRT cathode shows a linear curve in the potential range from 3 V to 4.6 V (vs. Li/Li+). Based on these results, the full-cell configuration of Sn@NRT//NRT hybrid capacitors was measured in the voltage window of 1.75 V to 4.35 V (FIG. 30C). Another issue for optimizing hybrid device is the mass ratio between the anode and the cathode. According to the charge balance between the electrodes, the masses of the two electrodes should be adjusted to equalize the total charge. Based on the specific capacitances of the both electrodes and also the principle of charge balance, the mass ratio of Sn@NRT to the NRT was determined to be 0.769. The total mass of active material on the anode was 1.1 mg cm$^{-2}$ while that on the cathode was 1.43 mg cm$^{-2}$. To extend device performances to the real device range, the high mass loading electrode was also prepared and the performance thereof was measured (FIG. 32). The mass loading of Sn@NRTs as the anode was determined in the range of 4.8 mg cm$^{-2}$ to 5.24 mg cm$^{-2}$ while NRTs as the cathode was in the range of 6.35 mg cm$^{-2}$ to 7.11 mg cm$^{-2}$. The thickness of the electrodes was achieved to 140 μm (FIG. 31), matching with the 30% active materials used in real devices taking account other components. The total mass loading on electrodes for evaluating the full-cell performances was set up to 7 mg cm$^{-2}$ on the thickness of 140 μm. The CV and gravimetric charge/discharge data at various scan rates were measured using a multichannel potentiostat (Biologic, VSP). In the galvanostatic data, the IR drop at the upper cut-off potential and the slope in the discharge curve were used to obtain the average power and energy densities. Also, the cell-discharge capacitance ($C_{cell}$) was calculated using the following relationship of Equation 2 and the specific capacitance (Cs) was calculated by using the following Equation:

$$C_{cell}=i \times t/\Delta V \quad \text{(Equation 2)};$$

$$C_s=4C_{cell}/m \quad \text{(Equation 3)}$$

In the equations, where i is the applied current (A), t is the discharge time (s), m is the total mass (g) of active materials in both the anode and cathode, and ΔV is the potential difference (V). Similarly, the power density (P, W kg$^{-1}$) and the energy density (E, Wh kg$^{-1}$) were calculated using the following equations:

$$P=V \times i/m \quad \text{(Equation 4)};$$

$$E=P \times t/3600 \quad \text{(Equation 5)};$$

$$V=(V_{max}+V_{min})/2 \quad \text{(Equation 6)}$$

in which $V_{max}$ and $V_{min}$ are the potentials (V) at the beginning and the end of the discharge.

<Characterization of Energy Storage Device>

FIG. 1 shows the overall procedures for design of the NRT for a hybrid full-cell capacitor according to Example 12, where the external morphology for the NRT was controlled using a hard template of anodized aluminum oxide and the internal hollow connected compartments were created via the Rayleigh-instability transform (FIG. 2) using a soft template of a surfactant. It is notable that the appearance of the as-prepared NRT is similar to that of a filamentous Ulothrix zonata (a of FIG. 3). The hollow connected compartments (b and c of FIG. 3) provide the spaces to accommodate ultrafine metal NPs.

Furthermore, the conductive NRT including N is effective for fast electron transfer. Upon inserting a melamine precursor into a cylindrical template via pressure filtration, the surfactant was observed to form micelles (FIG. 1, a-i). The hard template was then dried under a vacuum condition, which was observed to cause the melamine resin to transform into the Rayleigh-instability-induced structure (FIGS. 1, a-ii and a-iii). The Rayleigh instability originates form the instability of liquid cylinders by the surface tension. A liquid cylinder tends to undulate its free surface with wavelengths larger than the circumference of the cylinder. Consequently, the driving force for the surface undulation results in a decrease of the surface area and the total surface energy. The wavelength λ affects the nanotube by determining the shape of the compartment, as described below, $$\lambda=2\pi\sqrt{2b} \quad \text{(Equation 7)};$$

in the above equation, b represents the radius of a thin liquid film inside a capillary. The ratio of λ/b, which is crucial to form empty compartments along the inside alley of the template, was found to have a value of 8.89 larger than the typical value. Subsequently, the dried template with the precursor was heated in a tube furnace under the inert condition for full carbonization. In this step, the surfactant forming the micelle was pyrolyzed where the mesopores in the wall of the NRT were introduced after the removal of the surfactant (FIG. 1, a-iv). Then, the NRT was detached from the hard template in a base solution (FIG. 1, a-v). In the present Example, it was found that the developed compartments had open mesoporous channels of about 3.8 nm in diameter connected to the external surface of the NRT. These channels provide a distinct advantage in that they enable facile ion insertion/desertion reactions. Additionally, the N atoms on the internal surface of each compartment can provide binding sites to anchor metal precursors, thus suppressing agglomeration of metal NPs during repeated redox cycles. Moreover, the N can provide enhanced electrolyte wettability and the additional ion adsorption sites. It is notable that the surfactant plays an important role to enable Rayleigh-instability transformation. In general, the melamine resin cannot induce the Rayleigh-instability transformation because it is easily polymerized when being dried by heat. In addition, the surfactant blocks polymerization between the melamine resins, thus enabling the melamine resins not to form nanorods. d of FIG. 3 supports that an amorphous carbon nanorod having no compartment structure is derived from melamine resins if the surfactant is not used.

Figure 8A:
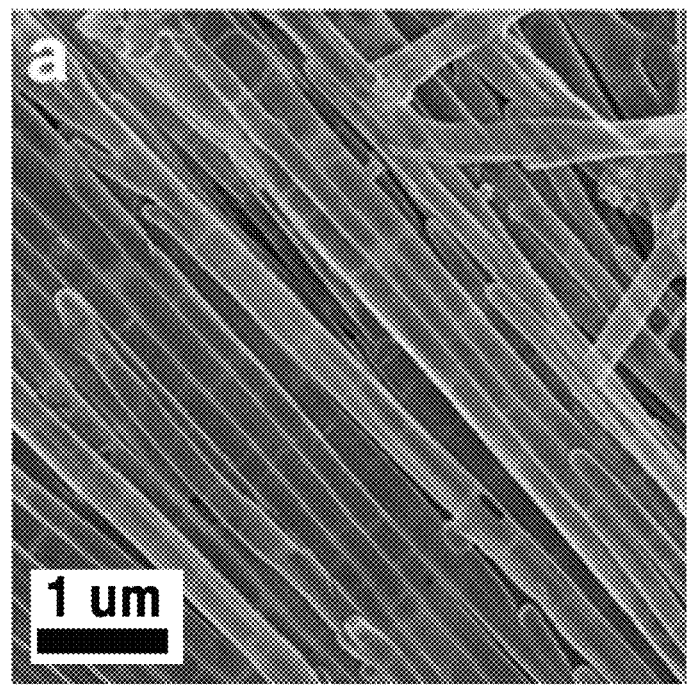
FIGS. 8A to 8K provide an SEM image (A), TEM images (B, C, D), STEM images (E, F, G), elemental mapping (H), an XRD pattern (I), nitrogen adsorption/desorption (J), and pore size distribution (inset in FIG. 8J), and the analysis result of XPS (K) of a carbonaceous structure in accordance with an example of the present disclosure.
Figure 8B:
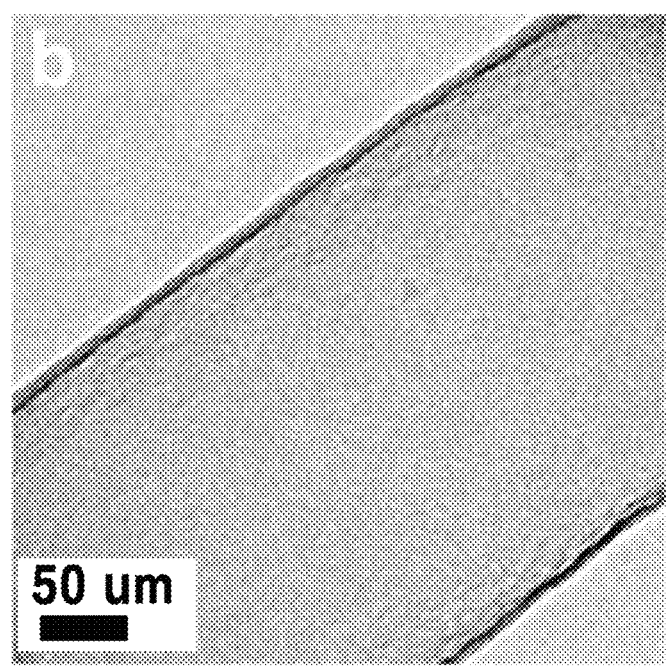

The scanning electron microscope (SEM) and transmission electron microscope (TEM) images (FIG. 8A and FIG. 8B) reveal that the NRT on several micrometer-scale sizes in length has hollow internal connected compartments. Moreover, the elementary mapping images (e and f of FIG. 3) for N and C atoms of the NRT show that the N atoms are uniformly distributed in the carbon matrix.

The thermogravimetric analysis data (FIG. 4) for melamine formaldehyde and surfactant mixtures along with the hard template indicate that the first weight loss attributed to the dehydration of the mixture occurs from 100° C. to 210° C., while a significant weight loss occurs in the range of 210° C. to 260° C. due to the decomposition of the surfactant F127. The decomposition of the F127 results in numerous pores and channels on the walls of the NRT. In addition, the weight loss was determined to occur in the temperature range of 180° C. to 390°, corresponding to the elimination of formaldehyde used to form or break methylene bridges. The weight loss above 390° C. is attributed to thermal degradation of the triazine ring.

Figure 7:
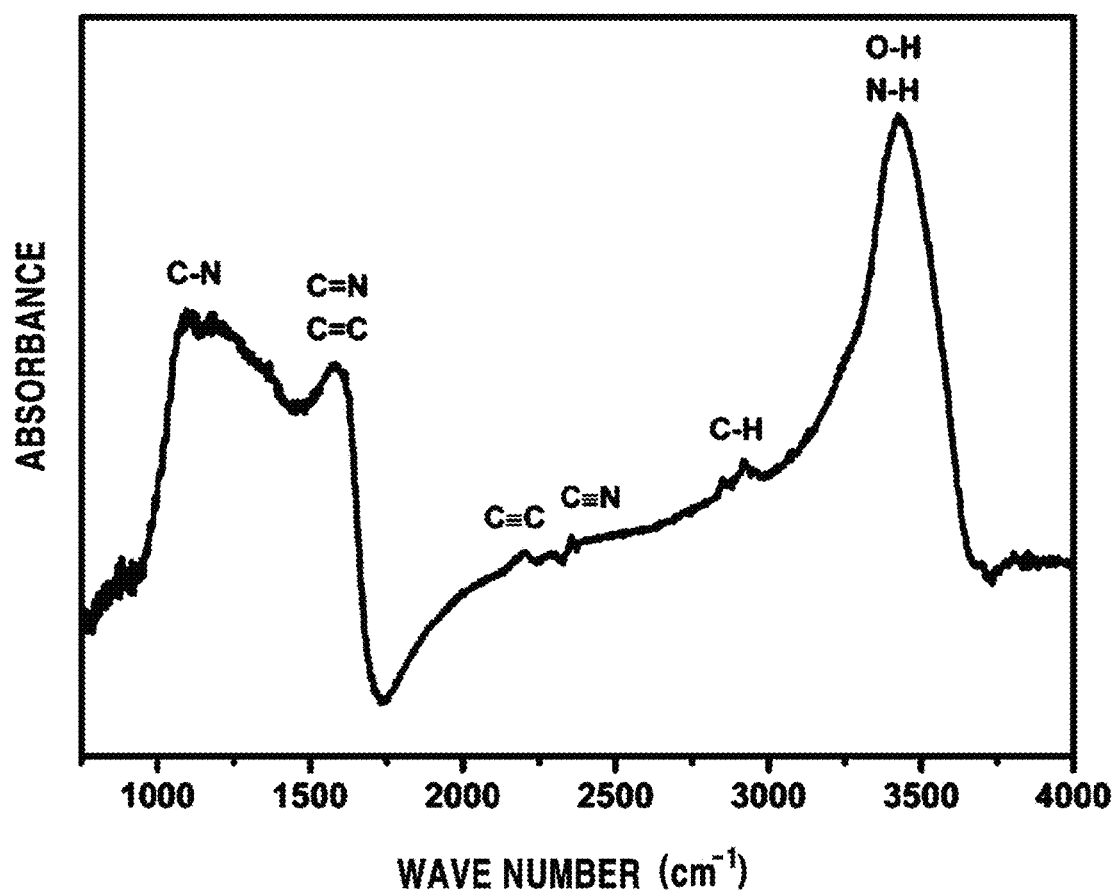
FIG. 7 shows the result of a Fourier-transform infrared spectroscopy analysis of a carbonaceous structure in accordance with an example of the present disclosure.

Further, the Fourier-transform infrared (FT-IR) spectroscopy analysis of the NRT (FIG. 7) confirmed the configurations of N atoms in the carbon matrix. The resonance at the stretching frequency at about 1100 cm$^{-1}$ corresponds to the aliphatic —C—N stretch, whereas that at about 1600 cm$^{-1}$ corresponds to the stretching of N atoms in coordination with the aromatic sp$^2$ carbon. Moreover, the 2900 cm$^{-1}$ resonance is a result of the strong alkyl C—H stretching and the 3400 cm$^{-1}$ peak originates from the N—H stretch in a hydrogen bonding interaction with O—H. In addition, the weak signals for nitrile (—CN) stretching are observed at 2240-2260 cm$^{-1}$, implying that the number of N atoms in the nitrile groups is very small relative to that in the aromatic groups.

Figure 8C:
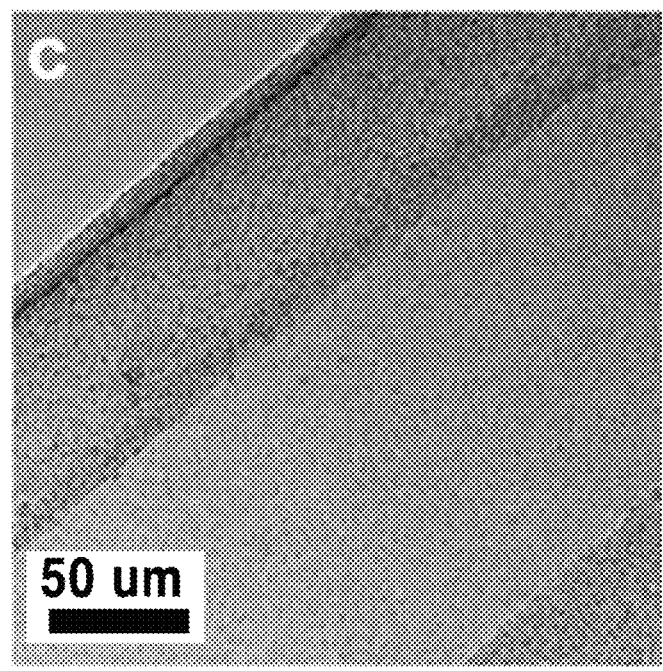
Figure 8D:
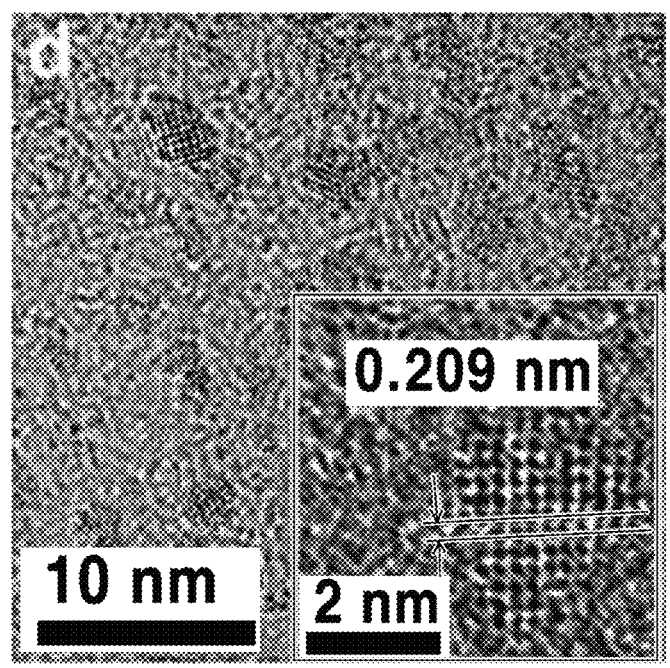
Figure 8E:
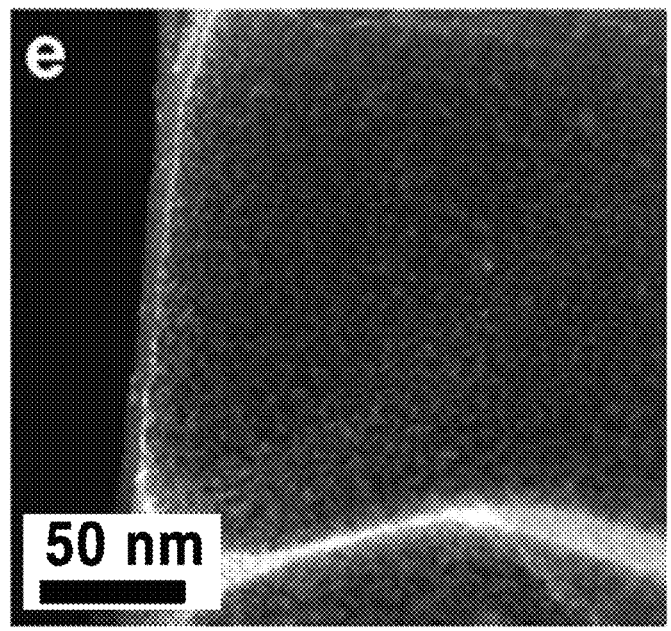
Figure 8F:
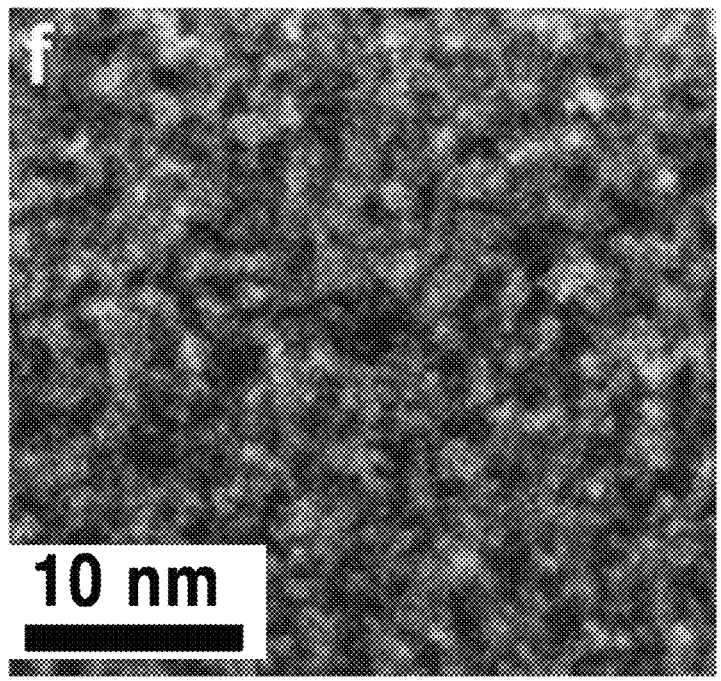
Figure 8G:
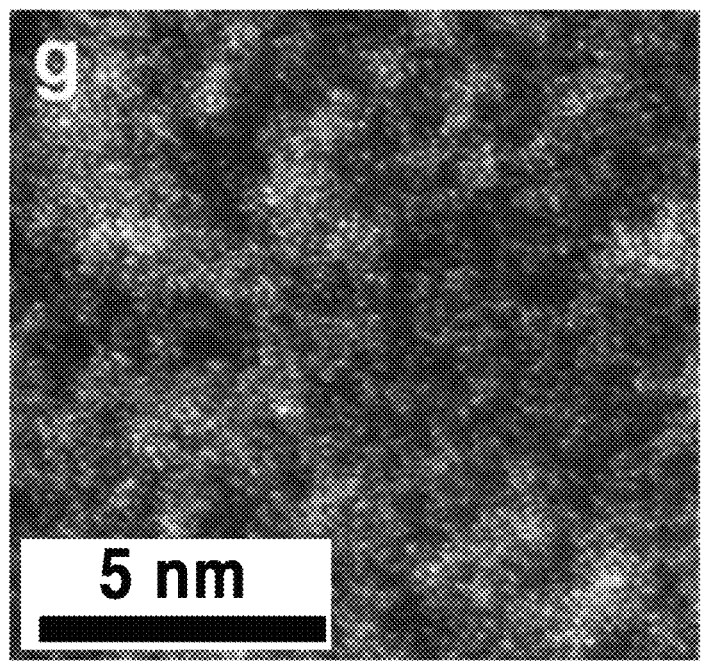
Figure 8H:
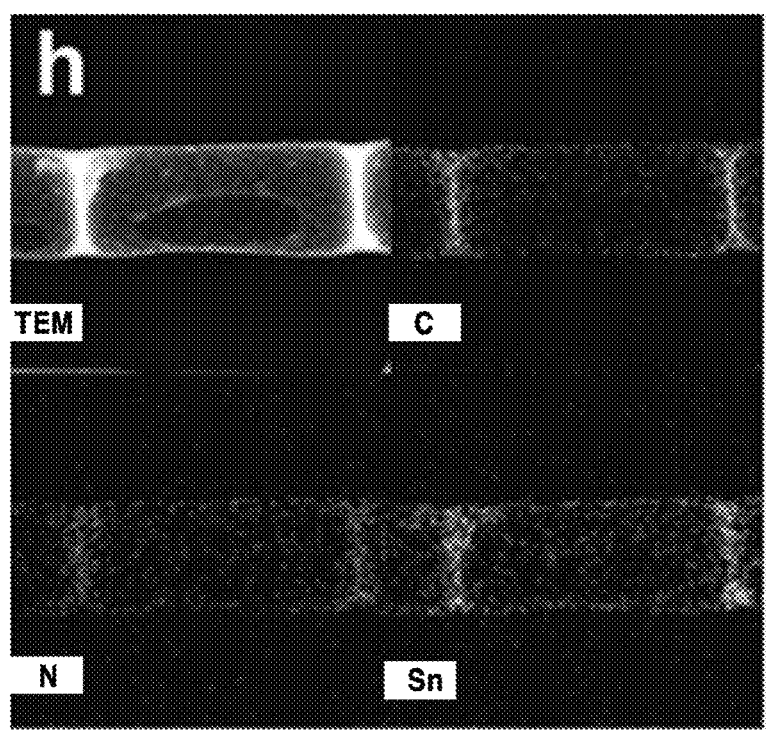
Figure 9:
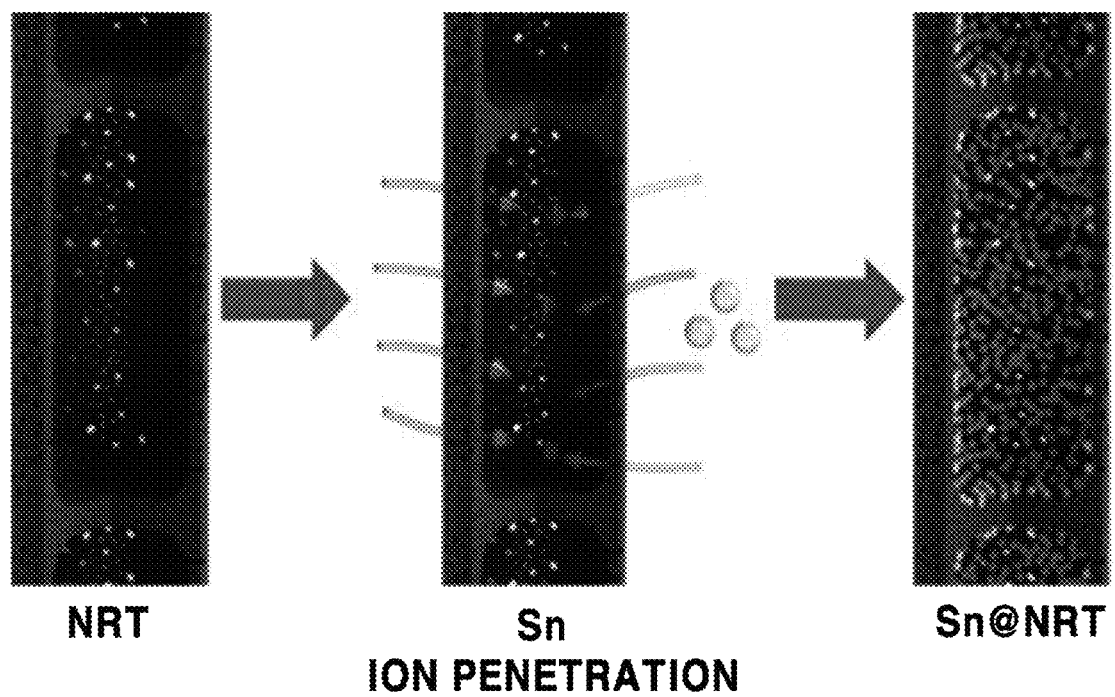
FIG. 9 shows a process of preparing a carbonaceous structure in accordance with an exemplary embodiment of the present disclosure.
Figure 14:
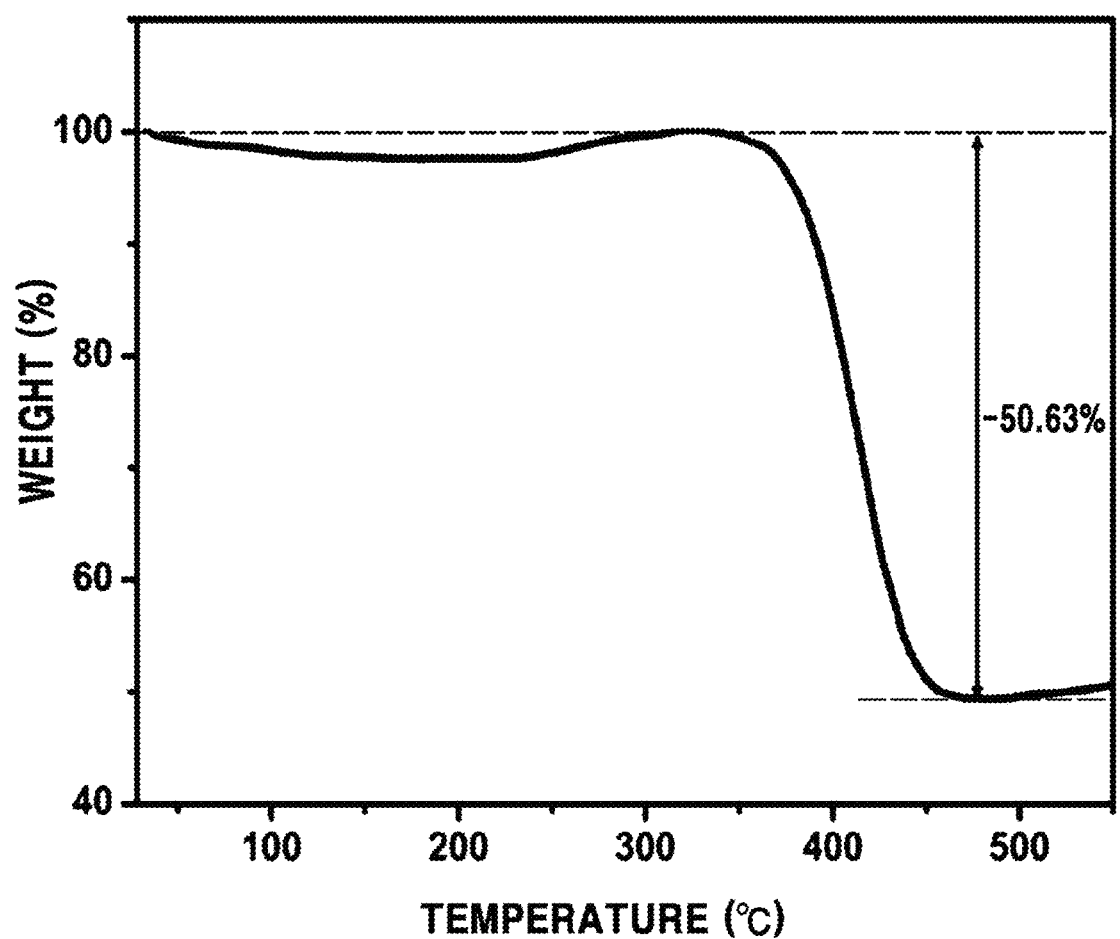
FIG. 14 shows thermogravimetric analysis data of a carbonaceous structure in accordance with an example of the present disclosure.

Also, for encapsulation of Sn atoms inside the compartments of the NRTs, at first, the metal precursors were dissolved in a solvent. Then, the solution of the metal precursors was mixed with the dispersed NRTs. The NRT is easily wetted by a solution since it has a high amount of N. Then, a tin chloride solution was penetrated into the compartments of the NRT through open mesoporous channels on the wall. Then, the NRT with the tin chloride salts was reduced by heat treatment in an H$_2$ atmosphere. After these processes, the metal precursors were observed to be located inside their empty compartments (FIG. 9). The HR-TEM images in FIG. 8C show that ultrasmall particles are dispersed on the NRT, while FIG. 8D provides information about the lattices of the Sn NPs encapsulated in the internal wall of a compartment. A spacing between adjacent lattice planes for an Sn NP was determined to be 0.29 nm, consistent with the (200) plane of an Sn crystal. The scanning transmission electron microscopy (STEM) images in FIG. 8E to FIG. 8G along with the TEM images in FIG. 10 further show the overall image (a), the existence of the Sn NPs dispersed or encapsulated inside each hollow compartment (b and c), the wall (d), and the inner interface (e and f) inside the elliptical hollow sphere of the Sn@NRT. Additionally, the STEM images reveal Sn NPs less than 1 nm in size, distinguished from other larger particles. These metals at subnanometer scale sizes can facilitate redox reactions because of their active reactivity. Moreover, Sn NPs less than 5 nm in size were observed to be uniformly dispersed in the shell of an elliptical hollow compartment in FIG. 11. FIG. 11 shows the overall STEM image of Sn@NRT (a), a cross-sectional image (b), and high magnification STEM images (c and d) of the Sn@NRT annealed for a longer time, and demonstrates that the Sn@NRT contains larger Sn particles if the sample is treated for a longer time during the annealing step. Moreover, the elementary mapping images (FIG. 8H) for C, N, and Sn atoms of the NRT demonstrate that the N and Sn atoms are uniformly distributed in the carbon matrix. These results demonstrate that the NRT contains internal compartments, while the STEM images and elemental mapping images of Sn@NRT illustrated in FIG. 12 provide further direct evidence that Sn particles are located in the inner space of the NRT particles. Sn contains more electrons than C or N such that Sn atoms located in each compartment of the NRT should give many backscatterd electrons. FIG. 13 illustrates BSE (backscattering electron) images (a, c, e, f) and SE (secondary electron) images (b, d), and e of FIG. 13 shows an image at 5 V and f of FIG. 13 shows an image at 10 V. The bright parts of the SEM image in FIG. 13, which were obtained through the backscattering electrons (BSE), represent the areas occupied by Sn atoms. These results provide clear evidence supporting that the part encapsulated by Sn is different from those encapsulated by C or N. FIG. 14 also shows the TGA results for Sn@NRT whose structure is stable up to 350° C.

Figure 8I:
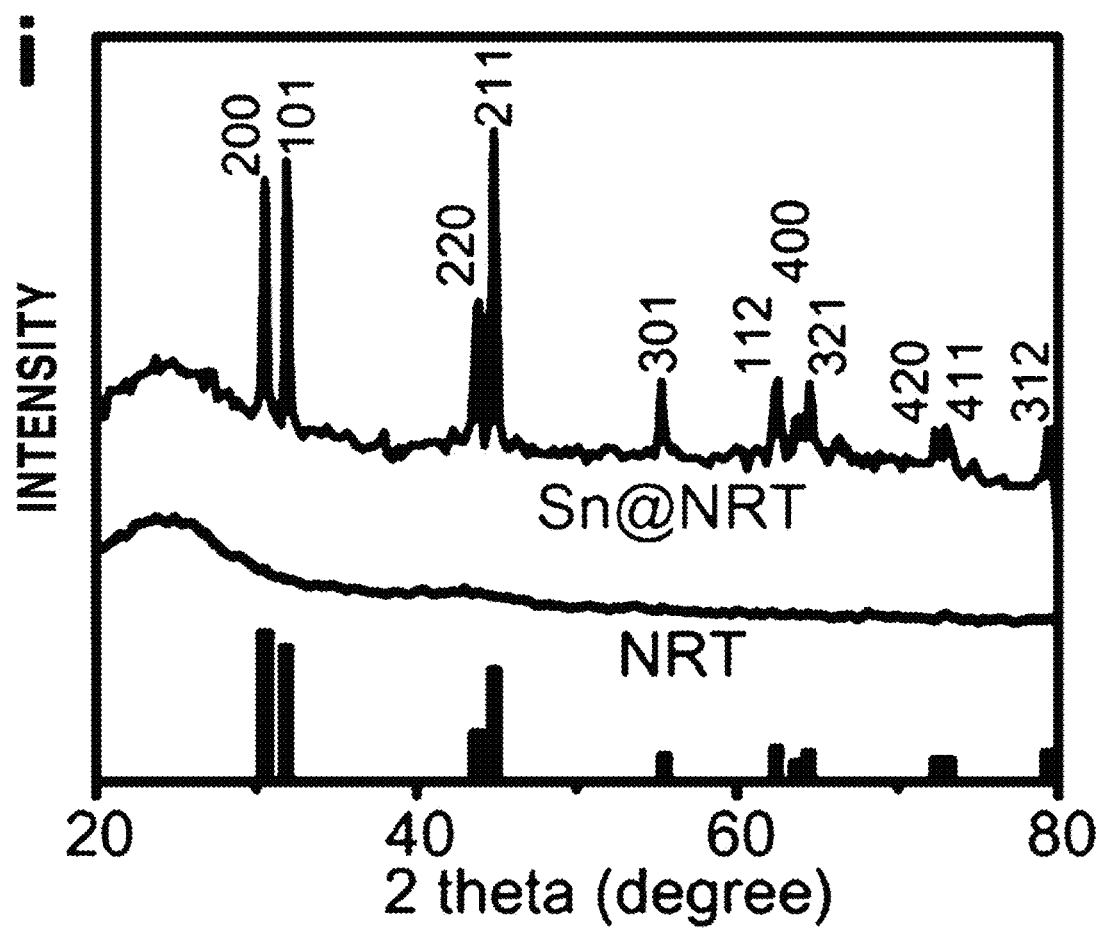
Figure 8J:
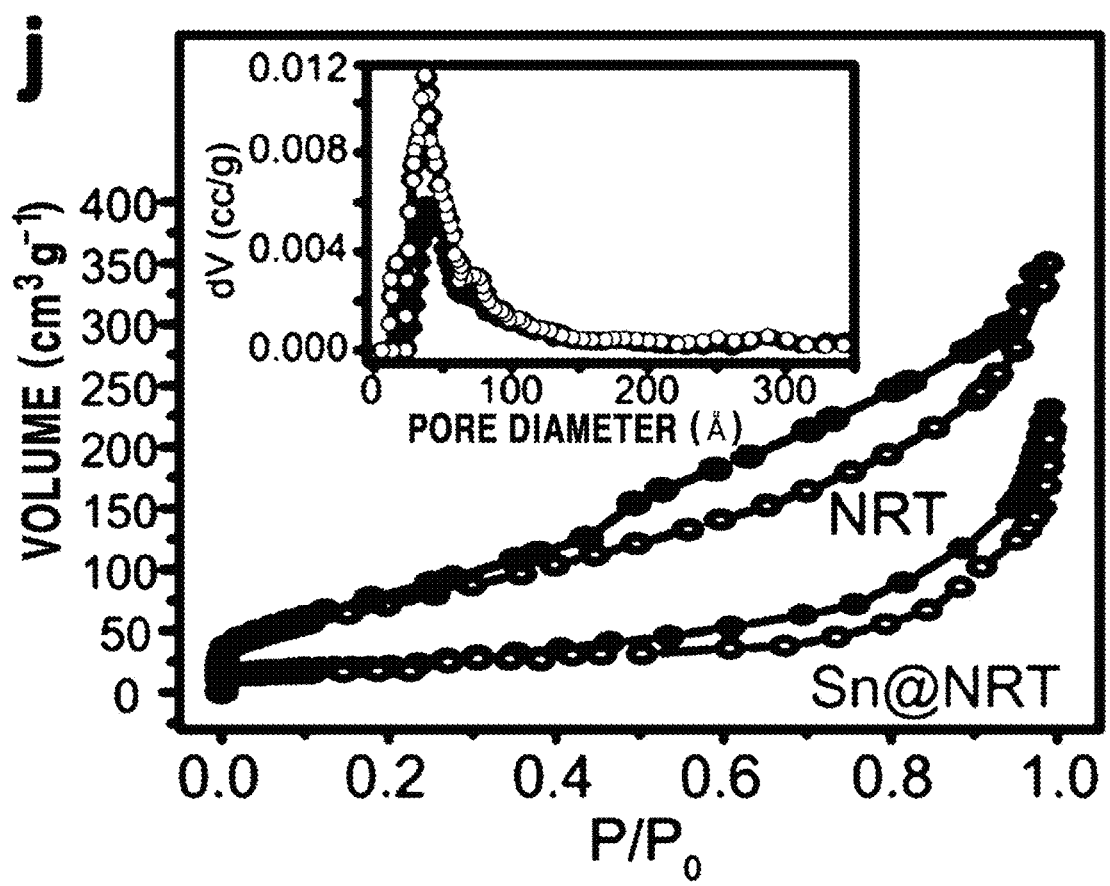
Figure 15:
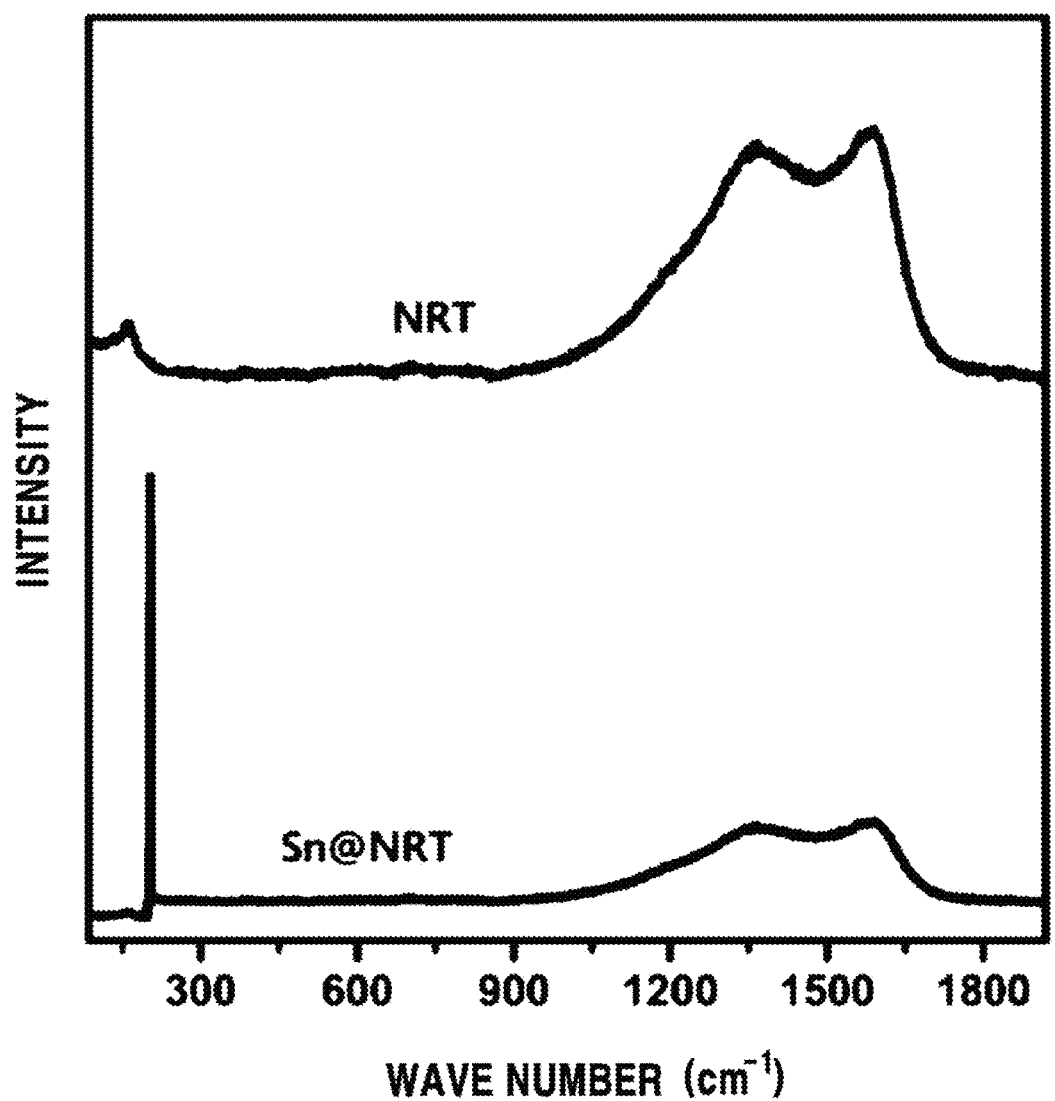
FIG. 15 shows a Raman spectrum of a carbonaceous structure in accordance with an example of the present disclosure.

FIG. 8I presents the X-ray diffraction (XRD) patterns of the Sn@NRT and NRT. All the main peaks in the XRD patterns could be indexed to a tetragonal Sn phase (JCPDS card No. 04-0673). These results demonstrate that the Sn NPs in the composite are crystalline. The Raman spectra in FIG. 15 show the presence of a G band at 1589 cm$^{-1}$ and a D band at 1366 cm$^{-1}$. The G band represents a radial C—C stretching mode of the sp$^2$ carbon, whereas the D band is a first-order zone boundary phonon mode associated with defects in the carbon rings or the edge of the carbon matrix. The Raman intensity ratios of the G band to the D band ($I_G/I_D$) from the NRT and the Sn@NRT are 1.02 and 1.04, respectively. These results indicate that the C and N atoms of NRT are on six-membered rings with some defects and that the structure of the NRT is not substantially changed after encapsulating Sn metals. Furthermore, crystalline Sn NPs are identified by the appearance of the intensive peak near 200 cm$^{-1}$. In addition, the porosity of the Sn@NRT was investigated through N$_2$ adsorption measurements. FIG. 18 displays the adsorption/desorption isotherms and the pore distribution (inset in FIG. 8J) obtained through analysis using the non-localized density functional theory method, indicating a pore diameter of about 3.8 nm. The large specific surface area of about 220 m$^2$ g$^{-1}$ is induced by micelles of the surfactants during the synthesis. The measurements for the Brunauer-Emmett-Teller (BET) pore size clarify that the pore size matches with the average size of Sn NPs observed in the TEM image, whose channels lead to fast diffusion during insertion of ions to active metal sites and their desertion.

Figure 16A:
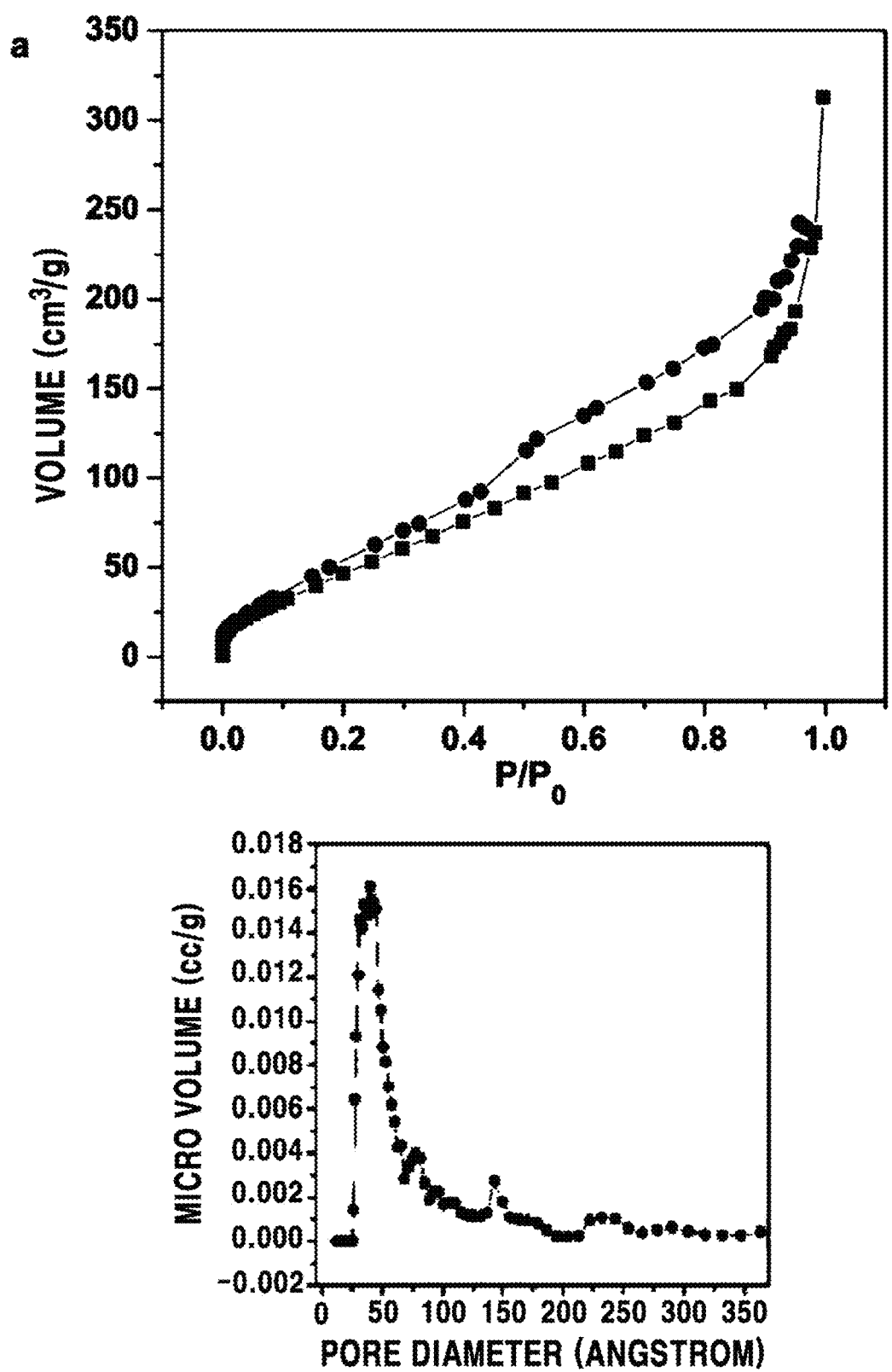
FIGS. 16A to 16C provide nitrogen adsorption/desorption isotherms of a carbonaceous structure in accordance with an example of the present disclosure.
Figure 16B:
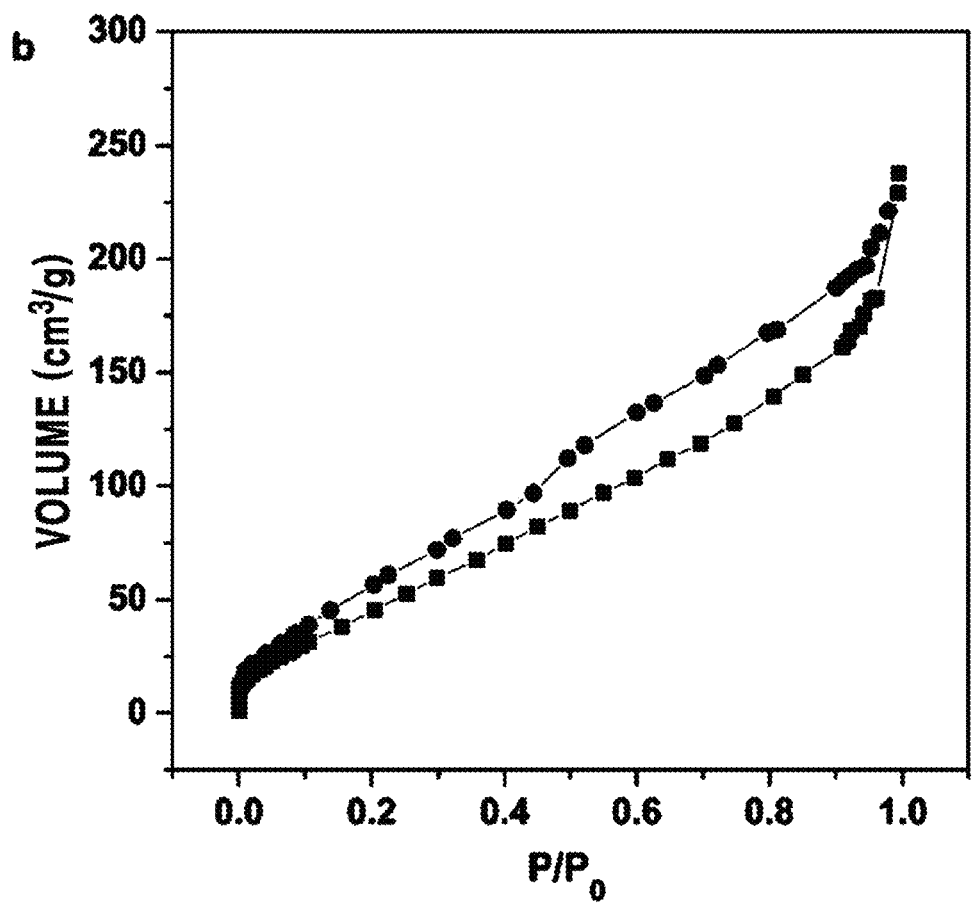
Figure 16B:
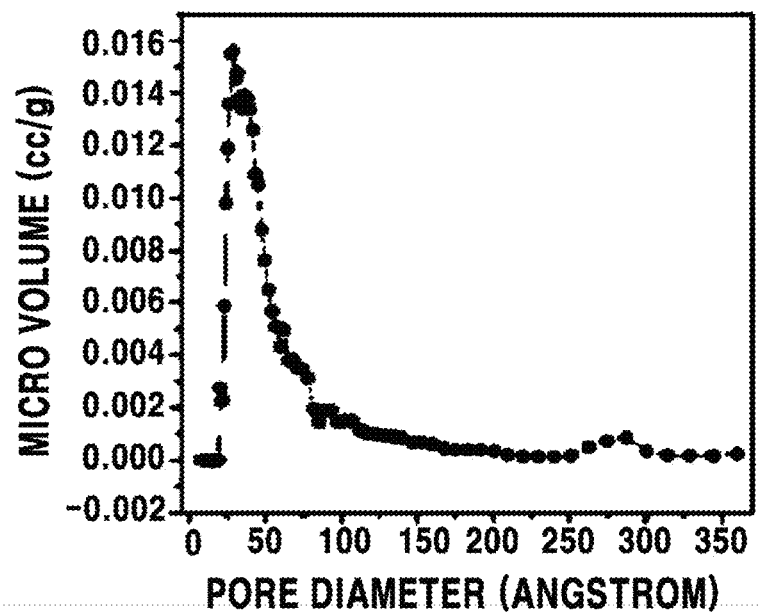
Figure 16C:
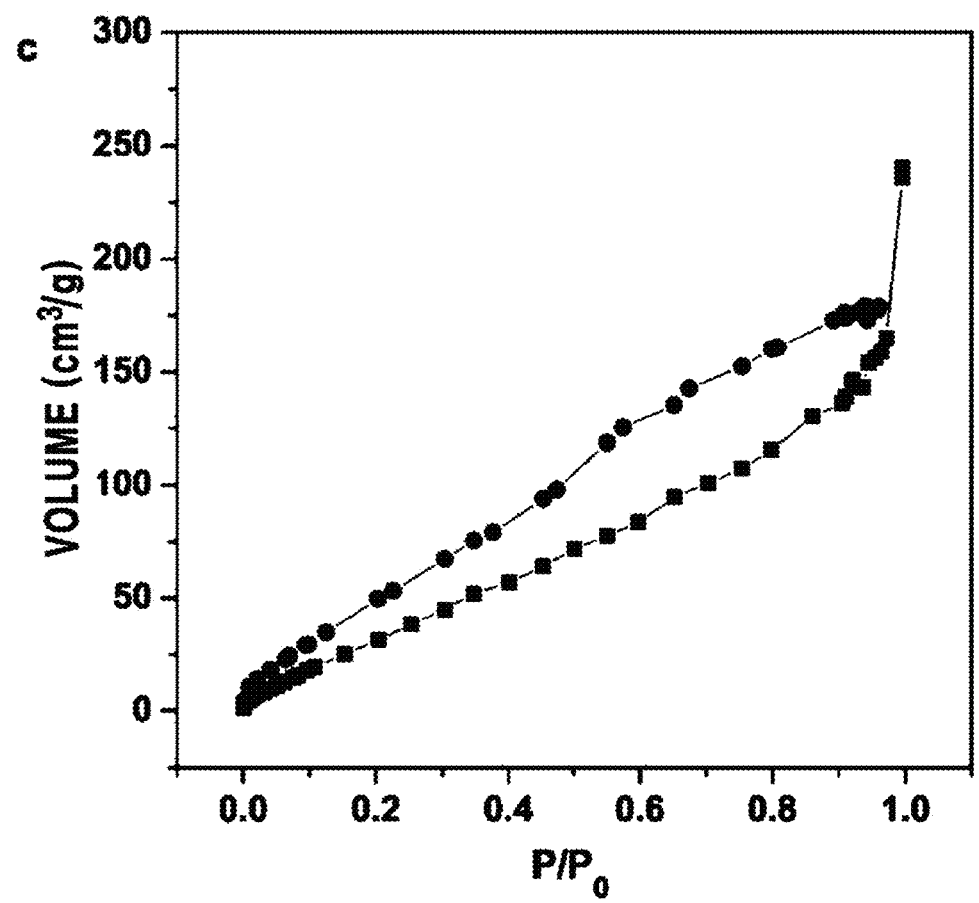
Figure 16C:
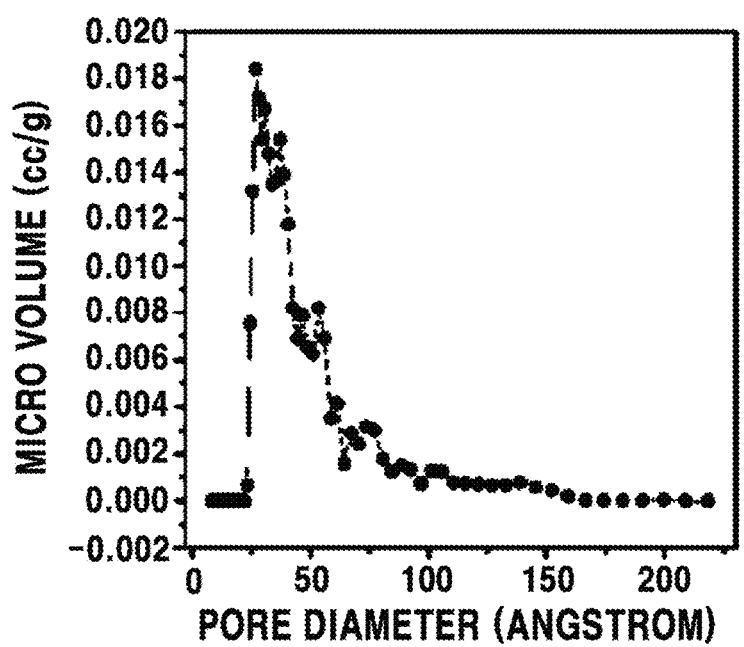

FIG. 16A to FIG. 16C provide nitrogen adsorption/desorption isotherms of NRTs and show the NRTs including 1 g (FIG. 16A), 4 g (FIG. 16B), and 8 g (FIG. 16C) of the surfactant F127. In the present disclosure, it was found that the porosity and the pore size distribution of NRTs are controllable during a fabrication procedure by the different amounts of soft surfactant templates.

Figure 8K:
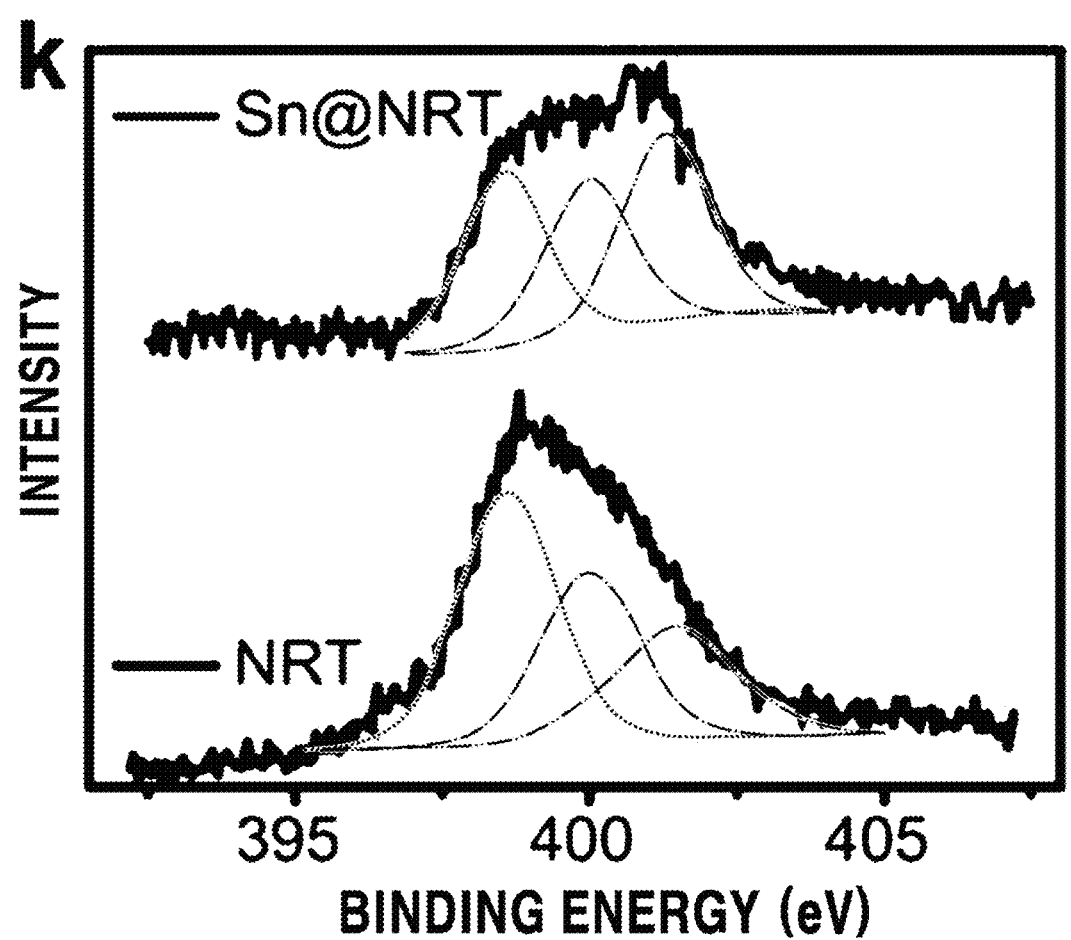

Moreover, atomic configurations of the C and N composing the NRT have been investigated using X-ray photoelectron spectroscopy (XPS) and FT-IR spectroscopy. FIG. 8K presents the XPS results obtained from an analysis of N binding states of NRT and Sn@NRT, showing that the NRT and Sn@NRT contain pyridinic N (N-6, 398.6 eV), pyrrolic N (N-5, 400.0 eV), and quaternary N (NQ, 401.5 eV), thus affecting the formation of Sn NPs and their dispersion.

Figure 18A:
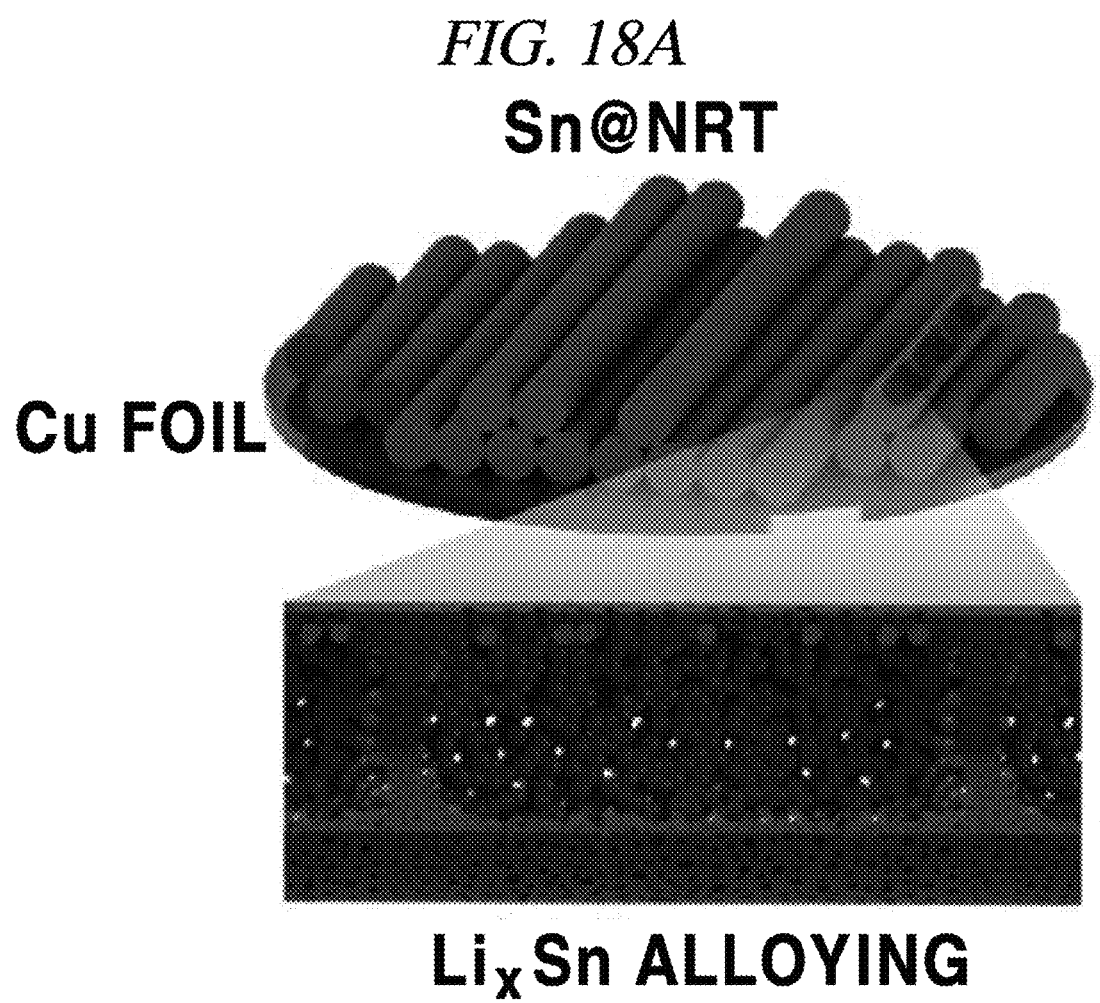
FIGS. 18A to 18D show a model of an electrode material including a carbonaceous structure and the result of analysis on electrochemical characteristics thereof in accordance with an example of the present disclosure.
Figure 18B:
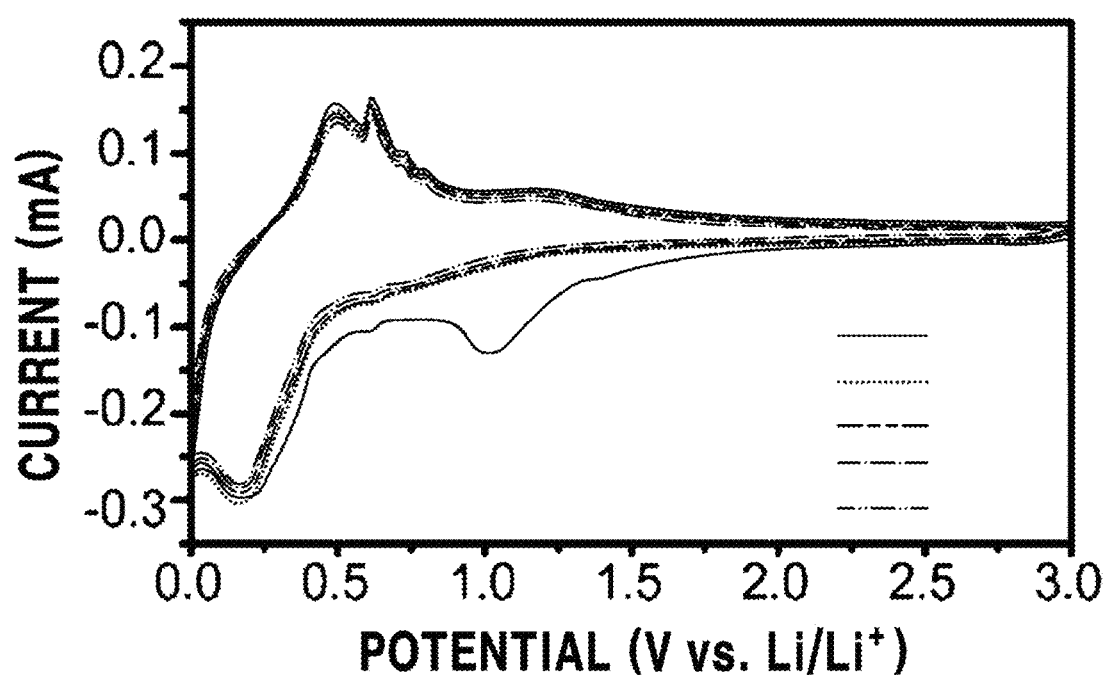
Figure 18C:
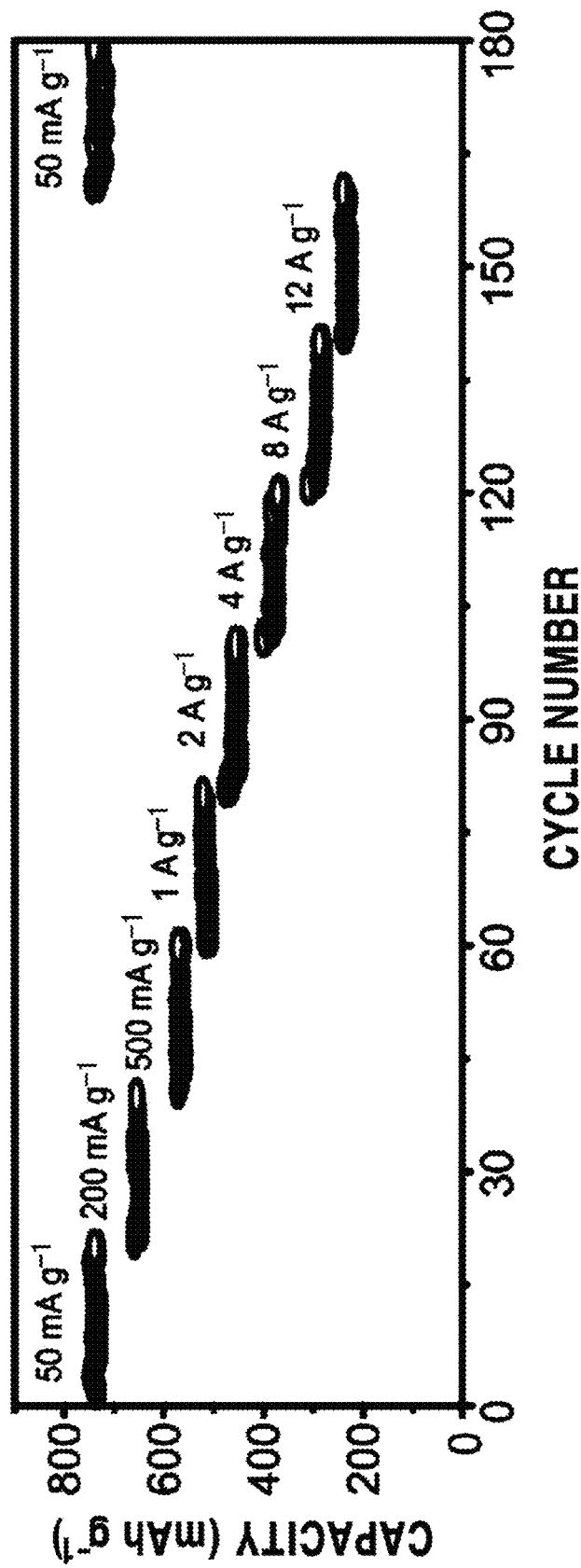
Figure 19:
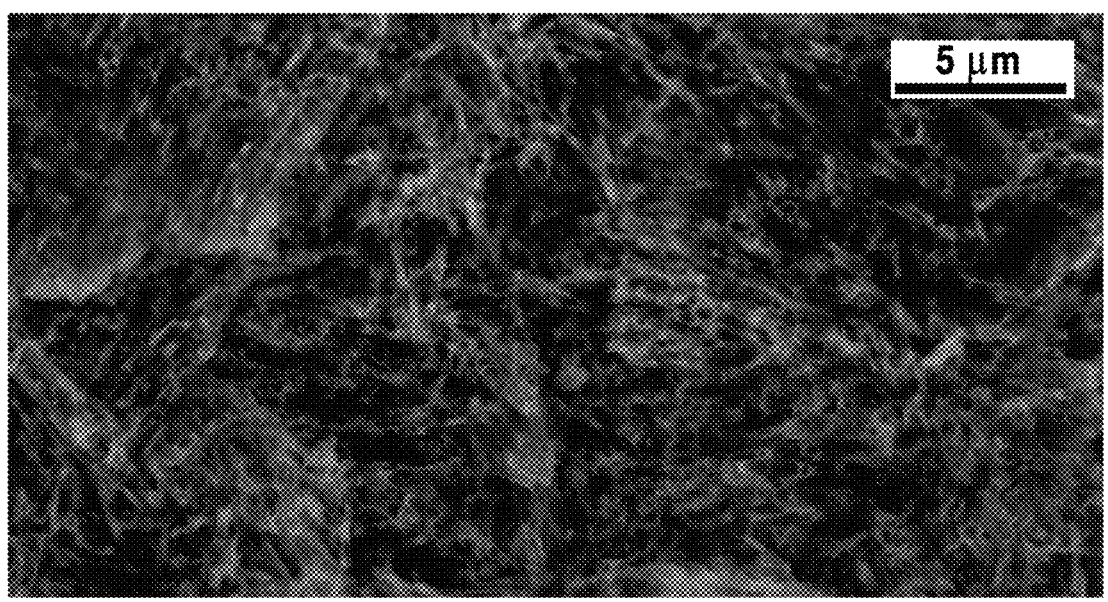
FIG. 19 is an SEM image of an electrode material including a carbonaceous structure with a BSE detector in accordance with an example of the present disclosure.

Furthermore, the Sn@NRT was employed to fabricate the half-type coin cells (FIG. 18A). At first, the Sn@NRT structures were mixed with an additional agent to make a slurry and placed on a Cu current collector, where they were allowed to move and roll on the current collector (FIG. 17). The SEM image of the electrode in FIG. 19 shows the uniformly arranged Sn@NRT on the current collector. FIG. 18B presents the cyclic voltammograms (CVs) of the anode electrode, which were obtained at a scan rate of 0.1 mV·s$^{-1}$ in the potential range up to up to 3 V vs. Li/Li$^+$. The small reduction peaks at 0.19 V and 0.6 V indicate the formation of a LiSn alloy. The corresponding oxidation peaks at 0.5 V, 0.61 V, 0.72 V, and 0.79 V are assigned to the de-alloying reaction of Li$_x$Sn. The broad anodic peak at 1.25 V observed in the charged curve represents Li extraction from the NRT. The gravimetric charge/discharge profile of the Sn@NRT shows the stable operation as the anode with lithiation plateau at about 0.25 V (FIG. 20). FIG. 18C also demonstrates that the Sn@NRT exhibits excellent rate capability, supporting the idea that the Sn nanocrystals encapsulated in the compartment of the NRT can accommodate the large volume change of an Sn alloy and provide a strong buffering effect to suppress Sn NP aggregation during the repeated redox cycles. Moreover, extremely small Sn NPs less than 5 nm can effectively reduce the stress/strain during ion insertion/desertion under repeated redox cycles. It is notable that the high average mass loading of about 2.2 mg cm$^{-2}$ for the total electrode weight was used to calculate the specific capacity. In the present Example, it was found that the above-described anode structure provides the ultrafast rate capability even at extremely high currents up to 12 A g$^{-1}$. It is also remarkable that a high capacity over 200 mAhg$^{-1}$ is retained in a short time (about 3 minutes) for charging. In addition, when the high current density is reduced to a low current density of 50 mA·g$^{-1}$, the discharge capacity rebounds to the high capacity of 750 mAh$^{-1}$.

Figure 18D:
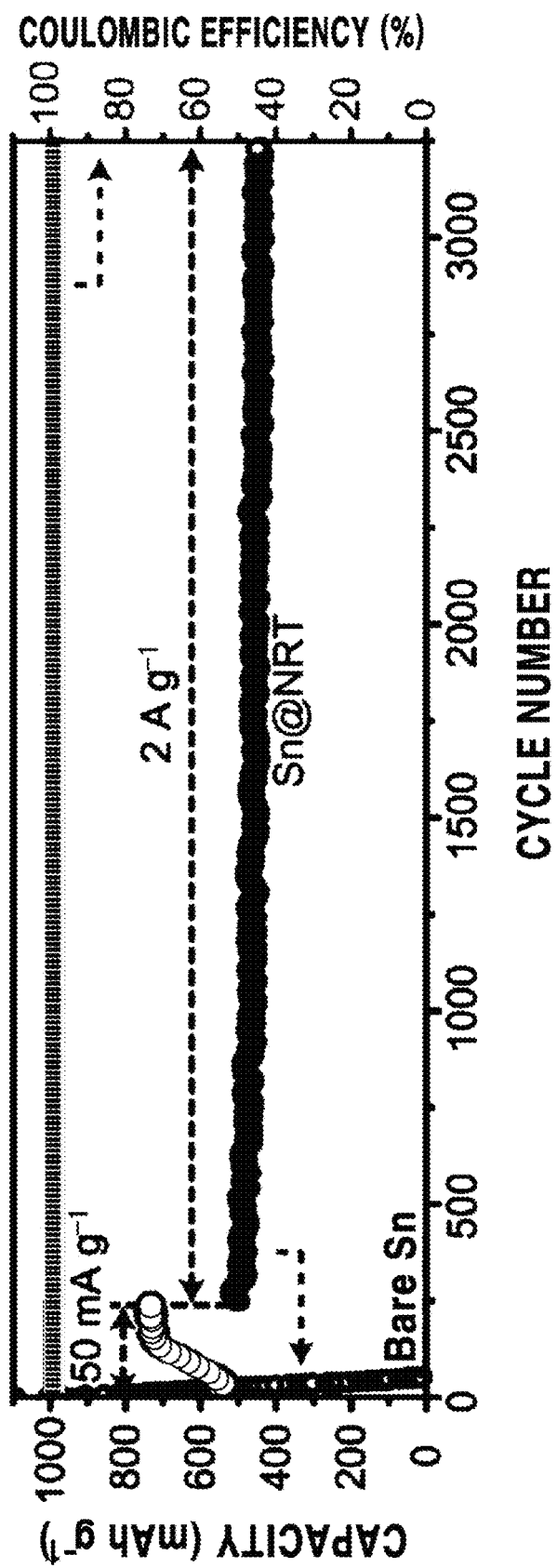

The open mesoporous nature of the NRT even allows the large-size ions (PtCl$_6^{-2}$) to access into its internal compartments through their wall (FIG. 21). FIG. 21 shows TEM images of a partition wall (a) and an elliptical wall (b) of the Pt@NRT and STEM images of the partition wall (c) and the elliptical wall (d) of the Pt@NRT. The above-described result supports that the unique structure of the NRT plays an important role in enhancing the ion accessibility, thus enabling the fast migration of Li ions through the NRT walls during charge/discharge cycles. The columbic efficiency reaches almost 100% after activation, thus demonstrating the excellent reversibility of electrochemical ions in the electrode during the subsequent cycles. The increase of capacity from the 15th to 120th cycle indicates an activation process in the electrode material. Meanwhile, the capacity of the bare Sn NPs used as the anode structure without using the NRT was found to be dramatically decreased as the cycles are increased to approximately 50 cycles (FIG. 18D). Further, the excellent capacity over 450 mAhg$^{-1}$ at a high current of 2 A g$^{-1}$ was observed after the 3000th cycle.

FIG. 22 shows an initial SEM image (a) and an SEM image (b) after 200 cycles. After repeated cycles, the external appearance of the Sn@NRT electrode was proven to maintain its original feature of the electrode, indicating that the NRT structure plays as a protection layer for Sn particles to construct solid electrolyte interface (SEI) layers on the electrode.

FIG. 23 shows electrochemical impedance spectroscopy (EIS) analysis data of Sn@NRT and Sn electrodes. The electrochemical impedance spectroscopy results also support the advantages of the Sn@NRT as the anode electrode material in that both the charge transfer resistance through the electrode/electrolyte interface and electrolyte transport resistance are significantly reduced compared to those of an Sn structure. These indicate that the NRT can act as an effective conductive structure for electrons and also provide the fast channels for charged ions, thus showing excellent rate capability and robust cycle life over long discharge/charge cycles when it is used as the electrode. These signal that the NRT is an excellent structure enabling to extract the unique capacity that a bare metal NP owns while helping to overcome the problems to its large volume expansion during repeated redox cycles.

Figure 24A:
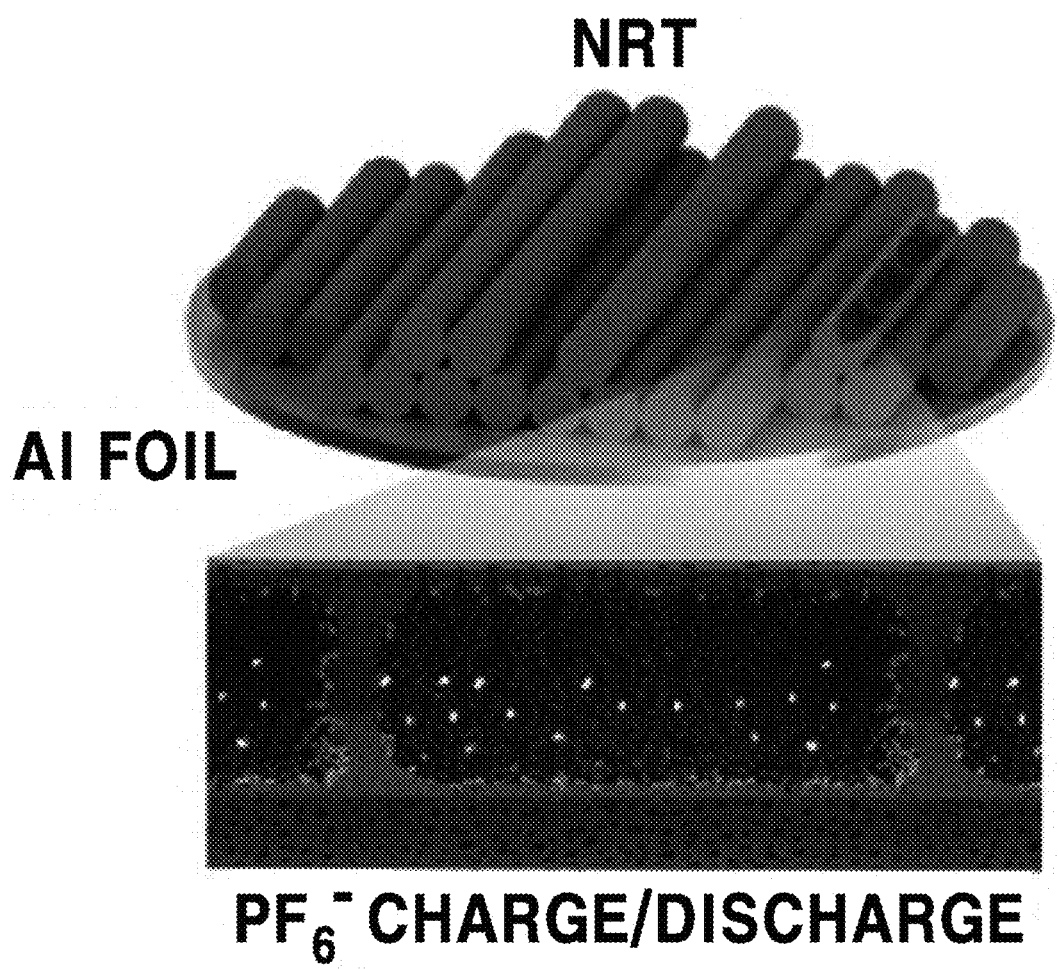
FIGS. 24A to 24E show a model of an electrode material including a carbonaceous structure and the result of analysis on electrochemical characteristics thereof in accordance with an example of the present disclosure.
Figure 24B:
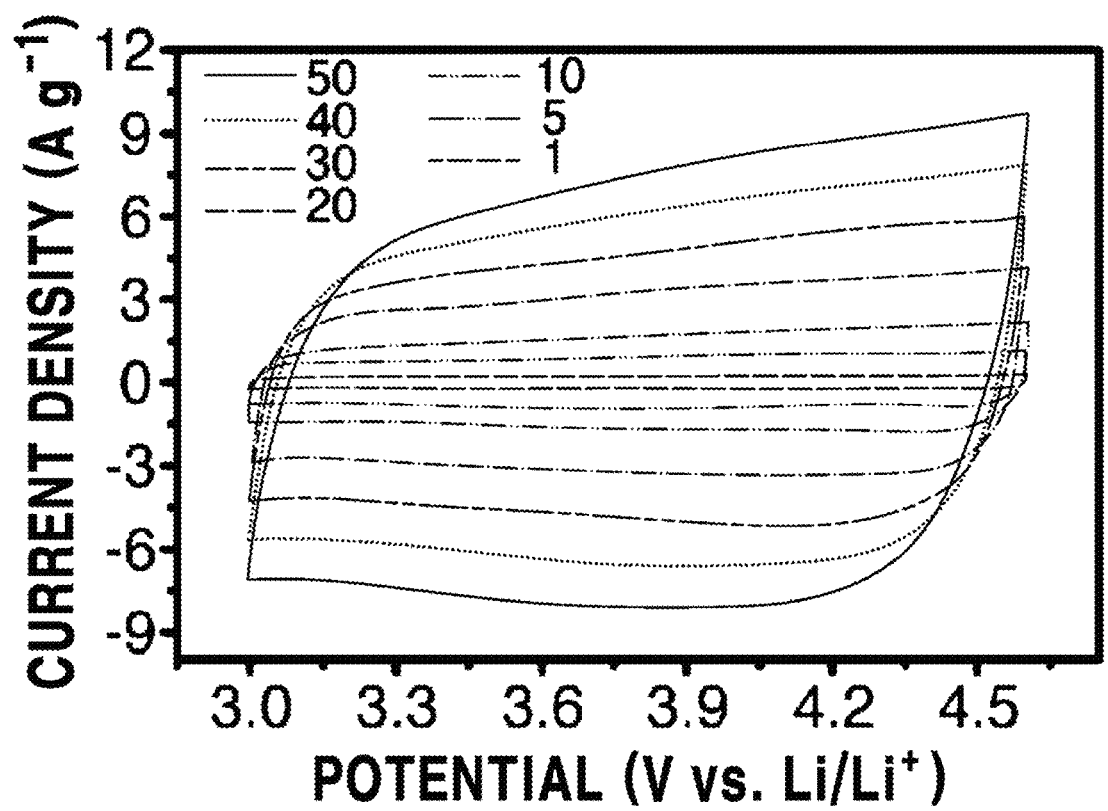
Figure 24C:
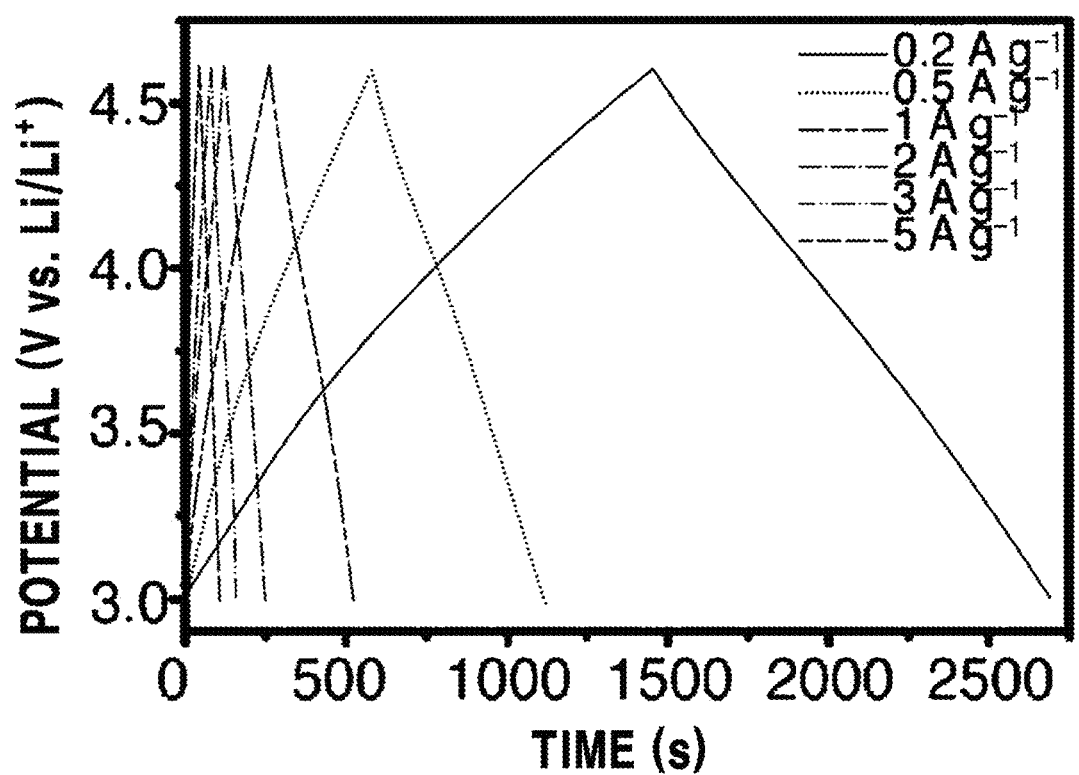
Figure 24D:
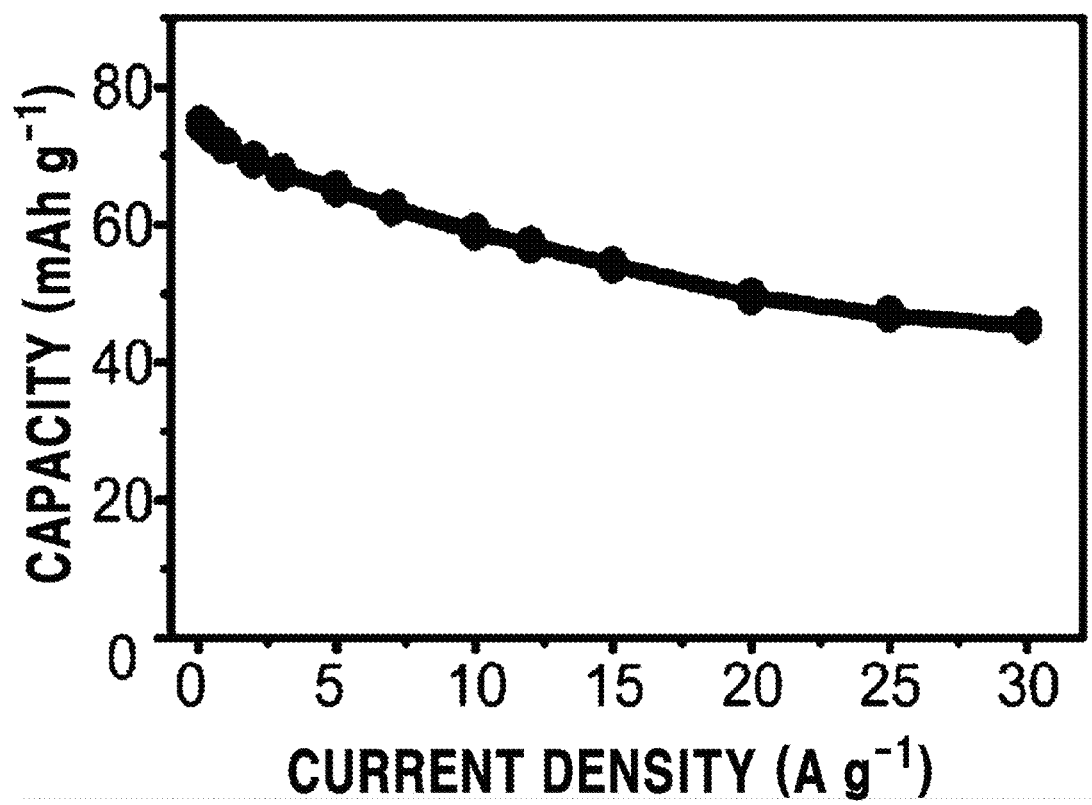
Figure 24E:
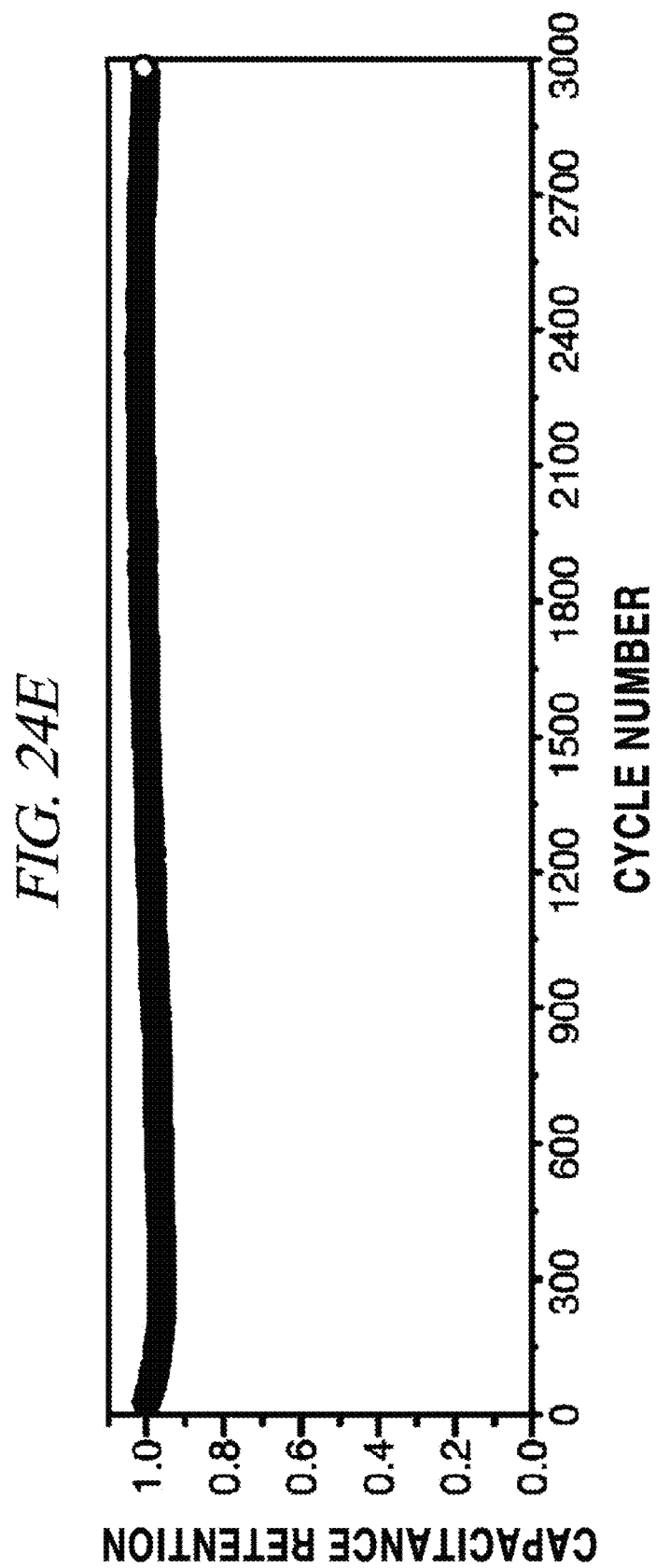
Figure 25:
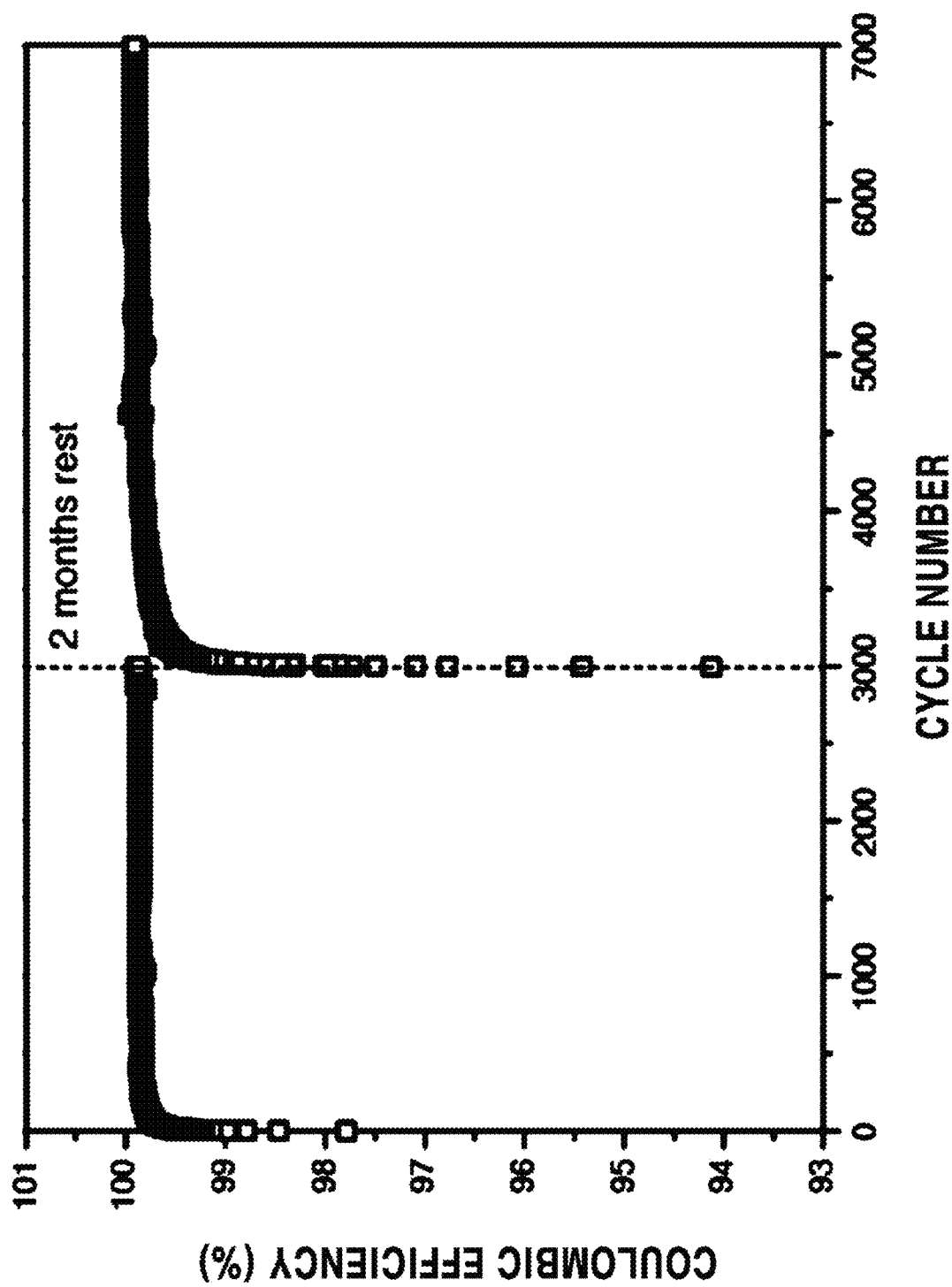
FIG. 25 shows a Coulombic efficiency of an electrode material including a carbonaceous structure depending on the number of cycles in accordance with an example of the present disclosure.

FIG. 24A to FIG. 24E show a model of an NRT electrode and the result of analysis on electrochemical characteristics thereof. FIG. 24A shows a model of the NRT used as a cathode electrode, and FIG. 24B shows the CVs of the NRT electrode at various scan rates from 1 mV s$^{-1}$ to 50 mV s$^{-1}$. To obtain the large potential window at the full-cell configuration, the potential range of the NRT electrode was set up to 3 V to 4.6 V (vs. Li/Li$^+$), derived from the stable operation range of carbon-based materials in an organic electrolyte. The shape of the CV shows a rectangular sweep for every scan rate. This is correlated with the charging/discharging performances at various current densities (FIG. 24C). Also, it was found that the highest specific capacity of the NRT electrode is 74.6 mAhg$^{-1}$ at a current density of 200 mAg$^{-1}$ (FIG. 24D), much higher than those of previously reported cathode materials based on AC, graphene, and their modified structures. It is notable that a high specific capacity remains even at the extremely high current density of 30 Ag$^{-1}$. Interestingly, the results also demonstrate that the capacity retention of the NRT electrode is not degraded even after 3000 cycles (FIG. 24E). Further, as shown in FIG. 25, the Coulombic efficiency of the NRT electrode maintain 99.9% during charge/discharge cycles and even after additional 4000 cycles at a high current rate of 5 Ag$^{-1}$. This represents the high stability of the NRT electrode under electrochemical operation for charge/discharge (FIG. 25).

Figure 26:
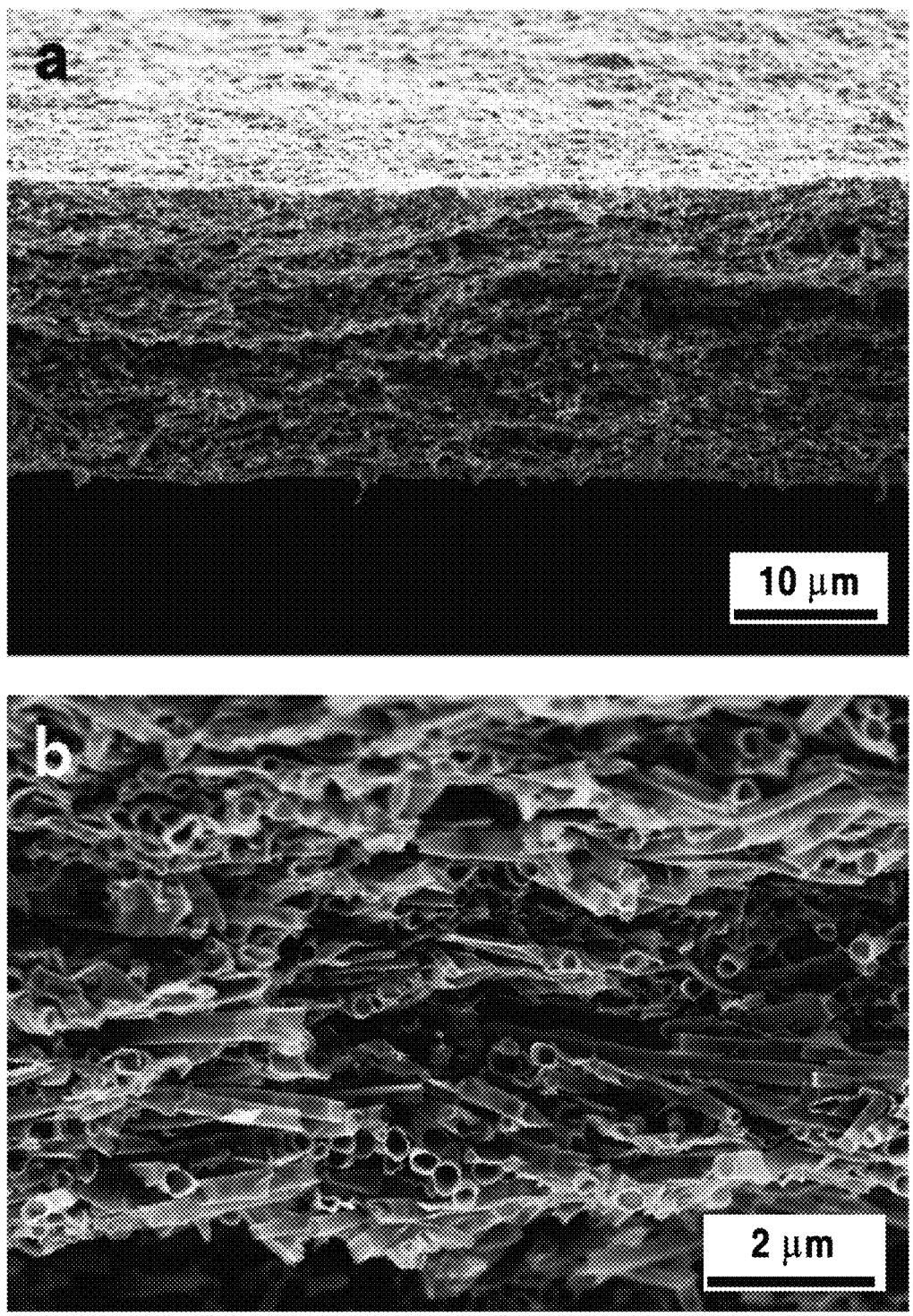
FIG. 26 shows cross-sectional SEM images of a film including a carbonaceous structure in accordance with an example of the present disclosure.
Figure 29:
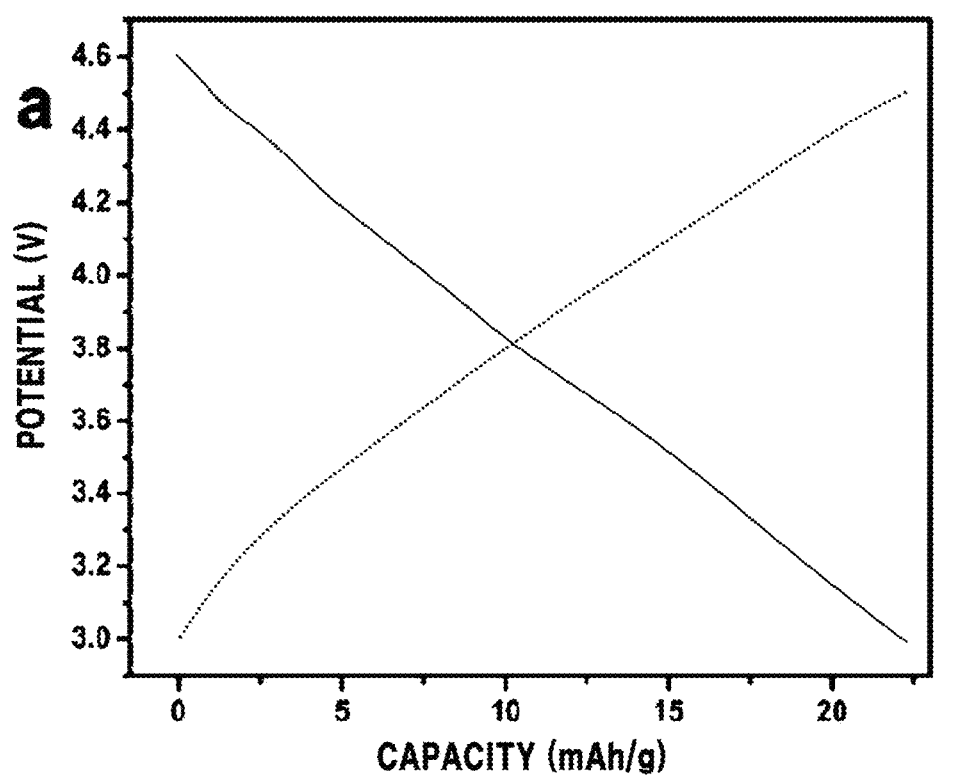
FIG. 29 shows voltage vs. capacity profiles of comparative examples of a carbonaceous structure in accordance with an example of the present disclosure.
Figure 29:
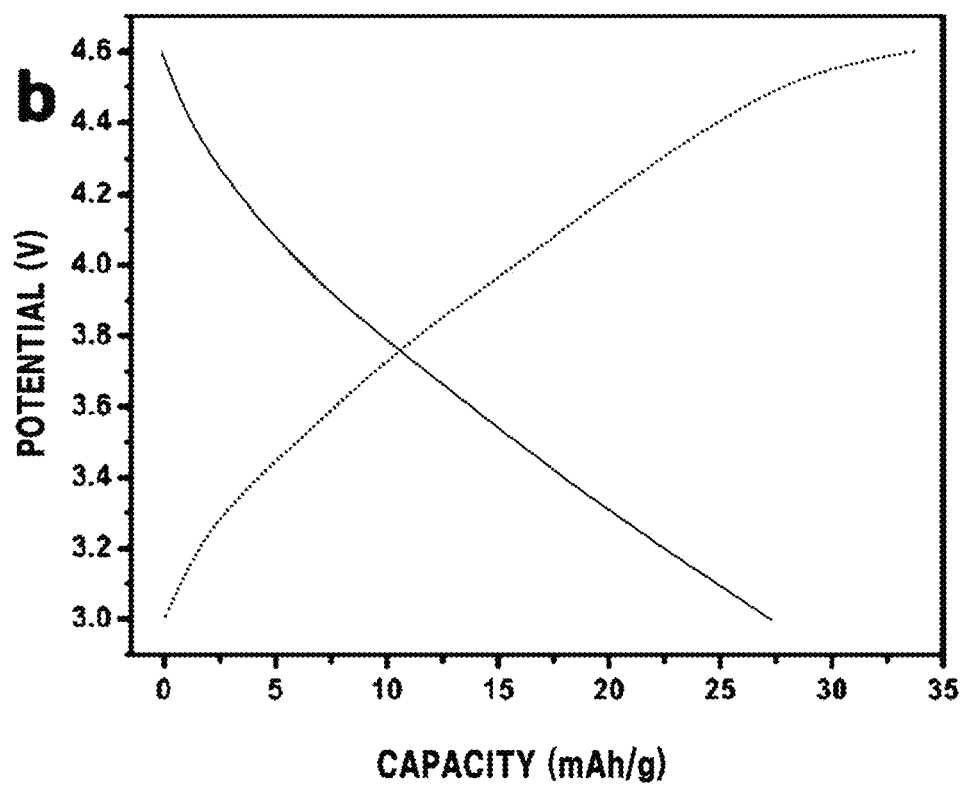

Similar to the Sn@NRT anode, the open mesoporous channels in the NRT are found to enable fast ion migration during charge/discharge cycles, while hetero-atom doped sites of N provide additional active sites that can store anions on both exterior and interior surfaces of the NRT. The porous structure of the wall and inner compartments for the NRT has been directly observed through the cross-sectional SEM analysis (FIG. 26 and FIG. 27). FIG. 26 and FIG. 27 show cross-sectional SEM images of NRT film samples used for nitrogen adsorption measurement, and particularly, b of FIG. 27 is a cross-sectional image of an internal partition wall of the NRT. Further, FIG. 28 shows a TEM images of a commercial multi-wall carbon nanotube (a) as a comparative example and an N-rich nanorod (b) to check the structural advantage of the NRT. The electrochemical performance results using them demonstrate that they exhibit relatively low specific capacities of 31 and 22 mAhg$^{-1}$ at a current density of 100 mAg$^{-1}$ in the potential range of 3 V to 4.6 V, respectively, attributed to the absence of open mesoporous channels and inner compartments existing in the NRT (FIG. 29). These clarify that the NRT itself can become a promising cathode electrode material for high-performance electrochemical energy storage.

Figure 30D:
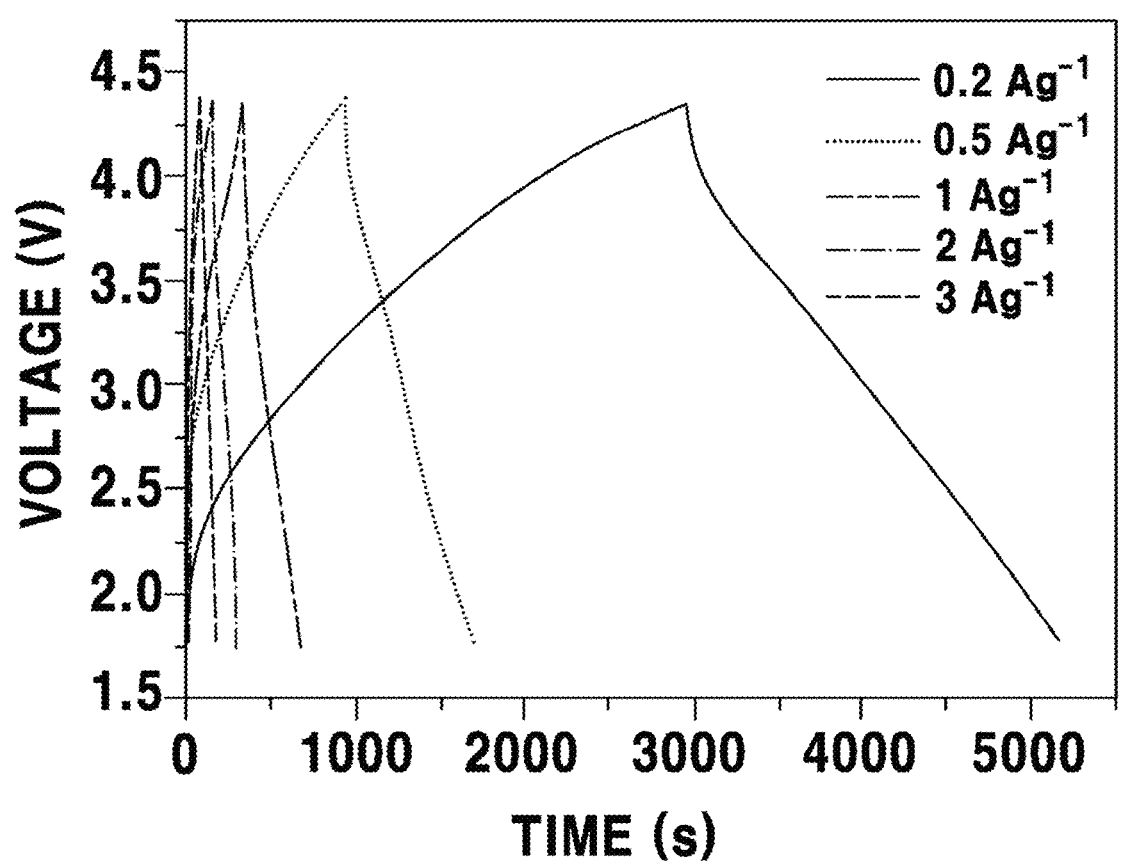
Figure 30E:
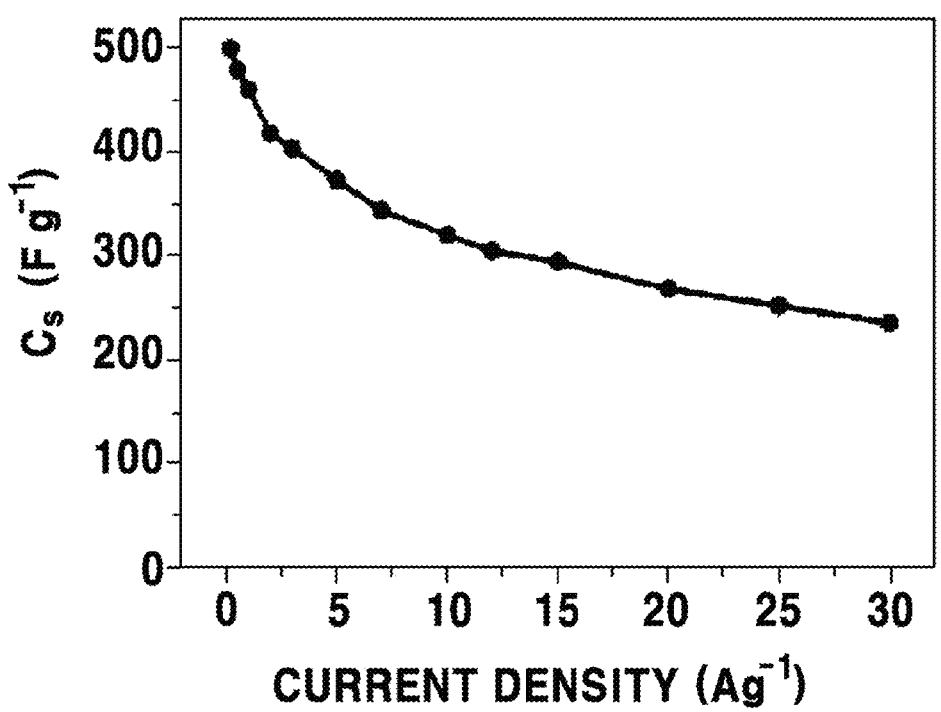
Figure 30F:
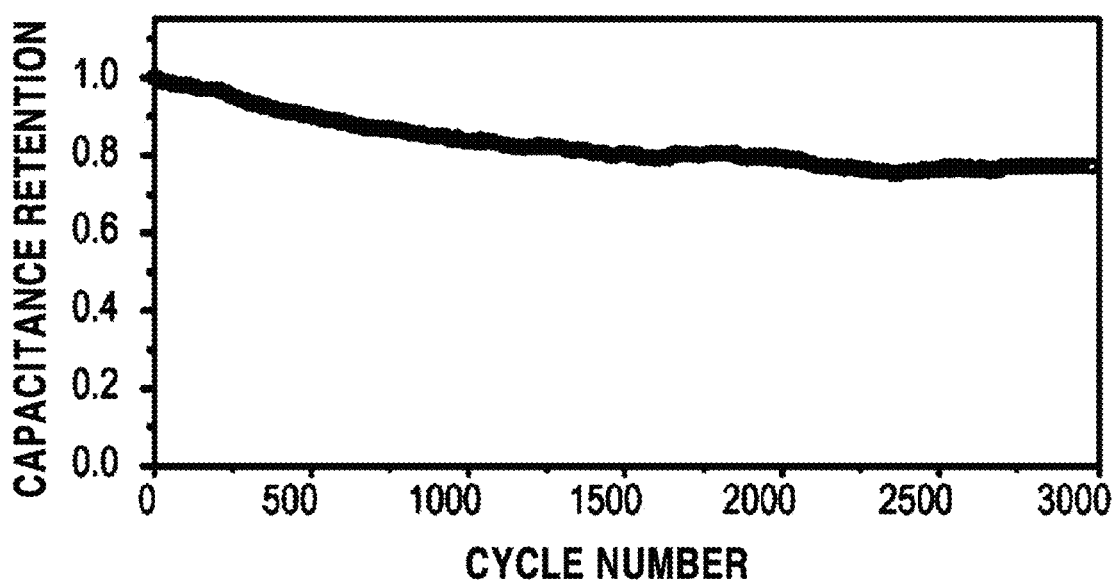
Figure 30G:
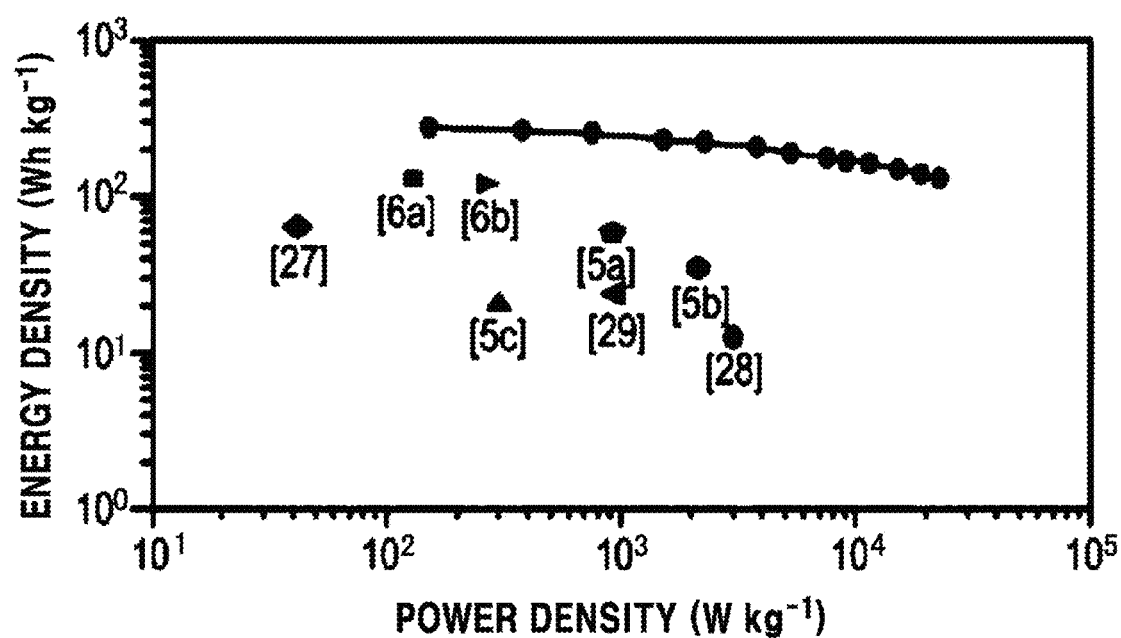
Figure 31:
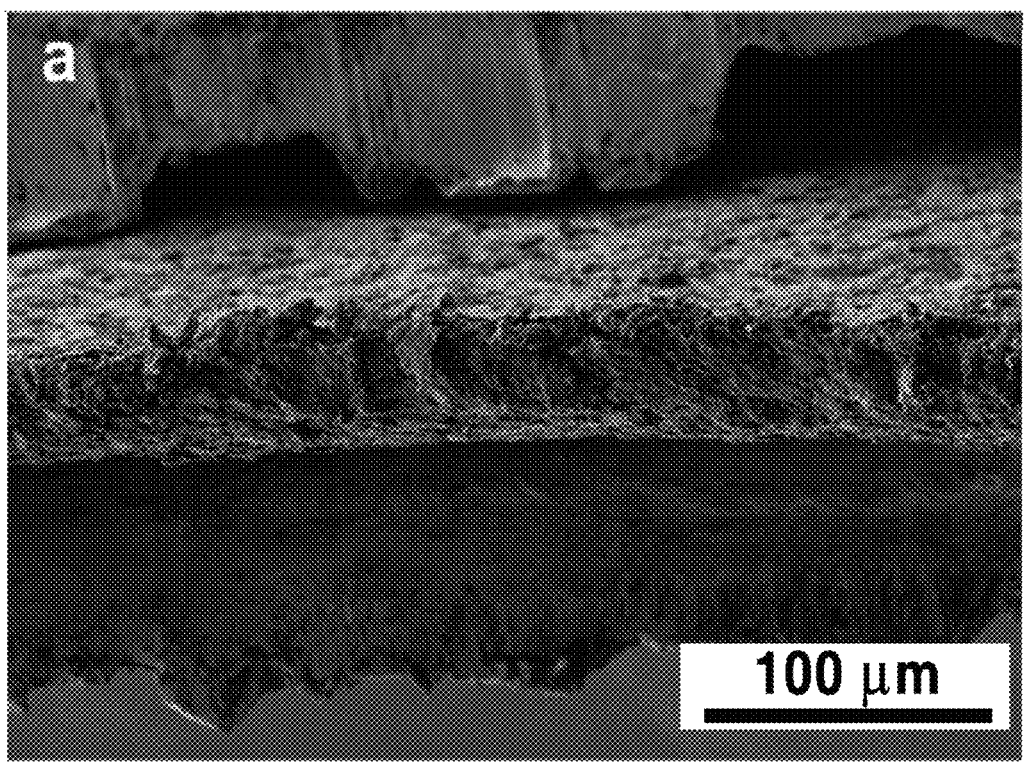
FIG. 31 shows cross-sectional SEM images of an anode (a) and a cathode (b) including a carbonaceous structure in an energy storage device in accordance with an example of the present disclosure.
Figure 31:
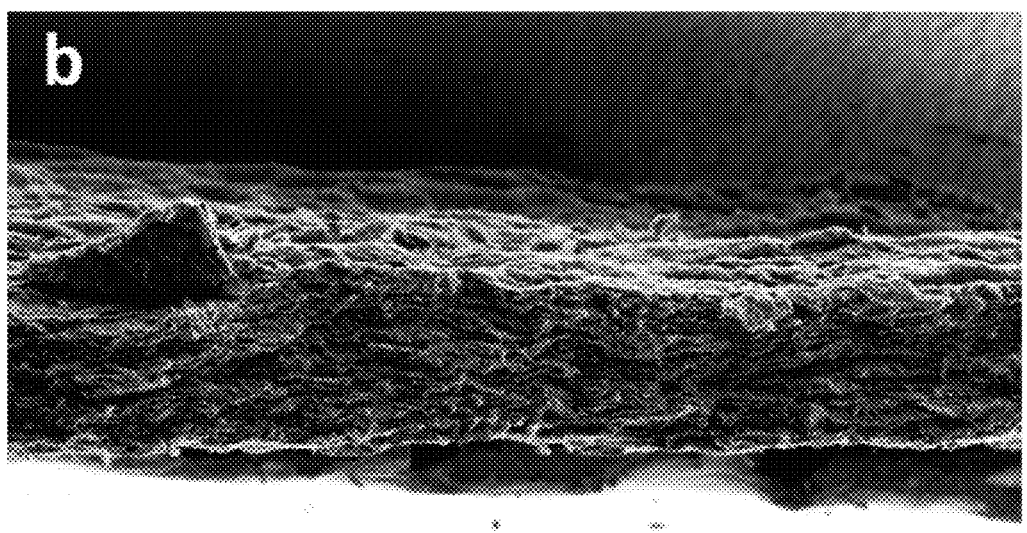
Figure 31:
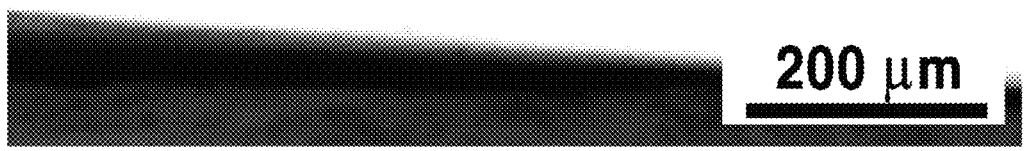
Figure 32A:
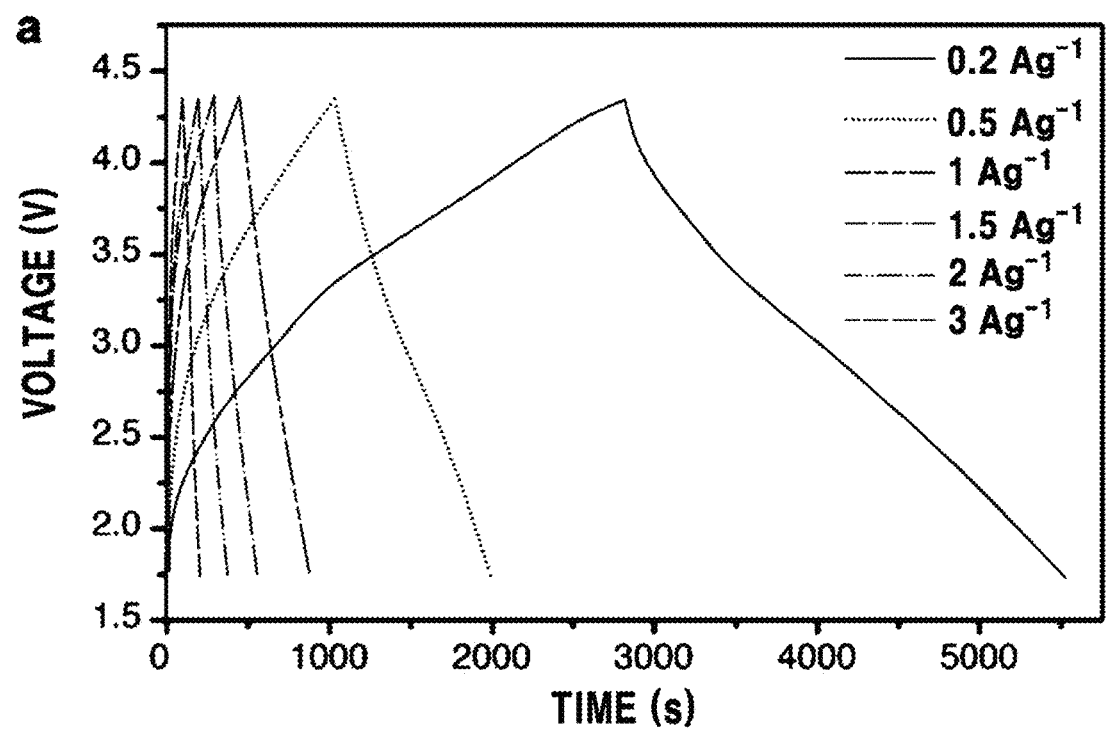
FIGS. 32A to 32C show the results of analysis on electrochemical performances of an energy storage device in accordance with an example of the present disclosure.
Figure 32B:
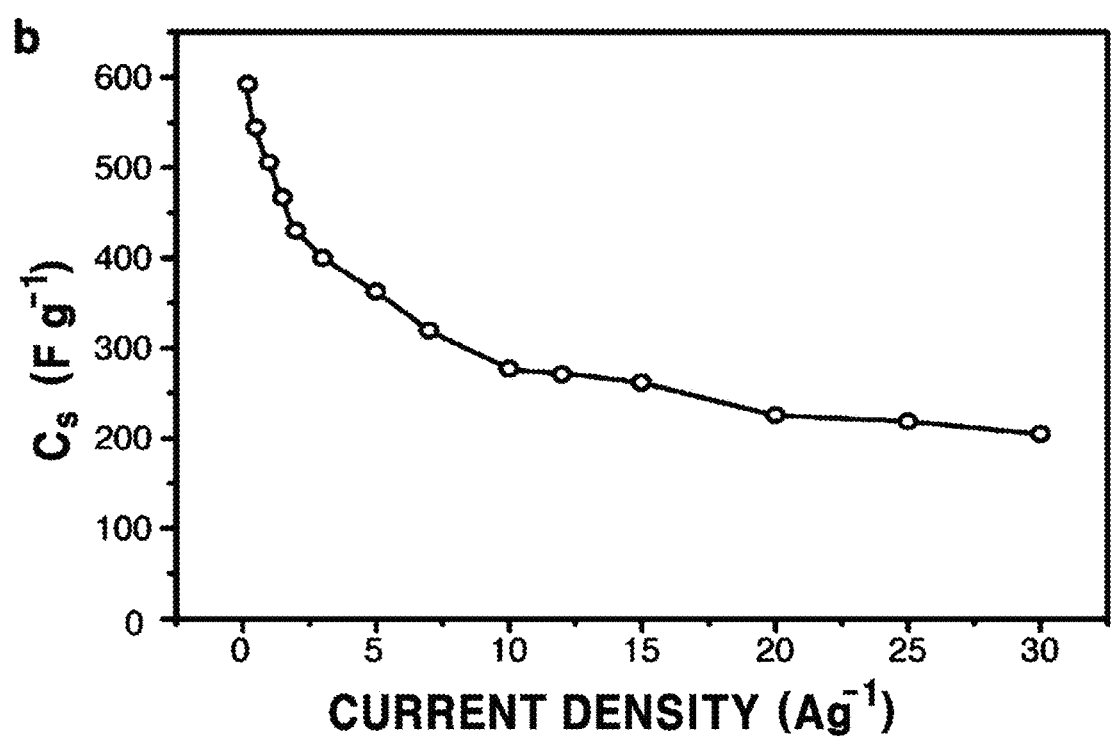
Figure 32C:
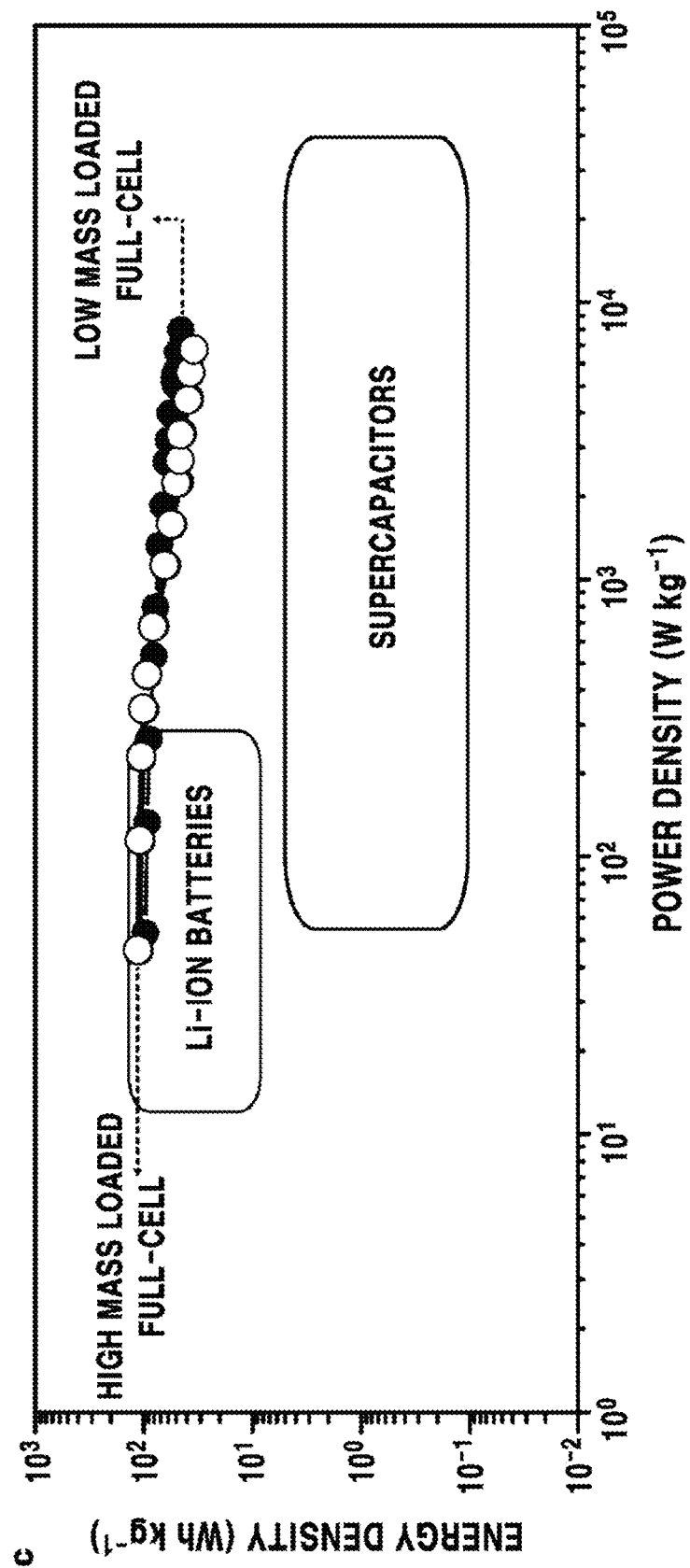

Finally, on combining the operation potentials of the NRT-based electrodes, the full-cell configuration (FIG. 30A) including Sn@NRT||NRT was realized, where the electrolyte containing an organic solvent was assembled with the Sn@NRT anode and the NRT cathode. To obtain a high operation voltage for the full-cell, the Sn@NRT anode was lithiated to reach a major lithiation potential up to about 0.25 V (vs. Li/Li$^+$) before the full-cell fabrication, which allowed a large potential difference to be achieved, as high as possible in the assembled full-cell device. Considering the ion charge/discharge behavior of both the Sn@NRT electrode and the bare NRT electrode, it was found that the operation potential of 1.75 V to 4.35 V for the full-cell configuration can be determined by combining the potential range of each electrode, as shown in FIG. 30B. In the present Example, it was observed that the relatively low lithiation/delithiation potential range of Sn used in the anode was appropriate to enable the operation potential range of a full cell in conjunction with the NRT cathode. The mass ratio of the electrodes was also optimized to extract the best properties of the electrodes by equalizing the total charge (Q) of each electrode. The mass loadings of the anode and cathode were determined to be 1.1 mg cm$^{-2}$ and 1.43 mg cm$^{-2}$, respectively. FIG. 30C presents the CV curves showing the quasi-rectangular shape for a full-cell hybrid capacitor device, signaling that the kinetic balance of the Sn@NRT||NRT configuration is well matched with electrochemical reactions in the anode and cathode electrodes. Indeed, the linear shape (FIG. 30D) with a slight bump of the gravimetric charge/discharge profile at various current densities based on the total mass of both electrodes supports that the surface electrosorption of anions and the redox reaction of Li ions are well matched in the device. In the present disclosure, the Sn@NRT∥NRT device achieves the highest specific capacitance (Cs) of 499 F g$^{-1}$ at a current density of 200 mA g$^{-1}$ and maintains a high retention of about 50% even at a high current density of 30,000 mAg$^{-1}$ (FIG. 30E). The excellent specific capacitance and its rate capability of the Sn@NRT∥NRT full-cell device are considered to be attributed from the open mesoporous channels, the hetero-atom-doped pores, and the ultrafine metal nanocrystals. Moreover, the full-cell capacitor composed of the Sn@NRT anode and the NRT cathode electrodes exhibit excellent capacitance retention up to 3000 cycles. Moreover, it was found that the excellent capacitance retention over 85% was maintained after 2000 cycles at a current density of 2000 mA g$^{-1}$, in addition to the capacity retention of about 80% even after 3000 cycles, as shown in FIG. 30F. In addition, the assembled full-cell device resulted in exceptionally high energy and power densities. FIG. 30G shows the highest energy density of 274 Wh$^{-1}_{electrodes}$ at 152.5 W kg$^{-1}$, where kg$^{-1}_{electrodes}$ refer to "per kg for the total mass of both electrodes". Furthermore, the excellent energy density of 129.5 Wh-kg$^{-1}_{electrodes}$ was also maintained even at the highest power density of 22,875 W kg$^{-1}_{electrodes}$ exhibiting favorable properties from the combined advantages of LIBs and EDLCs. In the present disclosure, energy and power densities far exceed those of graphene∥AC [28], Ti-based oxide∥AC [5], Ti-based oxide∥CNT [29], TiO$_2$-B∥graphene [30], Fe$_3$O$_4$/graphene∥graphene [6b], and MnO$_2$/graphene-∥graphene [6a], as shown in FIG. 30G. Consequently, these findings imply that the Sn@NRT∥NRT full-cell configuration provides remarkable electrochemical performance in high energy and power densities along with fast rate capability over a long cycle life. Further, in the present disclosure, it was found that even the package performance per the total device weight can achieve the high energy density comparable to that of a commercial battery as well as the excellent power density as high as that of a supercapacitor. Furthermore, the electrode on high mass loading was prepared and assembled for evaluation of electrochemical performances in the full-cell configuration. The thickness and densities of the NRT electrodes were matched to the conditions required for practical devices, and in this regard, FIG. 31 shows cross-sectional SEM images of the anode (Sn@NRT, a of FIG. 31) and the cathode (NRT, b of FIG. 31). FIG. 32A to FIG. 32C show the results of analysis on performance of the packaged Sn@NRT∥NRT cell with high mass loading electrodes, and show charge/discharge profiles (FIG. 32A) and specific capacities at various current densities (FIG. 32B) and also show that the packaged Sn@NRT∥NRT cell with high mass loading electrodes maintains high energy densities over all of the power densities, so that their energy densities are much superior to those of conventional supercapacitors (FIG. 32C). These results that the high range of operation voltages and enhanced capacities of both electrodes, originating from the synergetic effects of advantage properties for both anode and cathode structures in the full-cell configuration, play a very important role in realization of high-performance electrochemical energy storage.

In summary, the present disclosure demonstrates the high-performance electrochemical storage realized through synthesis of the new nitrogen-rich nanotubes with internal compartments having open mesoporous channels using both hard and soft templates. The open mesoporous channel in this NRT structure which enables fast ion diffusion, is on a distinct advantage. Their compartments can also be easily adapted to encapsulate ultrafine metal nanocrystals. The movement of metal precursors inside the compartments of the NRT leads to the formation of ultrafine metal nanocrystals encapsulated inside the compartments, thus leading to high capacity and excellent rate capability over a long cycle life. Interestingly, the NRT itself also exhibited superior electrochemical performance for access of anions by adopting open mesoporous channels and hetero-atom-doped sites. Indeed, the energy storage device based on the Sn@NRT∥NRT full-cell configuration was found to exhibit high energy densities of 274 Wh kg$^{-1}$ and 127 Wh kg$^{-1}$ in the power density range of 153 W kg$^{-1}$ and 22,800 W kg$^{-1}$. These results support that assembling the NRT cathode with many metal-encapsulated anode structures can pave a new route to realize high-performance full-cell devices requiring high energy and power densities along with excellent rate capability and to design a new class of high-performance energy storage structures.

The above description of the present disclosure is provided for the purpose of illustration, and it would be understood by those skilled in the art that various changes and modifications may be made without changing technical conception and essential features of the present disclosure. Thus, it is clear that the above-described examples are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

We claim:

1. A carbonaceous structure, comprising one or more hollow internal compartments,
   wherein each of the hollow internal compartments is connected through to outside and to the one or more hollow internal compartments adjacent thereto through one or more open porous channels formed in the carbonaceous structure, and
   the carbonaceous structure includes a carbonaceous matrix.

2. The carbonaceous structure of claim 1,
   wherein the carbonaceous matrix further includes an element of Group 15 of the Periodic Table.

3. The carbonaceous structure of claim 1, further comprising:
   one or more particles encapsulated by each of the hollow internal compartments.

4. The carbonaceous structure of claim 3,
   wherein a size of the particles encapsulated by each of the hollow internal compartments is from an atom size level to 1 μm or less.

5. The carbonaceous structure of claim 3,
   wherein the particles are semiconductive or conductive.

6. The carbonaceous structure of claim 3,
   wherein the particles include one or more elements selected from the group consisting of Si, Fe, Ni, Co, Al, Ge, Sn, Mn, Ti, V, Cu, Zn, W, Ag, Pt, Ga, P, Au, Sb, Te, Pb, Bi, Cd, and S.

7. The carbonaceous structure of claim 1,
   wherein a size of the hollow internal compartments is 100 μm or less.

8. The carbonaceous structure of claim 1,
wherein the one or more open porous channels have mesoporosity.

9. The carbonaceous structure of claim 2,
wherein a content of the element of Group 15 of the Periodic Table included in the carbonaceous matrix is 50 weight parts or less with respect to 100 weight parts of the carbonaceous structure.

10. The carbonaceous structure of claim 1,
wherein the carbonaceous structure has a specific surface area in a range of from 10 $m^2$ $g^{-1}$ to 4,000 $m^2$ $g^{-1}$.

11. An electrode material, comprising a carbonaceous structure of claim 1,
wherein the carbonaceous structure including one or more hollow internal compartments,
wherein each of the hollow internal compartments is connected through to outside and to the one or more hollow internal compartments adjacent thereto through one or more open porous channels formed in the carbonaceous structure, and
the carbonaceous structure includes a carbonaceous matrix.

12. The electrode material of claim 11,
wherein the carbonaceous matrix further includes an element of Group 15 of the Periodic Table.

13. The electrode material of claim 11,
wherein the carbonaceous structure further includes one or more particles encapsulated by each of the hollow internal compartments.

14. The electrode material of claim 13,
wherein the particles are semiconductive or conductive.

15. The electrode material of claim 13,
wherein the particles include one or more elements selected from the group consisting of Si, Fe, Ni, Co, Al, Ge, Sn, Mn, Ti, V, Cu, Zn, W, Ag, Pt, Ga, P, Au, Sb, Te, Pb, Bi, Cd, and S.

16. An energy storage device, comprising:
an electrode material according to claim 11,
wherein the electrode material includes a carbonaceous structure including one or more hollow internal compartments,
each of the hollow internal compartments is connected through to outside and to the one or more hollow internal compartments adjacent thereto through one or more open porous channels formed in the carbonaceous structure, and
the carbonaceous structure includes a carbonaceous matrix.

17. The energy storage device of claim 16,
wherein the electrode material is used as an anode and/or a cathode.

18. The energy storage device of claim 16,
wherein the carbonaceous matrix further includes an element of Group 15 of the Periodic Table.

19. The energy storage device of claim 18,
wherein the electrode material is used as a cathode.

20. The energy storage device of claim 16,
wherein the carbonaceous structure included in the electrode material further includes one or more particles encapsulated by each of the hollow internal compartments.

21. The energy storage device of claim 20,
wherein the particles are semiconductive or conductive.

22. The energy storage device of claim 20,
wherein the particles include one or more elements selected from the group consisting of Si, Fe, Ni, Co, Al, Ge, Sn, Mn, Ti, V, Cu, Zn, W, Ag, Pt, Ga, P, Au, Sb, Te, Pb, Bi, Cd, and S.

23. The energy storage device of claim 20,
wherein the electrode material including the one or more particles including one or more elements selected from the group consisting of Si, Fe, Ni, Co, Al, Ge, Sn, Mn, Ti, V, Cu, Zn, W, Ag, Pt, Ga, P, Au, Sb, Te, Pb, Bi, and Cd is used as an anode.

24. The energy storage device of claim 20,
wherein the electrode material including the one or more particles includes S, and is used as a cathode.

25. The energy storage device of claim 16,
wherein the energy storage device is a battery, a capacitor, or a battery-capacitor hybrid.

26. The energy storage device of claim 16,
wherein the energy storage device is a lithium ion battery, a sodium ion battery, a lithium air battery, a sodium air battery, a lithium metal battery, a sodium metal battery, a lithium ion hybrid capacitor, or a sodium ion hybrid capacitor.

27. A method for preparing a carbonaceous structure of claim 1, comprising:
injecting a solution containing a carbon precursor and a soft template to a hard template, and then carbonizing the carbon precursor and removing the soft template and the hard template to obtain a carbonaceous structure including one or more hollow internal compartments,
wherein the carbonaceous structure includes a carbonaceous matrix formed by the carbonization of the carbon precursor, and
each of the hollow internal compartments is connected through to outside and to the one or more hollow internal compartments adjacent thereto through one or more open porous channels which are formed in the carbonaceous structure by the removal of the soft template.

28. The method of claim 27,
wherein the carbon precursor further includes an element of Group 15 of the Periodic Table besides carbon element.

29. The method of claim 27, further comprising:
encapsulating one or more particles in each of the one or more hollow internal compartments of the obtained carbonaceous structure.

30. The method of claim 27
wherein the hard template includes a porous membrane template.

31. The method of claim 28,
wherein the carbon precursor includes a nitrogen-containing resin or a nitrogen-containing polymer.

32. The method of claim 27,
wherein the soft template includes one or more members selected from the group consisting of a surfactant, sulfur, water, and an oil.

33. The method of claim 27,
wherein a size of each of the hollow internal compartments is 100 μm or less.

34. The method of claim 27,
wherein the open porous channels have mesoporosity.

35. The method of claim 27,
wherein the carbonaceous structure has a shape of a spherical particle, an ellipse particle, a polyhedron, a nanotube, a nanorod, a nanobelt, a nanopillar, a nanosphere or a nanoplate.

36. A catalyst, comprising a carbonaceous structure according to claim 1:
   wherein the carbonaceous structure includes one or more hollow internal compartments, and each of the hollow internal compartments is connected through to outside and to the one or more hollow internal compartments adjacent thereto through one or more open porous channels formed in the carbonaceous structure, and
   wherein the carbonaceous structure includes a carbonaceous matrix.

37. The catalyst of claim 36,
   wherein the carbonaceous matrix further includes an element of Group 15 of the Periodic Table.

38. The catalyst of claim 36,
   wherein the carbonaceous structure included in the catalyst further includes one or more particles encapsulated by each of the hollow internal compartments.

39. The catalyst of claim 38,
   wherein the one or more particles includes a metal or a metal compound.

40. The catalyst of claim 36,
   wherein the carbonaceous structure further includes the one or more particles including one or more elements selected from the group consisting of Si, Fe, Ni, Co, Al, Ge, Sn, Mn, Ti, V, Cu, Zn, W, Ag, Pt, Ga, Au, Sb, Te, Pb, Bi, Cd, P, and S.

* * * * *